United States Patent [19]

Shaffer et al.

[11] Patent Number: 6,091,810
[45] Date of Patent: *Jul. 18, 2000

[54] AUTOMATIC ROUTING AND INFORMATION SYSTEM FOR TELEPHONIC SERVICES

[75] Inventors: James D. Shaffer, Rancho Santa Fe, Calif.; George G. Moore, Great Falls, Va.

[73] Assignee: Murex Securities Limited, Douglas, United Kingdom

[*] Notice: This patent is subject to a terminal disclaimer.

[21] Appl. No.: 09/211,137

[22] Filed: Dec. 14, 1998

Related U.S. Application Data

[63] Continuation of application No. 08/659,318, Jun. 6, 1996, which is a continuation-in-part of application No. 08/598,392, Feb. 8, 1996, Pat. No. 5,848,131, which is a continuation-in-part of application No. 08/365,325, Dec. 28, 1994, Pat. No. 5,506,897, which is a continuation of application No. 08/020,653, Feb. 22, 1993, abandoned.

[51] Int. Cl.[7] ................................................ H04M 3/42
[52] U.S. Cl. ........................................ 379/220; 379/211
[58] Field of Search .................................. 379/201, 207, 379/211, 219, 220, 221, 127, 113

[56] References Cited

U.S. PATENT DOCUMENTS

| Re. 36,111 | 2/1999 | Neville | 379/127 |
|---|---|---|---|
| 3,614,328 | 10/1971 | McNaughton et al. | 179/15 AT |
| 4,191,860 | 3/1980 | Weber | 179/18 B |
| 4,611,094 | 9/1986 | Asmuth et al. | 179/7.1 TP |
| 4,757,267 | 7/1988 | Riskin | 379/113 |

(List continued on next page.)

OTHER PUBLICATIONS

Applied Telematics, Inc., "InstaLink," brochure, undated.
Peterson, James L. and Abraham Silberschatz, Second Edition, Section 3.3.3, pp. 70–71, "Operating System Concepts," undated.

Targus Information Corporation, brochure, Mar. 19, 1993, "DART Intelligent Call Processing."

Targus Information Corporation, brochure, Jan. 17, 1995, "DART Intelligent Call Processing."

TIGER Technical Guide, Oct. 1991, pp. 3–5, "Topological Integrated Geographic Encoding and Referencing System/Zone Improvement Plan."

*Primary Examiner*—Scott Wolinsky
*Attorney, Agent, or Firm*—Knobbe, Martens, Olson & Bear, LLP

[57] ABSTRACT

A system and method for automatically and seamlessly routing telephone calls across a telephone network. The system includes a telephone network interface box having a computer, a master file and client file stored in the computer. The master file is dynamically linked to the client file at routing time to produce a selected client location telephone number which is transmitted across the telephone network. The system utilizes Automatic Number Identification to identify the calling party. The master file has a plurality of records having a telephone number and a spatial key and is updated frequently. The client file has a plurality of records having a spatial key and a client telephone number. Methods of generating client file records for both radius and polygon defamed service areas through an automated computer process are included in the present invention. Another embodiment of the system merges the records of the client file with the records of the master table to generate a single table to create a one table system. The one table system increases speed of the call routing process. A second embodiment of the one table system is provided by a special case of the client file build process which yields a caller telephone number to service location telephone number file. A further embodiment provides real-time processing in situations where high call volumes and transaction processing speed are not a major issue. The real-time processing system is simple to update and requires minimal storage.

46 Claims, 43 Drawing Sheets

U.S. PATENT DOCUMENTS

| | | | |
|---|---|---|---|
| 4,797,818 | 1/1989 | Cotter | 364/401 |
| 4,924,510 | 5/1990 | Le | 379/221 |
| 4,954,958 | 9/1990 | Savage et al. | 364/444 |
| 5,001,710 | 3/1991 | Gawrys et al. | 379/113 |
| 5,018,191 | 5/1991 | Catron et al. | 379/100 |
| 5,023,904 | 6/1991 | Kaplan et al. | 379/91 |
| 5,029,196 | 7/1991 | Morganstein | 379/67 |
| 5,033,079 | 7/1991 | Catron et al. | 379/100 |
| 5,095,505 | 3/1992 | Finucane et al. | 379/201 |
| 5,136,636 | 8/1992 | Wegrzynowicz | 379/207 |
| 5,163,087 | 11/1992 | Kaplan | 379/94 |
| 5,390,232 | 2/1995 | Freeman et al. | 379/15 |
| 5,465,286 | 11/1995 | Clare et al. | 379/34 |
| 5,506,897 | 4/1996 | Moore et al. | 379/220 |
| 5,533,107 | 7/1996 | Irwin et al. | 379/201 |
| 5,548,637 | 8/1996 | Heller et al. | 379/201 |
| 5,588,048 | 12/1996 | Neville | 379/127 |
| 5,771,283 | 6/1998 | Chang et al. | 379/142 |
| 5,805,688 | 9/1998 | Gillespie et al. | 379/220 |
| 5,805,689 | 9/1998 | Neville | 379/220 |
| 5,848,131 | 12/1998 | Shaffer et al. | 379/88.2 |
| 5,878,126 | 3/1999 | Velamuri et al. | 379/219 |
| 5,901,214 | 5/1999 | Shaffer et al. | 379/220 |
| 5,907,608 | 5/1999 | Shaffer et al. | 379/220 |
| 5,910,982 | 6/1999 | Shaffer et al. | 379/220 |
| 5,956,397 | 9/1999 | Shaffer et al. | 379/220 |

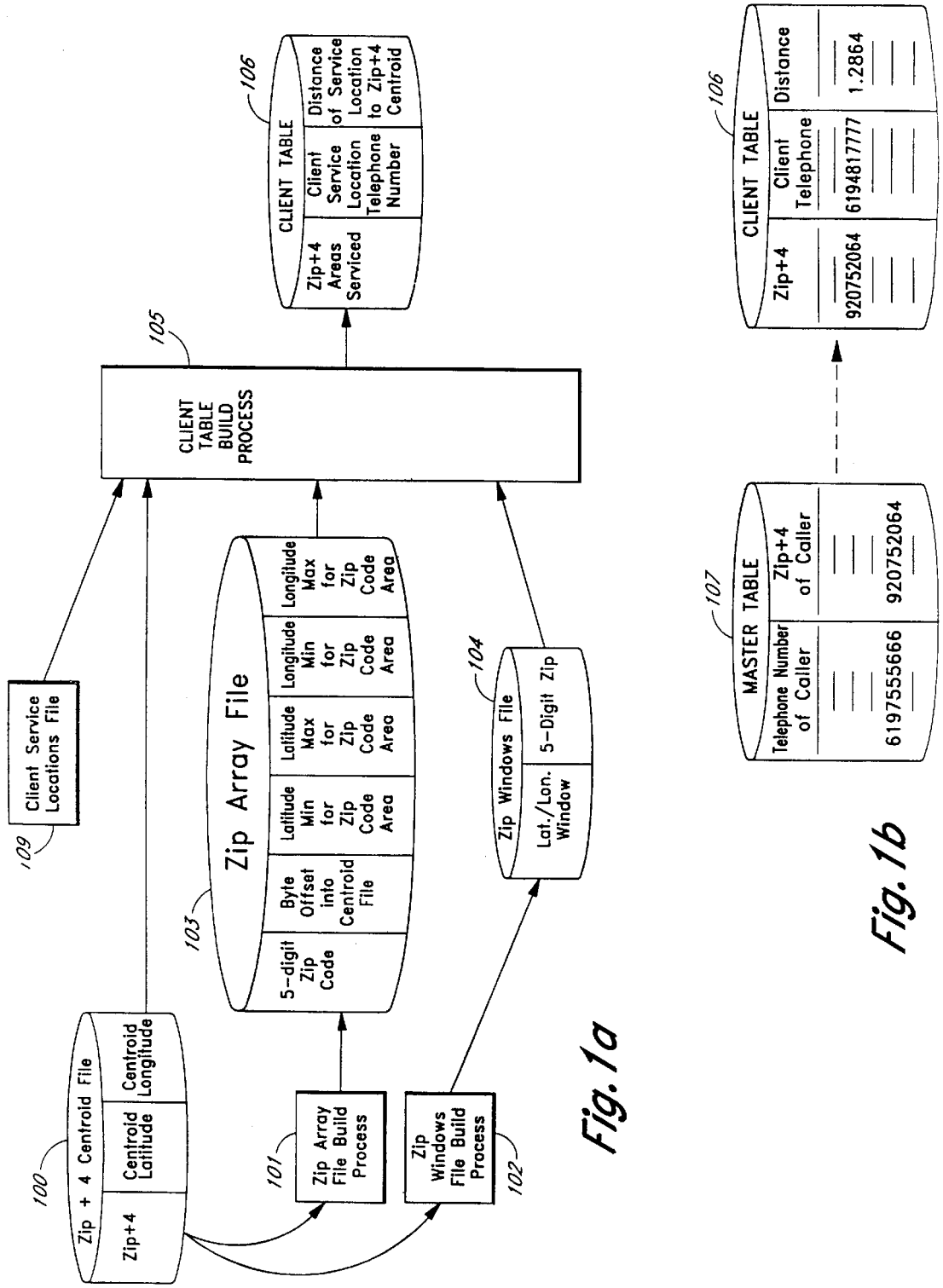

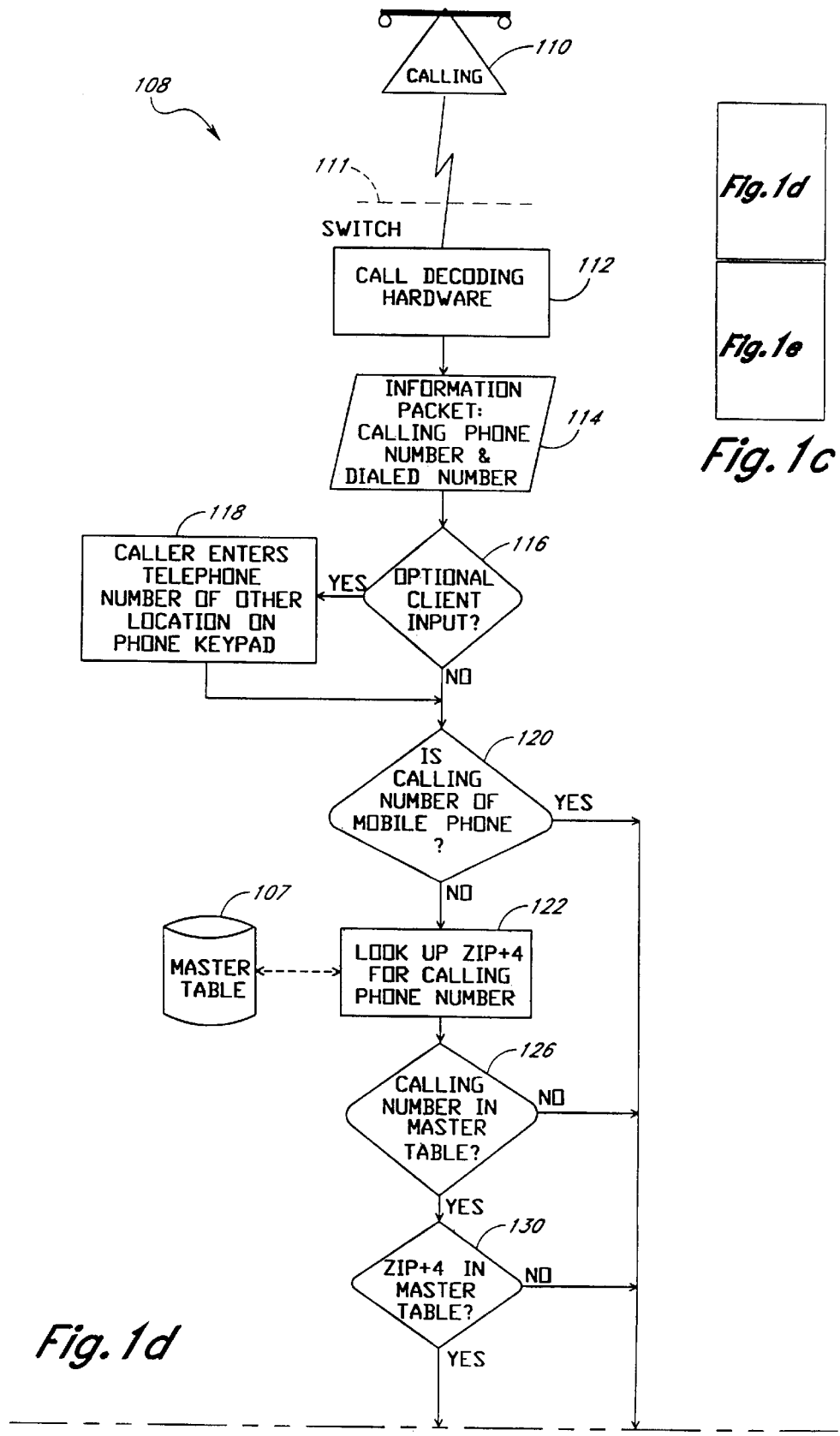

AUTOMATIC ROUTING AND INFORMATION SYSTEM FOR TELEPHONIC SERVICES

RELATED APPLICATION

This is a continuation application of copending application Ser. No. 08/659,318, filed Jun. 6, 1996, which is a continuation-in-part of application Ser. No. 08/598,392, filed Feb. 8, 1996, now issued as U.S. Pat. No. 5,848,131, which is a continuation-in-part application of application Ser. No. 08/365,325, filed on Dec. 28, 1994, now issued as U.S. Pat. No. 5,506,897, and which is a continuation of application Ser. No. 08/020,653, filed Feb. 22, 1993, now abandoned, each of which is hereby incorporated by reference.

BACKGROUND OF THE INVENTION

1. Field of the Invention

The present invention generally relates to telephonic services and routing technologies and, more specifically, to a system for automatically routing telephone calls and optionally providing information about a client location.

2. Background of the Invention

In the increasingly competitive business world, there have been various attempts to automatically route telephone calls made to an "1-800" number or equivalent for a local store, franchise, branch, dealer or service company (henceforth, service location), whose service area encompasses the caller location for the product or service associated with the "1-800" number. For example, a person would dial 1-800-Italian from any telephone in the United States, and the phone would ring at the MyPizza (a fictitious business) service location that delivers pizza to the location of the calling telephone.

There have been several previous simplistic attempts to automatically route calls to a service location that is geographically proximate to the caller. These routing technologies are based on routing the incoming call to a location with the same telephone area code and prefix as the originating call, to the same 5-digit zip code, to all zip codes that have the same city name, or a combination of the above. There are many different terms used to describe the various components of a 10-digit telephone number. In the telecommunications industry, it is called the NPA-NXX-XXXX, where the NPA is the area code, the NXX is the prefix or exchange and the XXXX is the suffix or line number. For example, in the 10-digit telephone number 619-942-9999, 619 is the NPA or area code; 942 is the NXX, prefix or exchange; and 9999 is the XXXX, suffix or line number. Usually all telephone numbers with the same area code and prefix are serviced by the same wire center. A wire center is the geographical area serviced by a single telephone company office. The wire center is usually one switch, but can be multiple switches, and usually provides service to about ten exchanges. By definition of the telephone companies, wire centers do not overlap.

A. Prior Routing System Structure

The earth is a sphere, and any point on its surface can be defined by a latitude and longitude spherical coordinate system developed several centuries ago. Using this coordinate system, spherical trigonometry, and a computer, it is possible to calculate the distance between any two locations on the earth and determine if one location lies within a specified radius of another or determine if a location is contained within an irregular service area defined as a spherical polygon.

Several years ago, AT&T instituted the technology of passing the calling telephone number along the telephone network, by use of Automatic Number Identification (ANI), to facilitate billing. The "Caller ID" feature, available on some telephone networks, utilizes the ANI technology to identify the telephone number of the calling party. Since a modem telephone switch is just a special purpose computer, it is a simple process for the switch handling the call to look up in a record table (of over one hundred million records) the calling telephone number with an assigned service location telephone number and route the call to the service telephone number.

However, there were some fairly formidable problems that needed to be solved before this routing process could be a commercially viable and practical service. The first problem was initially determining the latitude and longitude of every telephone number in the United States and keeping them updated when twenty percent of the consumer population moves every year and businesses are continually opening and closing locations. The second problem was performing the multitude of spherical trigonometric calculations which is several orders of magnitude beyond today's most powerful computers that are required to create the calling telephone number to the service location telephone number tables and to keep them updated in a constantly changing environment.

Several key databases and technologies are necessary to solve these problems. The United States Census Bureau, as part of the 1990 census, built a national latitude and longitude cartographic map of the United States called TIGER (Topological Integrated Geographical Encoding and Referencing) that contains almost every street link in the United States. A street link is a street segment intersected by other streets at each end. The TIGER record for all street links contains the latitude and longitude coordinates at each end of the street segment accurate to within plus or minus thirty feet and, for most street segments, the starting and ending address ranges for each side of the street. Where the Census Bureau did not complete the address ranges, private companies have filled in the gaps and are updating TIGER as new streets are built.

In the past, the U.S. Postal Service (the "Post Office") divided the U.S. into postal delivery areas called zip (zone improvement plan) codes to help automate the routing of mail. At the nine digit level (called "zip+4"), these zip codes usually correspond to a single side of a street link. In addition to geographically dividing the United States into small postal delivery areas, the Post Office also set standards for the naming of places and streets. For direct mailers to get discounts, they had to standardize their mailing addresses to match the Post Office's naming conventions and provide a zip+4 code. To facilitate the process of postal address standardization and zip+4 coding, the Post Office provides a national Zip+4 Address Coding Guide and has certified several commercially available software packages that correctly address standardize and zip+4 code 99 percent plus of the address records on a Post Office test file.

Recently, the Post Office and some private companies have matched the Post Office's Zip+4 Address Coding Guide with TIGER and have created files containing zip+4 codes with latitude and longitude centroids (a zip+4 centroid is the approximate geographical mid-point of a zip+4 code). This type of file is referred to as a zip+4 latitude and longitude centroid file 100 (FIG. 1a). These centroids are accurate 95 percent of the time to within plus or minus 105 feet in relation to a house or business receiving mail at a street address assigned to a given zip+4 code. Today, it is a very reliable and economical process to address standardize and zip+4 code a list identifying physical locations, such as a master list of phone numbers of the present invention.

Other changes and improvements in telecommunications technology were needed to make the automated telephone call routing process a commercially viable and practical service. Improvements in the telecommunication infrastructure in the U.S. have changed the telecommunication cost structure. Presently the cost of a telephone call from Los Angeles to New York is about the same as for a call from Los Angeles to San Diego. Therefore, the physical location of central routing system hardware and facilities is no longer critical, or in other words, can be anywhere in the continental U.S.

Another improvement of telecommunications technology is the advent of Geographic Information Systems, commonly called GIS. These systems allow the aggregation and display of almost any data for any area, any size or shape, anywhere in the United States by interactive maps. The popularity of these systems has lead to the development of sophisticated techniques and algorithms to handle geographically based information. Of primary interest is the linking of the geographic information to telephone numbers, especially at the 10-digit level.

The complex process of spherical trigonometric distance calculations on billions of possible permutations has been alleviated by making the process less computer intensive. Instead of performing complex trigonometric spherical calculations, a technique that is less than one-thousandth as computer intensive is used. This technique is based on doing a polyconic projection from each service location and performing simple two dimensional distance squared tests. There are approximately 68.9404 miles per degree latitude. However, the miles per degree longitude varies with the latitude. At a given latitude, the miles per degree longitude is equal to the cosine of the latitude multiplied by 68.9404. By using the service location as the latitude point and knowing the latitude and longitude of calling points, it is easy to obtain a delta latitude and longitude, translate them into miles, and perform a simple distance calculation, i.e., "distance=SQRT(X2+Y2)". This polyconic projection technique results in a distance calculation error of approximately 12 feet for two locations that are 100 miles apart at 40 degrees latitude. However, additional reduction of the computational effort is necessary to have a practical, efficient, and commercially viable routing process for high call volume applications.

B. Prior Routing System Operation

Previous technologies for routing "1-800" telephone number calls to a service location have one or more of the following three problems:

(1) Many such routing systems are very coarse in their level of precision and cannot handle small service areas with specifically defined franchise territory boundaries like those for pizza delivery franchises. The franchise territory may be, for example, an irregularly shaped polygon. A much more precise system is desired that is accurate to within about 105 feet rather than previous systems having accuracies to within about 10 miles. Such a system would utilize very precise measurement determinations made possible by knowing the physical location on the earth, most typically expressed as a latitude and longitude, of nearly every non-mobile telephone in the United States. Other coordinate systems could be used in other countries.

(2) Another problem in routing systems is that they divide the United States into many large arbitrarily defined areas and there is no ability to route a call to the closest service location if the closest location is not located in the same artificially created area as the caller. In many instances, a caller located near the border of an exchange area or 5-digit zip code is much closer to a service location with a different zip code or telephone prefix than the one to which it is routed. A seamless system is desired that does not use artificially created areas such as telephone wire centers, telephone prefixes, or 5-digit zip codes where calls can only be routed within their area. A business may want an option of choosing to route a call to the closest branch whose service area may be defined by either a predetermined radius, e.g., 5 miles, that encompasses the location of the caller or by a predetermined irregularly shaped polygon that encompasses the location of the caller. Furthermore, a business may want an option of choosing to route a call to any branch whose service area may be defined by either a predetermined radius that encompasses the location of the caller or by an irregularly shaped polygon that encompasses the location of the caller, rather than the closest branch.

(3) Finally, known routing systems often rely on third party telephone directories that are always inaccurate due to publishing, key entry, and optical character recognition (OCR) scanning time lags and which do not include unlisted numbers. Over 30 percent of the U.S. telephone numbers are unlisted, which includes public pay phones and multiple lines going into businesses and households where only one line is listed. The information in such directories becomes rapidly outdated as the locations and related information of listed consumers and businesses change. Thus, a system is desired that correctly routes a much higher percentage of calls than the previous systems. In the U.S., such a system would require direct access to the AT&T universe of telephone numbers. Such a system would preferably utilize daily updated and unlisted telephone numbers and involve passing information between regulated telephone databases maintained by the telephone companies and client databases maintained by third parties.

The three deficiencies discussed above result in lower customer service and satisfaction, higher costs because of manual exception handling for calls that cannot be routed due to a variety of reasons, costs of misrouting, and high on-going maintenance costs. Manual exception handling generally requires operator intervention in the "1-800" call.

Other previous systems require the consumer to enter their zip code or telephone prefix on the Touch Tone keypad in response to voice prompting from the system. Based on the caller-entered data on the keypad, the telephone call is forwarded to a destination telephone. Other similar systems will simply inform the consumer, by a voice message, of another telephone number for the local dealer, which must be manually dialed rather than forwarding the call automatically. A system is desired that does not require any additional customer interaction or input. Such a system would be totally automatic by utilizing, at a minimum, the 10-digit telephone numbers in the standard telephone packet that can only be accessed and utilized by regulated telephone companies on a national basis. The telephone packet includes the complete origin and destination telephone numbers.

The basis of an automatic telephone routing system must include a means to automatically identify the telephone number of the calling party. Such a system is disclosed by Kaplan, U.S. Pat. No. 5,163,087. This system translates an Automatic Number Identification (ANI) of the calling party into a customer database key previously defined by the called party. The database key, e.g., customer account number, is then provided to the called party instead of the ANI information such that a computer at the called business can process the key to look up and present customer information to an agent of the business. This system assumes that the caller has called this business at a previous time to provide information to the agent of the business to create a customer record or other similar information. The Kaplan system delivers the database key to one business location rather than a plurality of service locations throughout the country. The delivery of the database key to the business requires an Integrated Services Digital Network (ISDN) or similar facility, which is an additional burden for the business.

An automatic routing system should not need to deliver a database key or message to the final destination, but would merely utilize the ANI information as an index to a table containing partitions of a country into small geographic areas, such as postal service zip+4 codes. These partitions would be further utilized to access one of a plurality of service locations that may be anywhere within the country. A current system for telephone call routing is described in U.S. Pat. No. 4,757,267 to Riskin. Riskin employs automatic number identification (ANI) for routing calls from a caller to a dealer located within the same area code and prefix (first six digits of a 10-digit telephone number, the "6-digit number") as the caller. Because the area identified by the 6-digit number is fairly large and there may be several dealers within the area, the dealer location is usually selected from a list of several locations based on random selection, or weighted percentage assigned to each location. Alternatively, the caller is presented with a list of possible dealer locations for the large geographic area because the system does not know which service locations are closer than the others. Riskin uses the 6-digit number to determine the location of both the caller and the service location. Riskin assumes the location of the caller to be the location of the central office switch that services the caller's 6-digit exchange (which can be 0 to 5 miles from its true location), and assumes the location of the dealer location to be the location of the central office switch that services the dealer location's 6-digit exchange (which can be 0 to 5 miles from its true location) utilizing a coordinate system that is accurate to plus or minus 2300 feet. What is desired is a system that uses all ten digits of the calling and service location telephone numbers and the physical street address of the location of the numbers in connection with a GIS-type database (utilizing a coordinate system and associated coordinate data that is accurate to within 30 feet) to provide geographic precision to within 105 feet for the location of the calling and destination telephones.

Consequently there is a need for an automated telephone routing system that provides the ability to reduce costs by routing a very high percentage of calls made to a single national telephone number without any human intervention; the marketing advantage for a client of a single, easy to remember, toll free or nominal fee national telephone number; geographically precise results; and the ability of businesses to define custom service areas around each servicing location of any desired size and shape. Preferably, a client may define each location's service area as an area with a radius of any size or a polygon of any size and shape. A client can intermix radius and polygon definitions as well as have service areas be overlapping or non-overlapping.

Frequently, a caller may not need to have a telephone call actually completed to the service business location, but rather, the caller needs information about the business. For example, the caller may want to determine the location of the three closest service locations, or more specifically, the caller desires to know that the business is still open, or has inventory of a desired item, and so forth.

C. Prior Voice Response Unit Utilization

Traditionally, businesses, non-profit organizations and government agencies with one to tens of thousands of service locations provided customers multiple telephone number points of contact with usually at least one telephone number for each service location, department and individual. This put a major burden on customers and prospective customers to find, remember, dial and be connected to the correct intra-entity telephone number for the location or services desired. In the new world of electronic commerce, these entities have started promoting vanity telephone numbers as their preferred single initial point of customer contact. These vanity numbers are easy to remember telephone numbers, e.g., 1-800-FLORIST, that are selected by a business. The vanity telephone numbers typically have "800", "888" or "900" as area codes or local exchange prefixes "555" or "950".

Based on the large volume of calls going to these vanity numbers, customer demands for extended support hours of seven days a week and 24 hours a day, and the goal of reduced telephone busy and on-hold times has resulted in many vanity advertisers answering vanity number calls with Voice Response Units (VRU). The proliferation of vanity numbers and the utilization of the VRU have created a need to automate, through what is now called intelligent call processing, a higher percentage of calls being answered by the VRU.

In this context, automated intelligent call processing is defined as the capture of network-provided data, such as ANI and dialed number identification service (DNIS), and caller-provided data, such as data entered by Dual Tone Multi-Frequency (DTMF) through a Touch Tone telephone key pad or the caller speaking directly, at the VRU. The intelligent VRU further can decipher, validate, process and fulfill the caller's request by playing pre-recorded messages, creating call specific test messages and speaking them to the caller, and/or routing and connecting the caller to the servicing location. In contrast, semi-automated call processing means that components of the customer request can be automated through intelligent call processing but some portions of the request still require support during the call by a live operator.

A further category of automated intelligent call processing includes the situation where the client does not desire to use the voice response capabilities but uses the automated routing features of the system. In such a situation, the VRU may be replaced by a network terminating point interface (NTPI) box which does not have voice/speech features.

For the VRU or NTPI box to handle a higher percentage of caller requests, more information must be immediately accessible to the VRU or NTPI box. This requires the real-time access to many different databases, stored on different computer systems. Recent advances in computer networking technology, networking standards, increases in speed and bandwidth, and reduction in costs for long distance data communications have made wide-area networking a common practice. This is demonstrated in part by the variety of computer-interface applications supported by computer network services, such as CompuServe®, America Online®, Microsoft NetworkÔ and the Internet.

In the national telecommunications network with its nearly 200 million access points, most with only basic Touch Tone or old rotary telephone input and output capability, VRU or NTPI switch database access has been primarily limited to client proprietary customer databases indexed by telephone number. This type of access works acceptably for many applications with existing customer calls. However, for new customers, new businesses or new applications that service different target markets, these internal databases are too sparse in coverage to make VRU database lookup applications economical. On the other hand, there are national databases, such as the GDT Zip+4 Latitude and Longitude files, that do not contain a telephone number. Accordingly, these databases, and derivatives of these databases that do not contain a telephone number field, have not been utilized in VRU telephone call processing applications.

The missing link in making almost unlimited amounts of data immediately available to the VRU or NTPI box is creating a standardized, precise and universal database linkage key that can be assigned to all telephone numbers in the United States and U.S. territories. This key needs to act as a direct and/or translator linkage mechanism between the telephone number and spatial, geographic, and client service location databases, where the service area may be of any defined size and shape. Since the common trait shared among the above-mentioned databases is their geographic/spatial location, definition and/or relationship, what is needed is a robust solution of a universal hierarchical geographic/spatial linkage key that is termed herein, the Spatial Key. Utilizing the Spatial Key, it becomes practical to automate many VRU applications that provide the caller with information and/or connect the caller with a servicing location.

The option of choosing from among several embodiments of the spatial linkage or spatial key linkage with a VRU or NTPI box would be desirable. These include: (1) Use of a master table having caller-provided telephone numbers with an associated spatial key and an automatically generated client table linking spatial keys to client service location information. (2) Use of a single table linking telephone numbers to other telephone numbers when routing speed is very important or where compatibility is necessary with the current telecommunications network. Telecommunications networks generally require long lead times to incorporate new technology. Because such an embodiment uses a single table, it would be the simplest embodiment to implement from the telecommunications network perspective. (3) Use of real-time spatial processing to associate precise caller locations to precise servicing locations in situations when high call volumes and transaction processing speed are not an issue and/or where computer storage is a limited resource and the application does not require a Spatial Key linkage to other Spatial key indexed databases. Such a system would be the simplest embodiment to update and the required files could be independently maintained.

Prior attempts at real-time call processing have lacked precision. Typical prior attempts use the area code and exchange numbers (6 digits) rather than all ten digits of a U.S. telephone number. For example, the Riskin patent uses Bellcore's V&H coordinate system to identify the caller location and the service location to a plus or minus five mile precision. This prior system does not use a precise service area definition for the service location, but rather uses a client-defined search radius around the caller location. However, the location of the caller is defined by the V&H coordinates of the telephone switch to which the caller's telephone is physically connected, so the search radius is actually around each telephone switch. The search radius is used to access a V&H coordinate interleaved index to a service location file to get a list of potential service locations. Calculations are then made to determine the distance between the location of the caller's switch and the location of the switch for each of the potential service locations. This information is used to develop a final list of service locations.

What is desired is a system that can precisely determine the location of the caller or caller-provided telephone number and of the service location. Also desired is the ability for the client to precisely define a service area around each service location rather than defining a search radius around the caller location. Further desired is the capability to quickly route the telephone call, such that the caller is not aware that it is happening. The imprecise distance calculation from the caller location to the service location used by prior systems for determining servicing location(s) is no longer required for this purpose. The ability of the system disclosed herein to precisely determine the distance between the above two mentioned points provides a valuable item of information for further selecting between multiple caller servicing locations and providing information regarding the proximity of a servicing location to the caller.

In all of the desired embodiments, it would be preferable to utilize a service area, associated with a client service location, of any desired size and shape. Further, it would be desirable to optionally allow the client to provide service area information to the caller. Such an option would preferably utilize an NTPI box having voice/speech features linked to a file comprising client service information by a service location ID or telephone number, for example. The optional client service location information could include, for example, providing the caller with such things as the address(es) of the servicing location(s) for mailing, picking up and/or dropping off something to the selected servicing location; providing the caller with pre-stored micro-area directions to the service location(s); or providing the caller with the location's open hours, drop-off times or pick-up times.

SUMMARY OF THE INVENTION

The above-mentioned needs are satisfied by the present invention which includes a system and method for automatically processing telephone calls by either connecting the caller to a servicing location and/or providing the caller information regarding the servicing location.

The present invention provides a method of routing all published and unpublished telephone numbers, including unlisted numbers, secondary unpublished business lines, and public pay phones. The present invention also provides a method for legally conforming to contracted franchise territory definitions executed between franchisers and franchisees by routing customer's calls precisely to the correct legal franchisee area. Additionally, the present invention provides a method for precisely routing telephone calls based on any geographic definition including postal geography, census geography, telecommunications geography, special grid coordinate geography, and all custom geography.

The present invention provides a method for automatically routing and processing customer calls that do not meet the pre-set client protocols. This "exceptions handlin" process routes to a "live" operator who executes preset exceptions handling protocols. The present invention also provides for a method of integrating unrelated geographic information systems and database technology, telecommunications systems and database technology, postal systems and database technology, and computer technology into a common applications driven architecture. Additionally, the present invention provides a method for dynamically and instantaneously updating and integrating Client and Master Tables with no time lags. Furthermore, the present invention provides a method for automating the processing of information that is input by a customer using a customer interface that automatically routes telephone calls to customer requested destinations.

The present invention provides a Two Table system to determine the precise location of a telephone associated with a caller by utilizing the caller's telephone number, determining a spatial key for the location, and spatially associating the key with servicing location(s) whose service areas can be defined as any size or shape. Alternatively, a caller-provided telephone number may be substituted for the caller's telephone number, in which case the location is of a telephone associated with the caller-provided telephone number. This process starts by retrieving a telecommunications network-captured caller 10-digit telephone number with its associated spatial key from the first table. Next, record(s) with the associated spatial key are retrieved from a second table created by an automated process that mathematically establishes spatially overlapping relationships between spatial keys and service area(s) of any defined size and shape. Finally the retrieved service location dependent data is passed back to the telecommunications network to connect the caller to a selected service location or for further network processing.

Key components of the system include a caller location identifier to identify the precise spatial and geographic location of the caller, or caller-provided telephone number, with a spatial key and a routing kernel. The routing kernel utilizes a dialed number to efficiently determine which geographically defined client service areas encompass the location of the caller-provided telephone number and determines a distance and direction from the caller's location to each of these service locations.

The present invention provides the creation and maintenance advantages of an automated table build process versus the manual process of building and maintaining a Caller Telephone Number to Service Location Telephone table used in prior systems. Automatically created client tables are built by accessing a list of service areas one area at a time to determine which spatial keys, e.g., ZIP+4s, are within each service area, calculating the distance from each ZIP+4 to the service location, writing a record for each contained ZIP+4 to a file, and sorting and indexing the file by reference to the ZIP+4 and by ascending distance.

In a One Table embodiment, there are two ways of creating a Telephone Number to Service Location Telephone Number or ID table that can be incorporated into a telecommunications network. These methods for building a One Table system use techniques similar to those described in creating the Two Table system. Once the single table is created, the One Table system only requires a single disk lookup in operation to determine the telephone number of the desired service location, and thus, provides the fastest call routing.

A first way of building a Caller Telephone Number to Dealer Telephone Number table in the One Table system is a special case of the Client Table Build process. By substituting a 10-digit telephone for the ZIP+4 as the Spatial key and starting with a 10-digit Telephone Number Latitude & Longitude Centroid file, the end result is a Client Table that is a Caller Telephone Number to Service Location Telephone Number table.

A second way of building a Caller Telephone Number to Dealer Telephone Number table in the One Table system involves an off-line merging of ZIP+4 records from the Master Table and Client Table and creating a Caller Telephone Number to Service Location Telephone Number table which is identical to the Client Table in structure, but with more records and with a telephone number substituted for the ZIP+4.

In a Real-Time Processing embodiment, the system determines a latitude and longitude of a caller and based on this latitude and longitude, the system spatially determines a list of locations that potentially service the caller's location. The system then performs a detailed spatial test on each potential location in the list to determine if the caller's latitude and longitude is inside the service location's service area. If it is inside, the distance from the caller to the service location is determined and added to the list of servicing locations. After all potential locations have been processed, the servicing list is sorted in ascending order based on distance and passed back to the application job stream for use by the telephone network in routing the call.

To facilitate efficient real-time processing, a Service Area Windows file is utilized. Each record in this file comprises a service location telephone number or ID and a latitude/longitude window determined from the latitude and longitude extremes of the radially-defined service area or the polygon-defined service area, as applicable.

A further derivative of the Two Table system (Master and Client tables) is a Three Table system which incorporates a Client Service Location table. Alternately, the Client Service Location table can be incorporated into either the One Table system or the Real-Time Process system. Thus, the Client Service Location table is an enhancement to any of these systems.

In the Two Table system, the Master Table and the Client Table are used to determine the spatial service relationship of the caller provided telephone number and the servicing locations. However, in call processing where there are multiple service locations that service a caller, there is other service location dependent data that does not have any spatial attributes, e.g., hours open, days open, product inventories, that is required for selecting the best service location for the caller. This data is most efficiently stored in a third table called the Client Service Location table. There is one record per service location in this table, which is indexed by service location identification (ID) or by service location telephone number. This table can also contain informational data, e.g., service location, name, address, general directions to a service location, a termination telephone number, a fax number and so forth, that can be spoken to the caller by a Voice Response Unit.

In one aspect of the present invention there is a method for selecting service locations during a telephone call, the method for use within a computer telephone integration (CTI) network having a master list of caller telephone numbers that is indexed by telephone number, each telephone number having a coordinate associated with the location corresponding to the telephone number, and a client dependent location list that is indexed by a spatial index of service locations associated with corresponding service areas of substantially any selected shape and size, each service location having a coordinate associated with a service location address, the method comprising receiving a caller's telephone number and a dialed telephone number; using the received caller's telephone number to access the master list of caller telephone numbers and retrieve a corresponding caller coordinate from the master list; determining an index key using the retrieved caller coordinate; determining one or more service locations having coordinates spatially proximal to the retrieved caller coordinate using the index key; retrieving the service location coordinates and service area definitions for said one or more service locations; and determining the distance from the caller coordinate to the coordinates of said one or more service locations and selecting service locations having a service area that contains the caller coordinate.

In another aspect of the present invention there is, for use within a computer telephone integration (CTI) network during a telephone call, a system for selecting one or more servicing locations to be used within the CTI network, comprising a master list of caller telephone numbers indexed by telephone number, each telephone number having an associated spatial key corresponding with a location of a telephone associated with the caller telephone number; a spatial key to geographic coordinate translation table including a list of spatial keys and their corresponding geographic coordinates; a client service location table including geographic coordinates for client service locations; and a processing system capable of using a caller's telephone number to access the master list of caller telephone numbers and retrieve a corresponding spatial key, using the retrieved spatial key to access the spatial key to geographic coordinate translation table and retrieve a corresponding geographic coordinate, and using the retrieved geographic coordinate to determine which client service location is spatially proximate to the location of the telephone associated with the caller's full telephone number.

In yet another aspect of the present invention there is a method of building, during a telephone call, a results list in distance order of servicing locations to be used within a computer telephone integration (CTI) network, the method comprising providing a master list of potential caller telephone numbers, each telephone number having a coordinate associated with the location corresponding to the telephone number; providing a client dependent service location list, each service location having a coordinate associated with a service location address and having corresponding service location information; receiving a caller's full telephone number; accessing the master list of potential caller telephone numbers using the received caller's full telephone number to obtain a caller coordinate corresponding to the received caller's full telephone number; accessing the client dependent service location list using the caller coordinate to retrieve spatially proximal service location address coordinates and service location information; and building a results list, in distance order, of service locations using the caller coordinate, service location coordinates and service location information.

In another aspect of the present invention there is a telephone call processing system, comprising a predefined master list of telephone numbers with spatial coordinates indexed by telephone number, wherein the spatial coordinates correspond to locations of telephones associated with said telephone numbers; a file of client service locations, wherein each service location is geographically defined by spatial coordinates and indexed by spatial coordinate windows; and a processor system capable of indexing a caller telephone number in the master list of telephone numbers to obtain a selected spatial coordinate corresponding to the location of the caller telephone number, indexing the selected spatial coordinate in a spatial coordinate window index of the client service locations file to determine which service locations are spatially proximate to the location corresponding to the caller telephone number, and selecting a service location from the determined spatially proximate service locations according to at least one predetermined criteria.

In a further aspect of the present invention there is an automated call processing system, comprising a routing processor linked to a telephone network; a predefined master table of telephone numbers having spatial keys indexed by telephone number wherein the master table is accessible by the routing processor, and wherein the spatial keys correspond to locations of telephones associated with caller telephone numbers; one or more client location tables accessible by the routing processor, wherein each client location table includes spatial keys corresponding to client service locations and business information; and a real-time processing module executed by the routing processor, the real time processing module capable of indexing a caller telephone number in the master table of telephone numbers to obtain a selected spatial key corresponding to the location of the telephone associated with the caller telephone number and determining which client service location is the closest to the location corresponding to the caller telephone number utilizing said one or more client location tables.

In yet another aspect of the present invention there is, in a call processing system, a real-time method of call processing for use in a telephone network, the method comprising receiving a caller telephone number; using the received caller telephone number to index a predefined master list of telephone numbers with spatial keys to obtain a selected spatial key associated with the caller telephone number, wherein the master list is indexed by telephone number and the spatial keys correspond to locations of telephones associated with the telephone numbers; and selecting a client service location from one or more client tables utilizing the selected spatial key, wherein each client table includes spatial keys corresponding to the locations of client service locations and business information.

In another aspect of the present invention there is a method, for use with a computer telephone integration (CTI) network, of generating a database of potential caller telephone numbers linked to client service location ID's for one or more client service locations associated with the caller telephone number, the method comprising providing a master list of caller telephone numbers, each telephone number having an associated spatial coordinate corresponding with the location of the telephone associated with the telephone number; providing a list of client service locations with a location identification (ID) and location spatial coordinates; and linking telephone numbers from the master list to client location identifications from the list of client service locations based on the spatial coordinate associated with the telephone number being within a client defined distance of the spatial coordinate of the client service location.

In a further aspect of the present invention there is a method, for use with a computer telephone integration (CTI) network, of generating a database of potential caller telephone numbers linked to client service locations for one or more client service locations, the method comprising a) providing a master list of caller telephone numbers, each caller telephone number having an associated spatial coordinate corresponding with the location of the telephone associated with the caller telephone number; b) providing a list of client service locations with location spatial coordinates and defined service areas; and c) linking caller telephone numbers from the master list to client service locations from the list of client service locations based on the spatial coordinate associated with the caller telephone number being a shortest distance to the spatial coordinate of a client service location and the spatial coordinate associated with the caller telephone number being inside a service location's defined service area.

In a still further aspect of the present invention there is an automated call processing system, comprising a routing processor linked to a telephone network; a predefined master table of telephone numbers having spatial keys indexed by telephone number wherein the master table is accessible by the routing processor, and wherein the spatial keys correspond to locations of telephones associated with caller telephone numbers; one or more client location tables accessible by the routing processor, wherein each client location table includes spatial keys corresponding to service areas of client service locations; and a processing module executed by the routing processor, the processing module capable of indexing a caller telephone number in the master table of telephone numbers to obtain a selected spatial key corresponding to the location of the telephone associated with the caller telephone number and selecting one or more client service locations utilizing said one or more client location tables, wherein a client service location is selected if the location corresponding to the caller telephone number spatially lies within the service area of the client service location.

BRIEF DESCRIPTION OF THE DRAWINGS

FIG. 1a is a block diagram of the files utilized in the presently preferred Client table Build process of the present invention;

FIG. 1b is a block diagram of a portion of a dynamic central switch linking process of the present invention that uses the result of the Table Build process of FIG. 1a;

FIG. 1c, comprising FIGS. 1d and 1e, is a system level diagram of a presently preferred embodiment of the central switch linking process interconnecting a calling telephone and a destination telephone of the present invention;

FIG. 12b is a block diagram of the files utilized in the process of FIG. 12a;

FIG. 13 is a diagram illustrating an example area utilized in the description of the process shown in FIG. 12a;

FIG. 14 is a flow diagram of the zip window list function indicated at 612 in FIG. 12a;

FIG. 16 is a flow diagram of the initial zip list function indicated at 614 in FIG. 12a;

FIG. 18 is a flow diagram of the final zip list function indicated at 616 in FIG. 12a;

FIGS. 19a and 19b are a flow diagram of the line index file function indicated at 618 in FIG. 12a;

FIG. 20 is a flow diagram of the zip+4 site polygon check function indicated at 620 in FIG. 12a;

DETAILED DESCRIPTION OF THE PREFERRED EMBODIMENTS

The following detailed description of the preferred embodiments presents a description of certain specific embodiments to assist in understanding the claims. However, the present invention can be embodied in a multitude of different ways as defined and covered by the claims.

Reference is now made to the drawings wherein like numerals refer to like parts throughout.

For convenience, the discussion of the preferred embodiments will be organized into the following sixteen principal sections:

I. System Overview;

II. Routing Example;

III. General Client Table Build Process;

IV. Client Table Build Process for a Radius Defined Service Area;

V. Client Table Build Process for the Service Location Closest to the Caller;

VI. Client Table Build Process for a Polygon Defined Service Area;

VII. Overview of One Table System;

VIII. One Table System Table Build Processes;

IX. Computer-Telephone Integration Network Configuration for One Table System;

X. One Table System Example;

XI. Overview of Real-Time Process System;

XII. Computer-Telephone Integration Network Configuration for Real-Time Process System;

XIII. Real-Time Process: Off-line Process to Build Service Area Windows File;

XIV. Real-Time Process: During Call Process to Build List of Servicing Locations whose Service Areas Encompass the Location of Caller Provided Telephone Number;

XV. Real-Time Process System Example; and

XVI. Summary.

I. System Overview

The present invention includes an automated telephone routing system which receives input from a common carrier, such as AT&T and AT&T American Transtech. This input includes an updated national list of telephone numbers, telecommunication infrastructure, and exception handling support.

A system and method for automatically and seamlessly routing a telephone call from a calling telephone to a destination telephone selected by a client will be described. Optional information about the client service location can be provided to the caller if a particular client so desires. In addition, a method of creating the tables utilized by the routing system, according to criteria established by the client, will also be described.

Figure 1E:
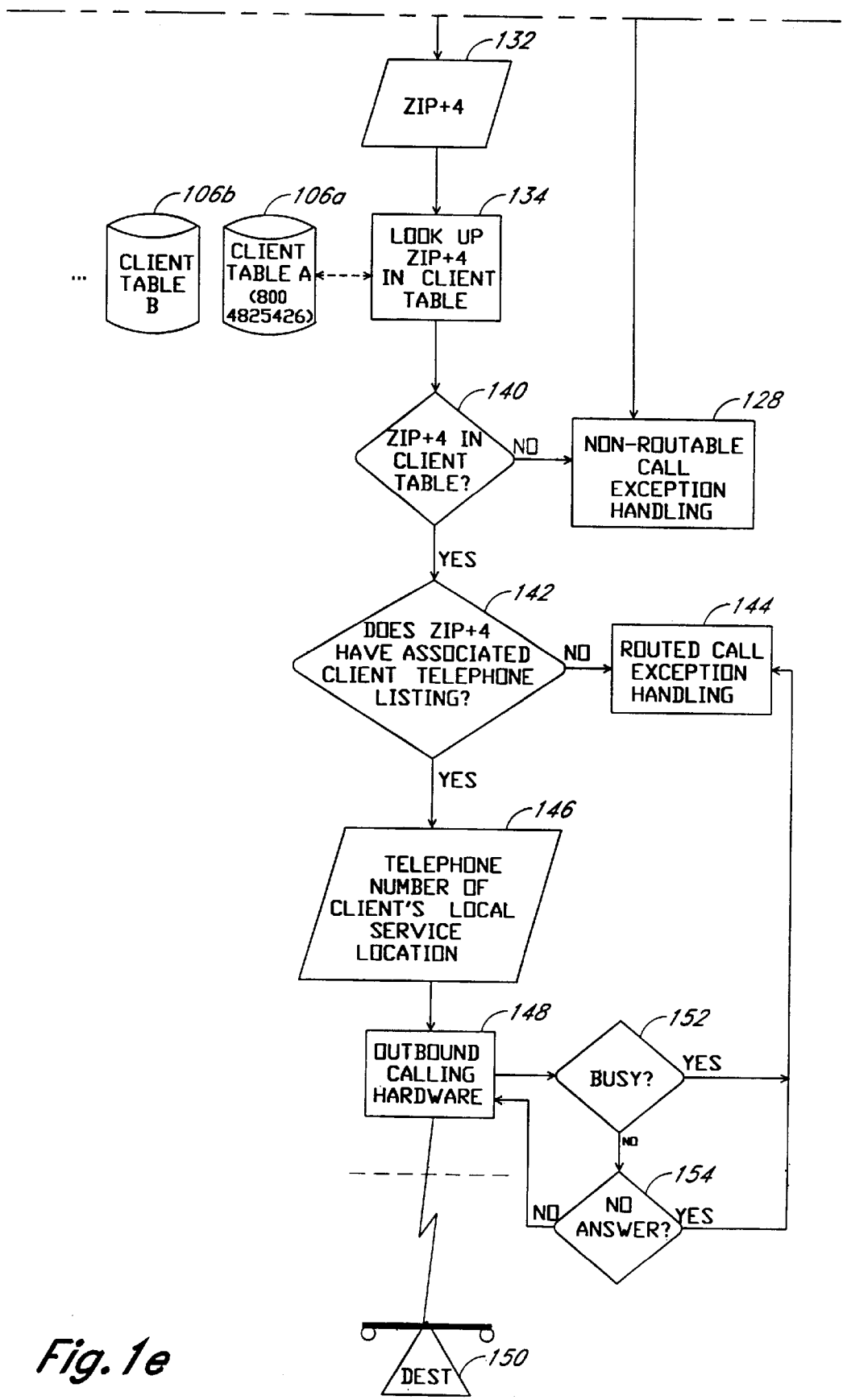

Referring to FIG. 1a, the number of calculations to be performed and permutations that must be tested is reduced in creating the calling telephone number-to-service location telephone number tables used in the "1-800" routing of the present invention. Accordingly, a Zip Windows file 104 (FIG. 1a) and a process 105 to spatially access and operate on this file are a part of the present invention. It will be understood that the Zip Windows file 104 is just one embodiment of a Spatial Windows file which could include different types of spatial keys. The Zip Windows file 104 contains a list of all zip codes that potentially touch a tenth of a degree (0.1°) latitude and longitude spatial window. By utilizing a set of latitude and longitude extremes (minimums and maximums) for a service area in process 105, a list of 5-digit zip codes that could overlap with the service area is generated. It is then only necessary to perform an "inside service area" test for each service location and a small subset of zip+4 codes contained within each service area's returned list of 5-digit zip codes. File 104 and process 105 will be explained further and an example given hereinbelow.

Update problems and costs associated with continually updating and periodically rebuilding a hundred million plus record, telephone number-to-telephone number table for each business or client using the automated telephone routing system is solved by creating a dynamically linked, updatable system. Instead of creating a telephone number-to-telephone number table for each client, two tables linked by zip+4 codes, as shown in FIG. 1b, are created. A telephone number with its corresponding physical street address is assigned to a zip+4 code, and a Master Telephone Number to Zip+4 Table 107 (FIG. 1b) (the "Master Table") is built using the Postal Service's Zip+4 Address Coding Guide, and commercially available software, e.g., CODE-1® (for mainframes and large machines) or AccuMail® (for personal computers or small machines), both available from GROUP 1 Software, Inc. The preferred Master Table, presently maintained by AT&T American Transtech, is indexed or keyed by telephone number, and is updated on a daily basis. When phone numbers are added, changed or deleted, the table is updated. This table is also updated on a periodic basis to handle the approximate one hundred 5-digit zip code changes per quarter year, e.g., when a new zip code is created, telephone numbers in the new code area must be assigned a new zip+4 code. This represents a fairly small amount of change in relation to the 43,000 zip codes (5-digit) in the United States. This table must also be periodically updated to handle NPA-NXX splits. At routing time, the present system allows all clients to use the same Master Telephone Number to Zip+4 Table 107.

Independently, and on an individual client basis, each of over 28 million zip+4 codes is assigned, based on their latitude and longitude centroid coordinates, to one or more service locations using standard "inside service area" determination processes.

Hence, the present invention builds a Client Zip+4 to Service Location Telephone Number Table 106 (the "Client Table", FIGS. 1a and 1b). A different table is built for each client or for every "1-800" telephone number that a client may have. The Client table build process processes one client location record at a time. The routines required to process each record are a function of the location's service area definition: radius or polygon. Once an intermediate Client file is created, the disk storage requirements can be reduced by eliminating locations that are not the closest location to the caller. The building of radius and polygon client table records as well as the post-build process of creating a "closest location" Client file will be described hereinbelow.

The Client Table 106 is then preferably provided to AT&T American Transtech for centralized routing at a call processing center. This table is indexed or keyed by zip+4 code and is updated for each client as they add and delete locations, when they change telephone numbers, and on a periodic basis to handle Post Office zip code changes and telephone network NPA-NXX splits.

Using the presently preferred system, both the Master Table 107 and the Client Tables 106 are independently maintained by separate organizations. Using the zip+4 code as a spatial key linkage, a calling phone number in the Master Table 107 is then dynamically linked, as shown in FIG. 1b, to a service location phone number in the Client Table 106 and the call is automatically routed. The spatial key is a single number that identifies a specific geographically defined area, line, or point that is defined by a set of coordinates. For simple geographies like points and rectangles the spatial key can be a coded version of the coordinate description of the geography.

The postal zip+4 code is the preferred spatial key used to link the master table to the client table, but there are other small geographic areas capable of having unique spatial keys, such as zip+6 code areas, census blocks, or very small latitude/longitude grids, tiles, windows, or quad-trees. This two-table indexing approach provides a much higher automated routing rate and a higher percentage of correctly routed calls in an environment where consumers are continually moving and businesses are opening, closing, and/or moving. In addition, the two-table indexing approach also acts as a "fire wall" or buffer between regulated telephone number information and client marketing information to satisfy government regulations.

The system of the present invention directly routes the telephone call from the caller to the closest service location in approximately 40 milliseconds using the AT&T telecommunications network. The system described by Riskin intercepts the call with a private switch, answers the call with a client recorded message and asks the caller to wait, while it takes approximately 15,000 milliseconds to find the closest service location and then call forwards the call to the service location.

To route a call, the system of the present invention looks up the caller's 10-digit telephone phone number in its 100,000,000 plus record Master Table, retrieves the spatial key that identifies the location of the caller's phone, looks up the spatial key in the 28,000,000 plus record Client Table, and retrieves the telephone number of the location that services the caller's spatial key or location. The system described by Riskin looks up the caller's 6-digit exchange in its 64,000 record Exchange file having only 18,000 unique coordinates, retrieves the V-H (vertical-horizontal) coordinates of the exchange, interleaves the V-H coordinates, and starts a binary-iterative, V-H key based, size search of the N record client service location database. The Riskin system iterates through this process, adjusting the size of the geographic areas searched, until it retrieves a number of service locations that fall within a predetermined range. Riskin then calculates the distance to each service location. If more than one location fits the criteria to be considered the closest distance, one location is randomly selected as the closest service location.

II. Routing Example

Figure 2:
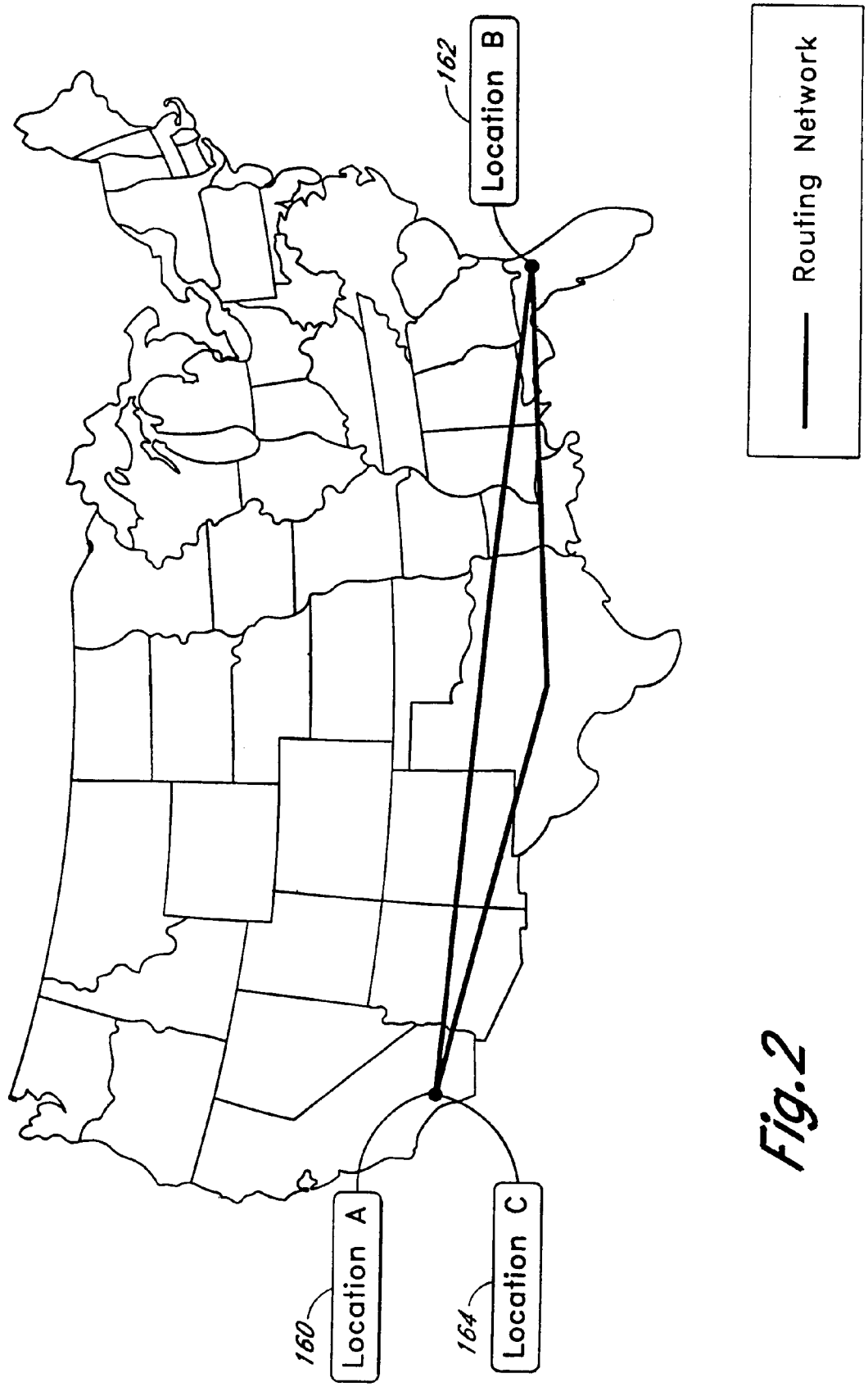
FIG. 2 is a map diagram illustrating an example of a routing network for the system of FIG. 1c.

Prior to discussing the building of Client Tables in more detail, it will be helpful to first discuss use of this table and the Master Table in a "1-800" routing example. Referring to a central switch process 108 shown in FIG. 1c and a routing network shown in FIG. 2, an example of telephone call routing will now be given. In this example, a caller dials 1-800-Italian to order a "MyPizza" pizza from his phone (619-755-5666) located at 498 Stevens Avenue in Solana Beach, Calif. 92075-2064. Of course, the present invention is not limited to use of "800" telephone numbers as other numbers may be used in other embodiments.

FIG. 1c includes process states and also data at 114, 132, and 146, indicated by parallelogram blocks. Also, the central switch process is handled inside a switch as will be described below.

The steps involved in having this call automatically routed to the caller's local MyPizza Restaurant are as follows:

1. A caller at "Location A" 160 (FIG. 2), dials 1-800-Italian at block 110 (FIG. 1c) to order, for example, a pizza.

2. Based on the 1-800 dialed and the caller's long distance carrier, the call is routed by various telephone companies to an intelligent central switch in Jacksonville, Fla., indicated on FIG. 2 by "Location B" 162. The process associated with the switch is shown in FIG. 1c as being below the dotted line just before state 112 and above the dotted line just after state 148. The central switch 111 is preferably a "4 ESS®" digital switch available from AT&T. The switch includes a general purpose computer (not shown) such as a network control point computer with a memory.

3. Once the Jacksonville switch has the call, it pulls the caller's telephone number from the calling information packet 114, by call decoding hardware 112 which performs Automatic Number Identification (ANI). The preferred information packet 114 corresponds to the operation parameter field of the SS7 TCAP message available at the switch 111. The hardware to perform ANI is described in U.S. Pat. No. 5,163,087 to Kaplan, and is hereby incorporated by reference. The number equivalent of 1-800-Italian is 1-800-482-5426, and the information packet looks as follows:

Packet: . . . 6197555666 . . . . 18004825426 . . . .

The "1-800" number is an IN-WATS (inbound wide area telephone service) number and must be translated by a wide area carrier to a POTS (plain old telephone service) number to be routed to the switch 111. Upon receiving the POTS number, the switch 111 translates the number back to the WATS format.

4. Then, at decision state 116, the process 108 determines whether the client has chosen to give the caller an option to enter a telephone number on a Touch Tone telephone keypad or other means. In other embodiments, other characters are entered, such as a credit card number, an account number, or product order information, to enable other features of the system. In the presently preferred embodiment, the telephone number represents the location where the caller desires, for example, a product to be delivered or a service to be performed. As an example, if a client had a telephone number such as 800-FLORIST and desires the optional input feature, the caller could choose to have the flowers delivered to the address corresponding to a caller entered telephone number. If the decision state 116 is determined to be true, the process 108 moves to state 118 to capture the telephone number entered by the caller. This number is then used in place of the calling number in the information packet for further handling. However, if the decision state 116 is determined to be false, the original calling number is unchanged, and the process 108 moves to a decision state 120.

5. At decision state 120, the process 108 determines if the calling number in the information packet is that of a mobile telephone. A file in the computer of the switch 111 listing mobile telephone numbers is presently maintained by AT&T American Transtech and is updated on an as-needed basis. Mobile telephones are assigned a number from a set of prefixes unique to each area code in the U.S. Therefore the Mobile Telephone Number file only needs to contain the area code and prefix combination (6 digits) to identify that the calling number is that of a mobile telephone. Because the mobile telephone user, as determined at decision state 120, is not associated with a fixed location, the process 108 moves to a state 128 for handling non-routable exceptions. An operator will then request location information from the mobile telephone caller. Additional information about state 128 will be provided below. If the caller is not using a mobile telephone, the process 108 continues from state 120 to state 122.

6. At state 122, the process 108 looks up the caller's telephone number preferably using the well-known Indexed Sequential Access Method (ISAM) to index the Master Telephone Number to Zip+4 Table 107 (FIG. 1*b*). ISAM is a well known method of searching described in the book Operating System Concepts by Peterson and Silberschatz. Other searching techniques may be used in other embodiments. The Master Table 107 was described in the System Overview section. As an example, a segment of a Master Table 107 is shown in Table 1. This table is indexed by phone number and also contains the zip+4 code 132 of the physical address where the calling phone is physically located.

TABLE 1

Example: Master Telephone Number to Zip+4 Table segment

| | Phone # | Zip+4 |
|---|---|---|
| | . | . |
| | . | . |
| | 6197555664 | 920751111 |
| | 6197555665 | 920141313 |
| > | 6197555666 | 920752064 |
| | 6197555668 | 920071234 |
| | . | . |
| | . | . |

7. A test is performed at a decision state 126 to determine if the calling number is listed in the Master Table 107. If not, the process 108 moves to state 128 wherein operator assistance is provided to route the call. The non-routable exception handling at state 128 is for situations wherein a Master Table 107 or Client Table (FIG. 1*a*) entry is missing, incorrect, or the caller is using a mobile telephone. In the presently preferred embodiment, operator assistance is provided by AT&T American Transtech. In general, only a small percentage of the calling numbers are not listed in the Master Table 107. If the calling number is listed in the Master Table 107, the process 108 advances to a decision state 130 to determine if there is a zip+4 code 132 corresponding to the calling number in the packet 114. If not, the process 108 moves to state 128 wherein operator assistance is provided to route the call as mentioned previously. If a zip+4 code 132 is located in the Master Table 107, the process 108 moves on to state 134.

8. Since the information packet 114 also contains the number dialed, at state 134 the process 108 opens the Client Zip+4 to Service Location Table A 106*a* that is associated with the client having the telephone number 800-482-5426. The Client Table 106 is selected from a plurality of Client Tables based on the telephone number dialed by the caller. Client Table B 106*b* and additional tables, as necessary, are for other clients or other phone numbers, e.g., another "800" number, of the same client. The Client Tables are built by the assignee of the present invention, the client, or a third party to the assignee's specifications. There are two types of Client Tables. If calls are to be routed to the closest location or to a service location servicing a non-overlapping polygon trade area, the first type of Client Table contains only a single entry per zip+4 code with its corresponding service phone number 146 and distance. In cases where the client wants a random or weighted selection, from multiple selections, whose service areas service the caller or provide the caller a choice, the second type of Client Table can have multiple records per zip+4 code, with each record having a different service telephone number and distance. The process 108 looks up the caller's zip+4 code in the MyPizza Client Table 106*a* using the Indexed Sequential Access Method.

9. A test is performed at a decision state 140 to determine if the zip+4 code 132 is listed in the Client Table 106*a*. If not, the process 108 moves to state 128 wherein operator assistance is provided to route the call. If the zip+4 code is in the Client Table 106a, the process 108 proceeds to a decision state 142 to determine whether there is a client telephone listing for the zip+4 code 132. If not, the process 108 moves to state 144 wherein operator assistance is provided to route the call, provide information, or take other action as determined by the client. A negative test result determined at state 142, may arise, for example, if there is no service location whose service area encompasses the location of the calling party. The exception handling at state 144 is for situations where the call is correctly routed, but the calling party does not get what is expected, i.e., the call is not satisfactorily completed (as in states 142, 152, and 154). In these situations, the client may select from a set of alternatives that can be handled by an automated process. An example exception handling message is as follows: "We are sorry, but there is currently no service location that services your location. If you desire to talk to a representative, please press zero."

If there is a client telephone number associated with the zip+4 code 132, the process 108 advances to state 148. As an example, a segment of Client Table 106*a* is shown in Table 2.

TABLE 2

Example: 800-482-5426 Client Table segment

| | ZIP+4 | Phone # | Distance in miles |
|---|---|---|---|
| | . | . | . |
| | . | . | . |
| | 920752060 | 6199423366 | 3.1456 |
| | 920752062 | 6199423366 | 2.1682 |
| > | 920752064 | 6194817777 | 1.2864 |
| | 920752065 | 6197591111 | 0.1234 |
| | . | . | . |

10. After finding the caller's zip+4 code 132 and the corresponding service telephone number 146, the switch, at state 148, sends the information packet over the telephone network to ring at the telephone associated with the number 619-481-7777.

11. At block 150, the telephone at MyPizza located at 2688 Via De La Valle in Del Mar, Calif. 92014-1909, "Location C" 164 (FIG. 2), rings.

12. If the telephone at the client service location is "busy" 152 or there is "no answer" 154, the process 108 proceeds to the exception handling state 144 as described previously. At the client's request, the exception handling at state 144 may, for instance, route the call to the next closest service location. Otherwise, if the "busy" or "no answer" conditions are false, the telephone call is answered and the caller may, for example, order a pizza.

III. General Client Table Build Process

The process 105 (FIG. 1a) of creating or building a Client Table 106 for each client or each "800", or similar number, for the client will now be described. This process is preferably performed on a general purpose computer, such as an AT&T 3600 UNIX box. As previously mentioned, the present invention includes two types of service area definitions: radius and polygon. How these two definitions are incorporated into the client table build process will be discussed below. In addition, the post-build process of eliminating more distant records from the client table to create a client table containing only the closest service location to a caller will also be discussed. This is used to reduce disk storage in applications where there is no means for providing the caller a choice and only one service location telephone number can be passed to the telecommunications network. An example of the process steps will be given using a fictitious food service business.

The process for each type of service area definition utilizes four input files as shown in FIG. 1a. The Zip+4 Centroid file and Zip Windows file were briefly discussed in the System Overview section. Each input file is now further described. The following discussion again refers to FIG. 1a.

A. Client Service Locations File

The first file is a Client Service Locations file 109 containing a list of service locations provided by the client. The service locations and their service areas are defined by either a latitude/longitude location and a radius or a latitude/longitude location and a latitude/longitude polygon. Further detail about file 109 is provided in conjunction with state 174 of FIG. 3 (radius) and state 604 of FIG. 12a (polygon).

B. Zip+4 Lat Lon Centroid File

The second file is the Zip+4 Latitude and Longitude Centroid file 100 or Zip+4_lat_lon Centroid file previously described. This file is available from the U.S. Postal Service or from, for example, Geographic Data Technology, Inc. (GDT).

C. Zip Array File

The third file is a Zip Array file 103 created from the Zip+4 Latitude and Longitude Centroid file 100 and provides three benefits that improve processing efficiency.

The first benefit is building an array where the row number of the array is equal to a 5-digit zip code. This provides a very efficient method of indexing to a 5-digit zip code where the 5-digit zip code number is the row number of the array.

The second benefit is once the 5-digit zip code is accessed in the array, the exact byte offset of where the first zip+4 code for this 5-digit zip code starts in the Zip+4 Latitude and Longitude Centroid file 100 is known. Using this method, it is very efficient to advance to the location of the first zip+4 record and read all the zip+4 records for a 5-digit zip code in the over 28 million record Zip+4 Latitude and Longitude Centroid file 100.

The third benefit of the Zip Array file 103 is that for each five digit zip code, the file contains the latitude and longitude minimums and maximums for all the zip+4 codes in the 5-digit zip code. By checking to see if a radius or a polygon service area set of extremes overlap with the 5-digit zip code extremes, testing each zip+4 in a 5-digit zip code is eliminated, if it is determined beforehand that there is no spatial overlap between the zip+4 extremes in a 5-digit zip code and the radius or polygon service area.

The Zip Array file 103 is created using the GDT or Post Office supplied Zip+4 Latitude and Longitude Centroid file 100. Each record in the Centroid file 100 contains a zip+4 number, and the latitude and longitude defined centroid for each zip+4. A four step, Zip Array File Build process 101, as follows, is used to create the Zip Array file 103:

1.) A 32-bit integer array of 99,999 rows and 6 columns is initialized to zero. Column one is initialized to the row number which is then utilized as the 5-digit zip code.

2.) For a 5-digit zip code, every zip+4 record in the Zip+4 Latitude and Longitude Centroid file 100 is read in a sequential manner. The byte offset for the first zip+4 within the 5-digit zip code is noted. Temporary variables are initialized and then used to determine the latitude and longitude minimums and maximums of the zip+4 centroids for the current 5-digit zip code. The greatest and least of both the latitudes and longitudes among all zip+4 codes for the current 5-digit zip code are then passed on to the next step.

3.) With each change in 5-digit zip code, the byte offset for the first zip+4 within a 5-digit zip code and the latitude and longitude minimums and maximums for all zip+4 codes within a five digit zip code are written to memory for the previous 5-digit zip code to its location in the Zip Array file 103. The latitude and longitude minimum and maximum values are then reinitialized, and the previous and current steps are repeated with the next 5-digit zip code until the end of the Zip+4 Centroid file 100 is reached.

4.) Upon reaching the end of the Zip+4 Centroid file 100, the last 5-digit zip code record is written to memory, and then the Zip Array file stored in memory is written to a mass storage device such as a magnetic disk.

The column definitions for each row of the Zip Array file 103 are as follows:

column(1) is the 5-digit zip code number;

column(2) is the byte_offset into the Zip+4_lat_lon Centroid file 100 of the location of the lowest numbered zip+4 for the 5-digit zip code of that row;

column(3) is a minimum latitude for the zip code of that row (zip_lat_min);

column(4) is a maximum latitude (zip_lat_max);

column(5) is a minimum longitude (zip_lon_min); and column(6) is a maximum longitude (zip_lon_max).

D. Zip Windows File

The fourth file is the Zip_windows file 104. The purpose of this file is to build a linkage between a latitude and longitude defined area on the earth and the zip codes that could theoretically touch this area. This linkage provides benefit by making spatial computer searches of postal geography much faster and much more efficient.

The Zip_windows file 104 is created from the GDT or Post Office Zip+4 Latitude and Longitude Centroid file 100 using latitude and longitude 5 digit zip code extremes created from the Zip+4 extremes within a 5 digit zip code. The general concept is to divide the earth into one tenth of one degree (0.1°) latitude and longitude rectangles, which, for example, are approximately 6.9 miles by 5.2 miles in dimension at 40° latitude, and then tabulate all zip codes that overlap each rectangle.

The Zip_windows file 104 is created by a Zip Windows File Build process 102 that reads each record from the over 28 million record Zip+4 Centroid file 100 and writes a corresponding record that contains a latitude and longitude (lat/lon) window and a 5-digit zip code. The lat/lon window field is created by multiplying the latitude in degrees times 10, taking the integer portion (INT) of the product, multiplying the integer portion by 10,000, and then adding the integer portion of the product of the longitude in degrees times 10.

For example, if the input zip+4 record is 920141909, the latitude is 32.9862 North and the longitude is 117.2522 West, the output zip_window record would be 3291172 for the lat/lon window and a zip code of 92014. After all records have been written to an initial or temporary Zip_windows file (not shown), the file is then sorted by the lat/lon window value or key with the corresponding 5-digit zip code, and duplicate records are eliminated. The resultant final Zip_windows file 104 is then written with each record composed of the lat/lon window key and the corresponding 5-digit zip code. Four lat/lon windows 210, 212, 214, 216, corresponding respectively to zip window keys 3301172, 3301171, 3291172, 3291171, are illustrated in FIG. 4.

Now that the input files utilized by the Client Table Build process have been described, each of the three different service area definition build processes will be described.

IV. Client Table Build Process for a Radius Defined Service Area

Figure 3:
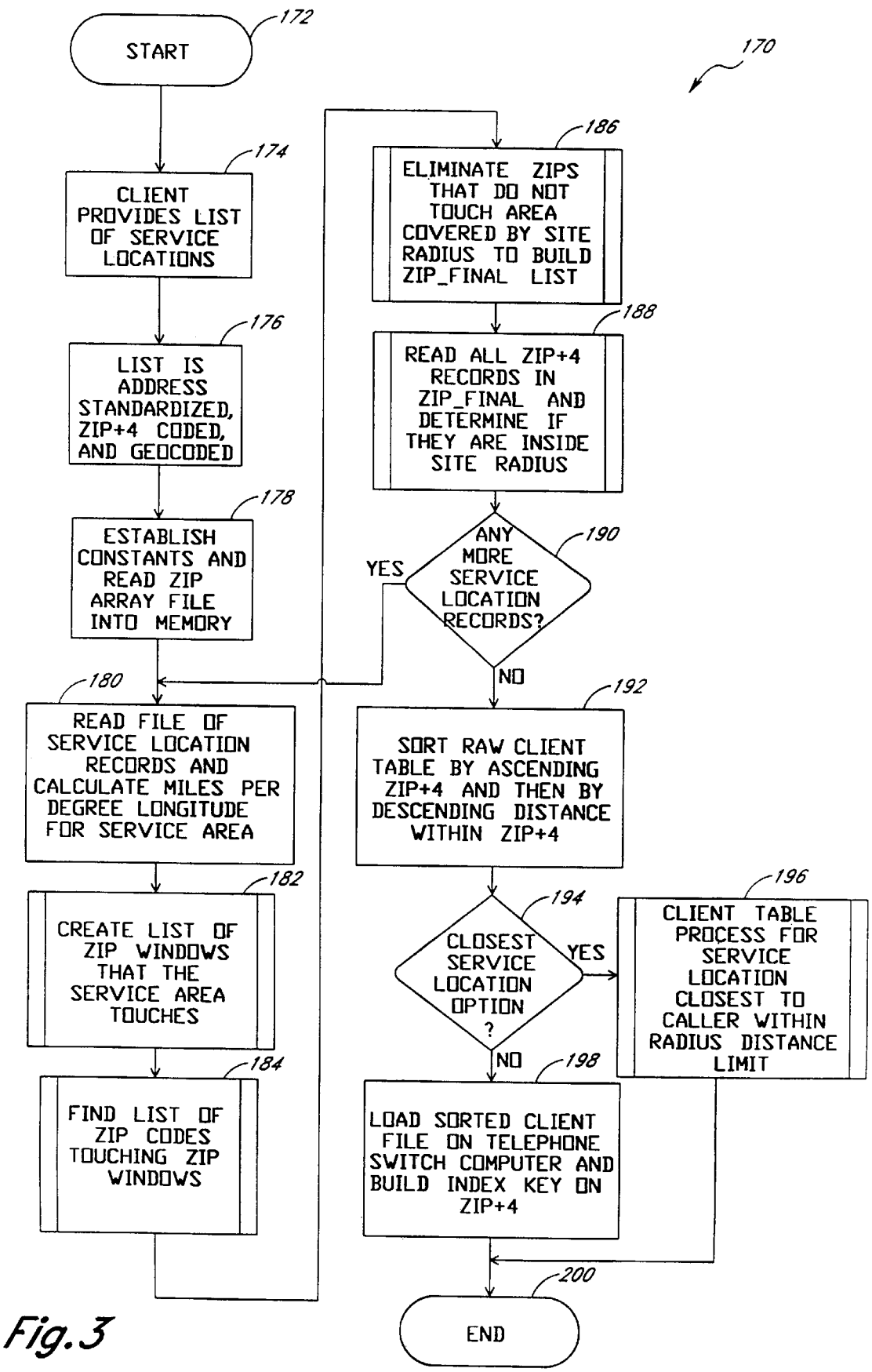
FIG. 3 is a top-level flow diagram of a process to build a Client table using radius defined service areas for the system of FIG. 1c.
Figure 4:
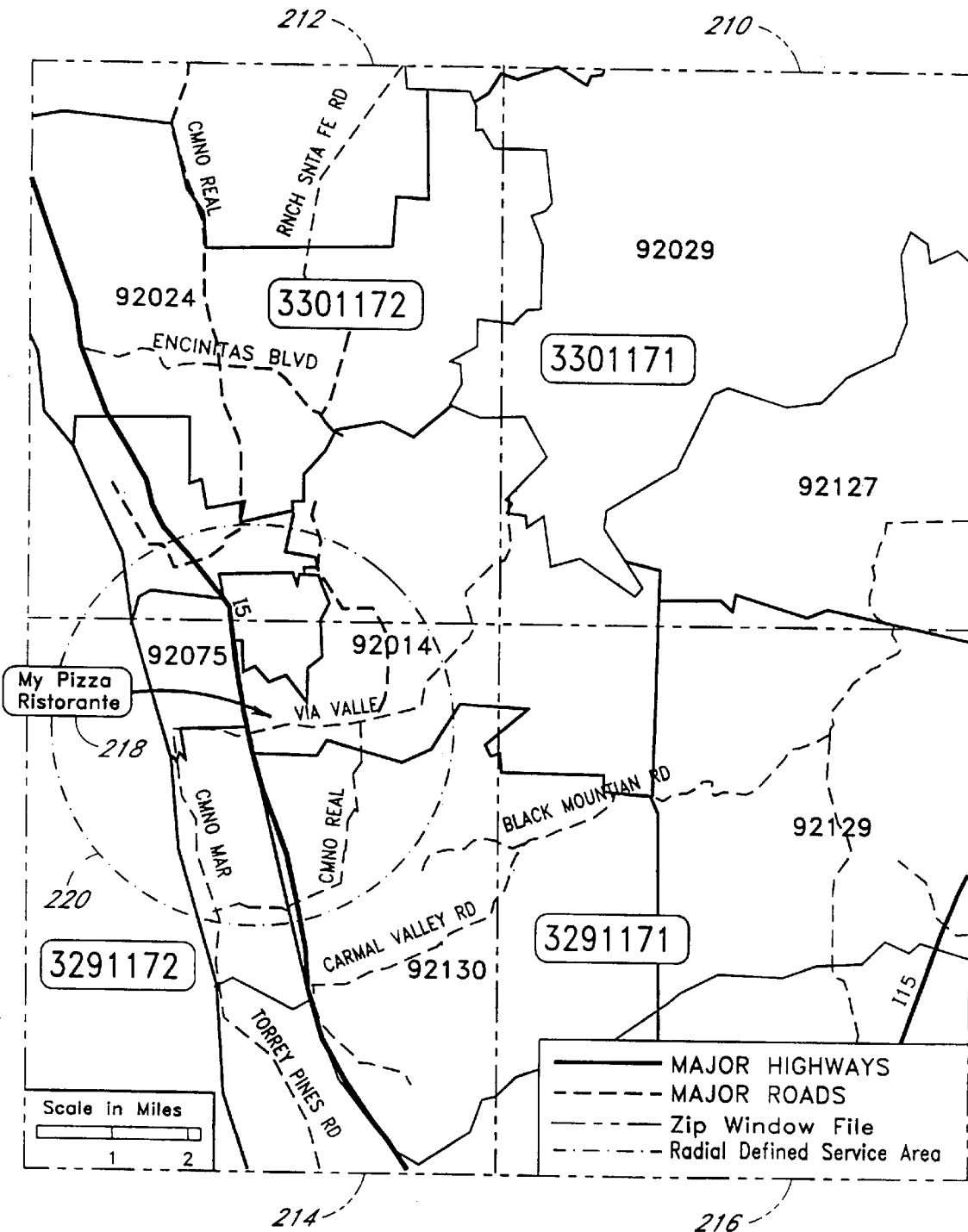
FIG. 4 is a map diagram illustrating an example area utilized in the description of the process shown in FIG. 3.

Referring generally to FIGS. 3 and 4, a Client Table Process 170 for a radius defined service area will be described. Process 170 is a specific version of the client table build process 105 shown in FIG. 1*a*.

The process 170 begins at a start state 172 and moves to state 174 wherein a client provides a Client Service Locations file 109 (FIG. 1*a*) of service locations in machine readable form with information and format as shown in Table 3. The file 109 can be created by, for example, a commonly available word processing program or a database program, and submitted on a floppy disk or other suitable media. Table 3 includes example information for a service location 218 named MyPizza Ristorante. The map of FIG. 4 illustrates some of the same information including a circle 220 to show a 2.5 mile radius from the MyPizza Restaurant as the service area.

TABLE 3

Record layout in ASCII Characters

| | |
|---|---|
| Name of Service Location (30) Bytes | : MyPizza Ristorante |
| Address (36) Bytes | : 2688 Via De La Valle |
| City (30) Bytes | : Del Mar |
| State (2) Bytes | : CA |
| Zip Code (9) Bytes | : 92014 |
| Telephone # (10) Bytes | : 6194817777 |
| Radius in tenths of miles (4) Bytes | : 25 |

Of course, other forms, information, and formats may be substituted in other embodiments.

The process 170 moves to state 176 wherein the list of service locations in file 109 is address standardized, zip+4 coded, and latitude and longitude geocoded using commercially available services through companies such as Group I and Geographic Data Technology. Table 4 is an example of a standardized record with latitude and longitude appended.

TABLE 4

| | |
|---|---|
| Name of Service Location (30) Bytes | : MYPIZZA RISTORANTE |
| Address (36) Bytes | : 2688 VIA DE LA VALLE |
| City (30) Bytes | : DEL MAR |
| State (2) Bytes | : CA |
| Zip Code (9) Bytes | : 920141909 |
| Telephone # (10) Bytes | : 6194817777 |
| Radius in tenths of miles (4) Bytes | : 25 |
| Latitude in degrees (10) Bytes | : 32.9862 |
| Longitude in degrees (12) Bytes | : −117.2522 |

Moving to state 178, the process 170 establishes the constant of 68.9404 miles per degree latitude and reads the Zip Array file 103 (FIG. 1*a*) into memory of the computer. At state 180, the process 170 reads a record from the file of service location records and calculates the number of miles per degree longitude for the service location. The miles per degree longitude=68.9404 * COSINE(latitude). For the example given in Table 4, at 32.9862 degrees latitude, the result is 57.8297 miles per degree longitude.

The process 170 proceeds to a function 182 which creates a list of zip windows that the service location touches. Touching a zip window means that at least part of the service area is in or overlaps the zip window. The zip windows 210, 212, 214, 216 for the example given in Table 4 are illustrated in FIG. 4. The function 182 will be further described in conjunction with FIG. 5 hereinbelow.

Moving to a function 184, the process 170 generates a list of 5-digit zip codes that touch any of the zip windows identified by function 182. This zip list is sorted in ascending order and duplicate zip codes are removed in the function 184. The function 184 will be further described in conjunction with FIG. 7 hereinbelow.

The process 170 proceeds to a function 186 wherein 5-digit zip codes that are not within the service location site radius specified in state 174 are removed from the zip list generated by function 184, and a zip final list is created. The function 186 will be further described in conjunction with FIG. 9 hereinbelow.

Advancing to function 188, the process 170 retrieves all the zip+4 records corresponding to the zip codes in the zip final list (generated by function 186), used in conjunction with a zip pointer list (also generated by function 186), and determines if the zip+4 is at or inside the service area radius. This determination also yields the distance from the service location to the zip+4 centroid (recalling that the zip+4 centroids are stored in the Zip+4 Centroid file 100). If the zip+4 is determined to be at or inside the service area radius, a raw Client Table record is written that includes the zip+4 code, the client telephone number for the instant service location, and the distance of the zip+4 centroid to the service location. The function 188 will be further described in conjunction with FIG. 10 hereinbelow.

The process 170 moves to a decision state 190 to determine if additional client service records are to be processed. If so, the loop of states 180 to 188 is repeated for the next service location record. If all service location records have been processed for the instant Client Table, the process 170 advances to state 192. At state 192, the process 170 sorts the raw records, written by function 188, by ascending zip+4 code and then by descending distance if the same zip+4 code is listed more than once. The same zip+4 code could be listed more than once if there are multiple service locations whose service areas overlap the zip+4.

Moving to a decision state 194, a determination is made if the client has selected the post-build option of generating the client table for the service locations closest to the caller. If not, the client table build process is complete except for loading the file to the production system computer at state 198. However, if the client has selected the post-build option of "closest service location", as determined at decision state 194, the process 170 moves to a function 196 to finish the Client Table build process. The function 196 will be further described in conjunction with FIG. 11 hereinbelow.

If the client has not selected the "closest location" option at decision state 194, the process 170 moves to a state 198 wherein the sorted Client Table from state 192 is loaded into the computer in the telephone network switch 111 (FIG. 1*c*), and an index key on the zip+4 codes is built. Upon completion of either function 196 or state 198, the Client Table build process ends at state 200.

Figure 5:
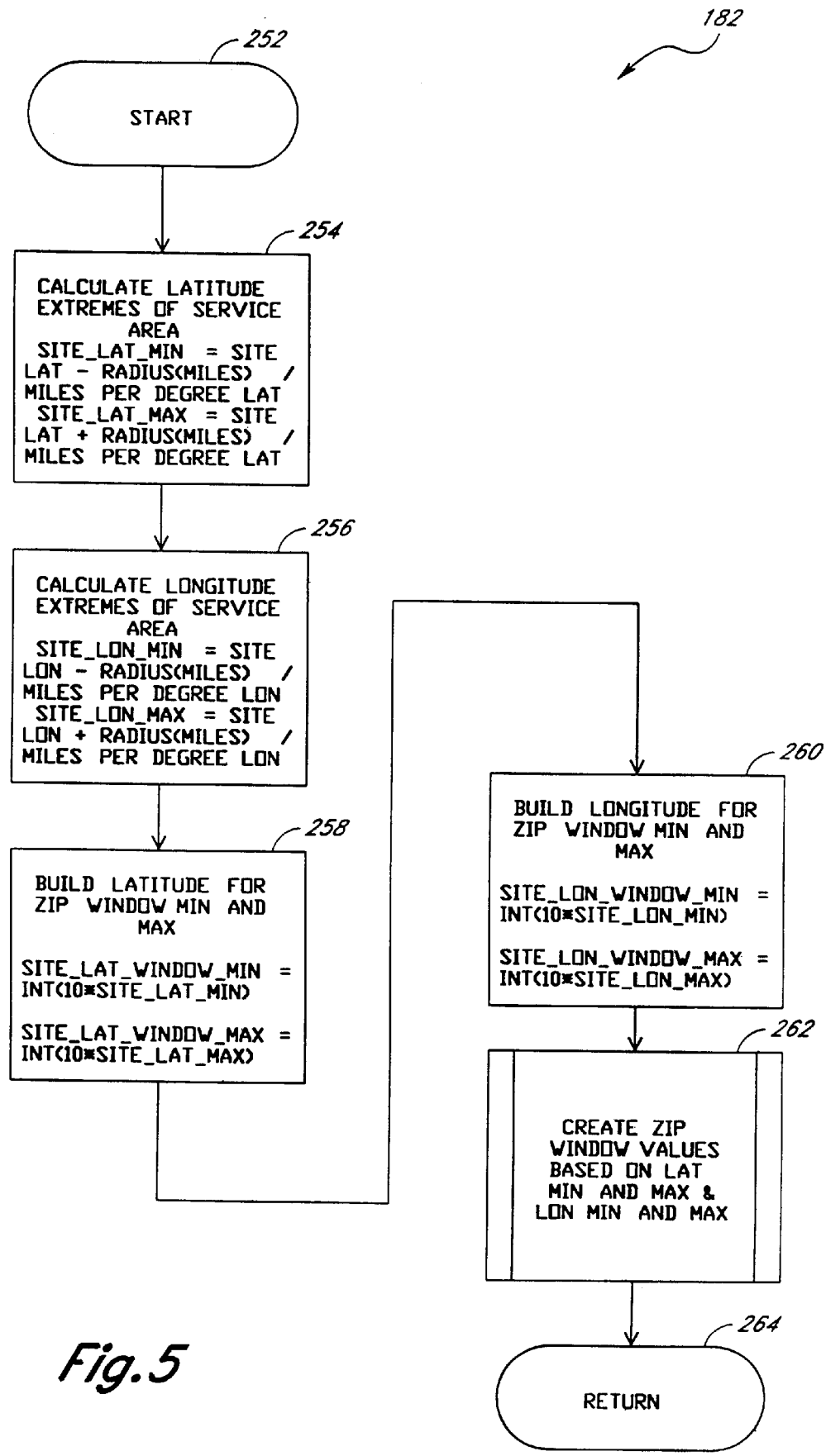
FIG. 5 is a flow diagram of the zip window list function indicated at 182 in FIG. 3.

Referring generally to FIG. 5, the function 182 defined in FIG. 3 will be described. Function 182 generates a list of zip windows that the site touches by first calculating site latitude and longitude extremes. For this calculation, the absolute value is used for both the latitude and longitude.

In another embodiment of the present invention, a prefix is assigned to the window key based on the sign of the latitude or longitude. The United States is located in the Northwest quadrant, and the key for this quadrant is zero(0). A leading zero has no impact on the value of the numeric key. The other quadrants are Northeast, east of the prime meridian at Greenwich, England in the Northern hemisphere; Southwest, west of the prime meridian in the Southern hemisphere; and Southeast, east of the prime meridian in the Southern hemisphere.

Since almost all countries of the world are only in one quadrant, using the absolute value of the latitude and longitude works well. In the few countries that are exceptions (that are in two quadrants), a different coordinate system may be used, e.g., the Ordinance Survey system used in the United Kingdom.

Beginning at a start state 252 shown in FIG. 5, the process 170 moves to a state 254 to calculate latitude extremes of the service area. Several abbreviations will be used herein forward: "min" for minimum, "max" for maximum, "lat" for latitude, "lon" for longitude and "site" for the site or location of the service location. Site_lat_min=site_lat−radius (miles)/miles per degree lat; Site_lat_max=site_lat+radius (miles)/miles per degree lat.
Computation for the example service location and radius given in Table 4 yields:

Site_lat_min=32.9862−2.5/68.9404=32.9499;

Site_lat_max=32.9862+2.5/68.9404=33.0228.

The process continues at state 256 wherein longitude extremes of the service area are calculated:

Site_lon_min=site_lon−radius(miles)/miles per degree lon;

Site_lon_max=site_lon+radius(miles)/miles per degree lon.

Computation for the example service location and radius given in Table 4 yields:

Site_lon_min=117.2522−2.5/57.8297=117.2089;

Site_lon_max=117.2522+2.5/57.8297=117.2954.

Moving to states 258 and 260, the process 170 builds values for zip window minimum and maximum based on the site latitude and longitude, respectively.
Computation using the above example and results yields:

Site_lat_window_min=Int(10*site_lat_min)=329;

Site_lat_window_max=Int(10*site_lat_max)=330;

Site_lon_window_min=Int(10*site_lon_min)=1172;

Site_lon_window_min=Int(10*site_lon_max)=1172.

Moving to a function 262, the process 170 generates zip windows based on latitude min and max values, and longitude min and max values and stores them in a zip_windows_list, which is distinct from the Zip_windows file 104 (FIG. 1a). Function 262 will be further described below in conjunction with FIG. 6. The function 182 returns at state 264 to FIG. 3.

Figure 6:
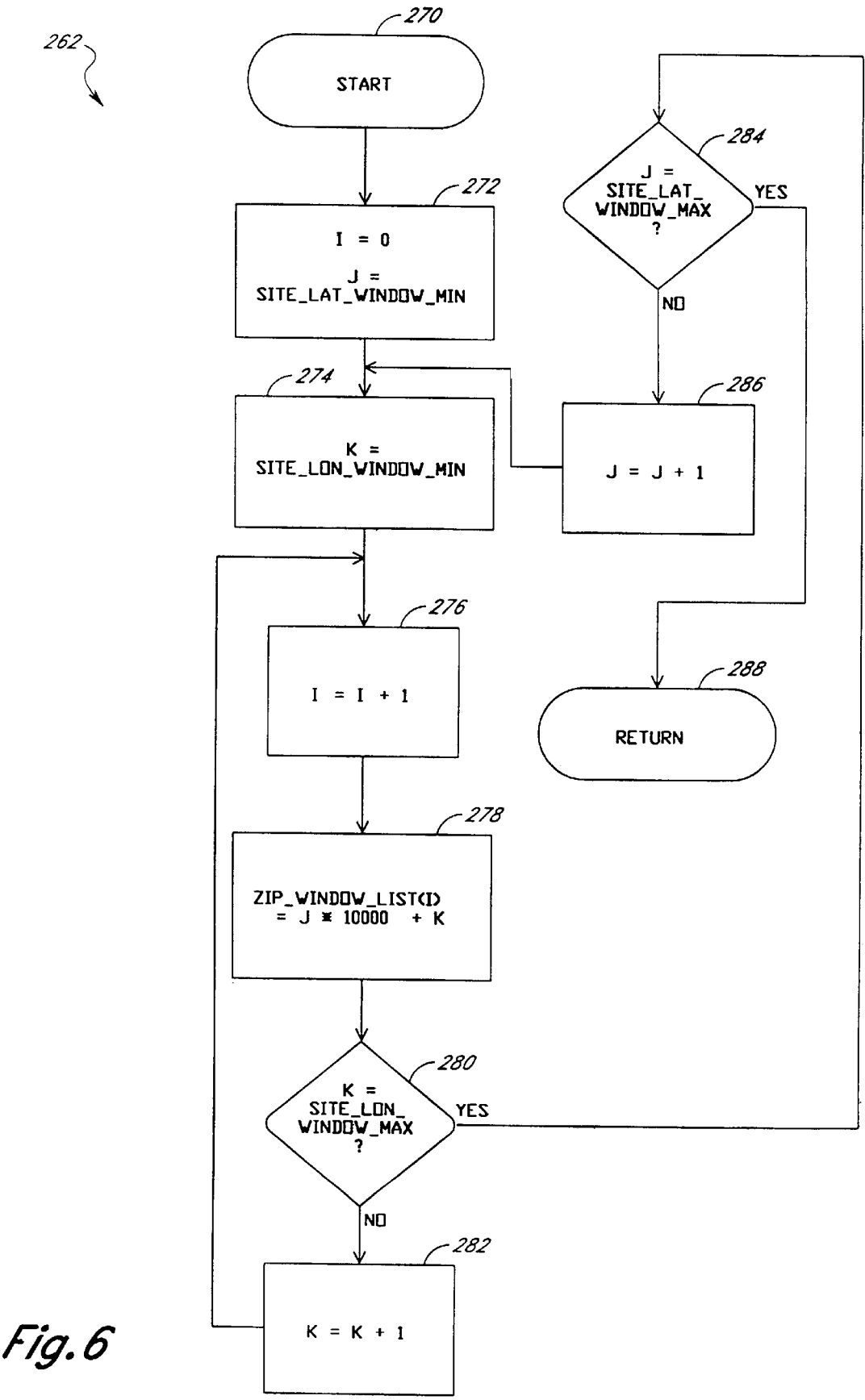
FIG. 6 is a flow diagram of the zip windows function indicated at 262 in FIG. 5.

Referring to FIG. 6, the function 262 defined in FIG. 5 will be described. Function 262 builds the actual zip_window_list for the service location. The function begins at a start state 270 and moves to state 272 wherein the variable I is set to equal zero (0), and the variable J is set to equal the value for the site latitude window minimum. After the initialization of state 272, the process 170 moves to state 274 wherein the variable K is set equal to the value for the site longitude window minimum. Moving to state 276, the value of variable I is incremented by one.

At state 278, a value of the zip_window_list, identified or addressed by the value of variable I, is calculated as the value of the variable J multiplied by 10000 and then adding the value of variable K. State 280 determines whether the value of K has reached the maximum value, and if not, the value of K is incremented by one (1) at state 282, and a loop to state 276 is performed. If K has reached the maximum site longitude value, the process 170 continues at state 284 to determine whether the value of J has reached the maximum value, and if not, the value of J is incremented by one (1) at state 286, and a loop to state 274 is performed. If J has reached the maximum site latitude value, the function 262 returns at state 288 to FIG. 5.

Continuing the example given in conjunction with FIG. 5, the result of function 262 is as follows:

Zip_window_list(1)=3291172

Zip_window_list(2)=3301172

Figure 7:
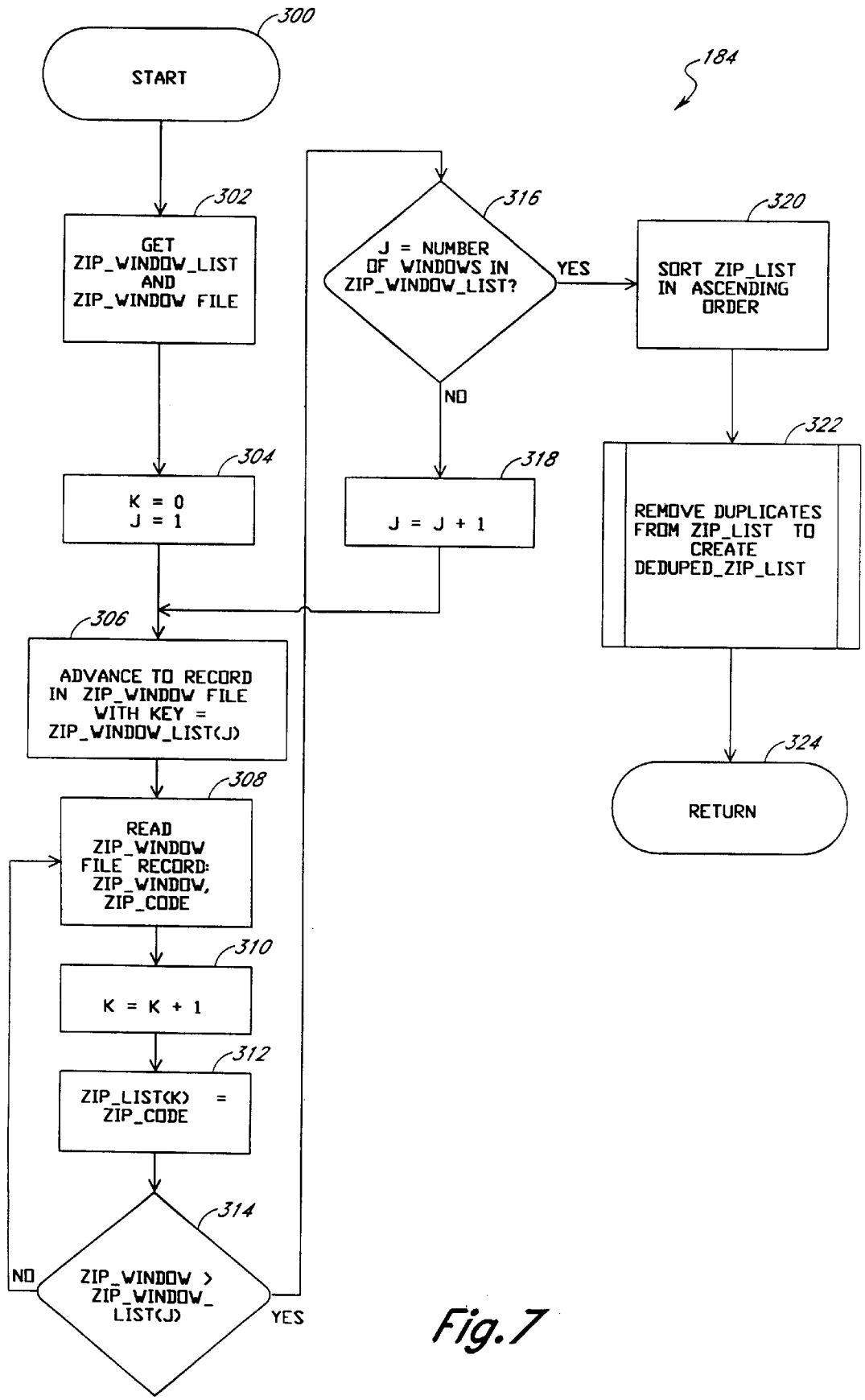
FIG. 7 is a flow diagram of the initial zip list function indicated at 184 in FIG. 3.

Referring to FIG. 7, the function 184 defined in FIG. 3 will be described. Function 184 generates a list of 5-digit zip codes touching the zip windows identified by function 182 (FIG. 5). Beginning at a start state 300, the process 170 moves to a state 302 and retrieves the Zip_windows file 104 (FIG. 1a) previously described and the zip_$_{window}$_list from function 182. The Zip_windows file 104 is indexed by the zip_window key and contains a list of all zip codes that touch the zip window. A sample of the Zip_windows file 104 is given in Table 5, which corresponds with FIG. 4.

TABLE 5

| Window | Zip_code |
|---|---|
| . | . |
| 3291172 | 92014 |
| 3291172 | 92075 |
| 3291172 | 92130 |
| . | . |
| 3301172 | 92007 |
| 3301172 | 92014 |
| 3301172 | 92024 |
| 3301172 | 92029 |
| 3301172 | 92075 |
| . | . |
| . | . |

Continuing at state 304, the process 170 initializes the variable K to the value of zero (0) and the variable J to the value of one (1). Then at state 306, the process 170 advances to the record in the Zip_windows file 104 having the key equivalent to the value of the zip_window_list addressed by the variable J. At state 308, the record accessed at state 306 is read to get the zip_window and the associated zip code. Moving to state 310, the variable K is incremented by one (1), followed by state 312 wherein zip code read at state 308 is written to a zip_list addressed by the variable K. A check is then made at a decision state 314 to determine if the value of the zip_window from state 308 is greater than the value of the zip_window_list addressed by the variable J. If not, the next record in the Zip_windows file 104 is read by looping back to state 308.

If the decision state 314 test is true, the process moves to a decision state 316 to determine if the value of J is equivalent to the number of windows in the zip_window_list. If not, the value of J is incremented by one (1) and a loop back to state 306 is performed to process the next window. If the decision state 316 is true, all windows in the zip_window_list have been processed, and the function 184 continues at state 320 wherein the zip_$_{list\ of}$5-digit zip codes is sorted in ascending order. For the continuing example, after state 320, the zip_list appears as follows:

92007

92014

92014

92024

92029

92075

92075

92130

Moving to a function 322, the process 170 removes duplicate entries in the zip_list to generate a deduped_zip_list. Function 322 will be further described in conjunction with FIG. 8 below. The function 184 returns at state 324 to FIG. 3.

Figure 8:
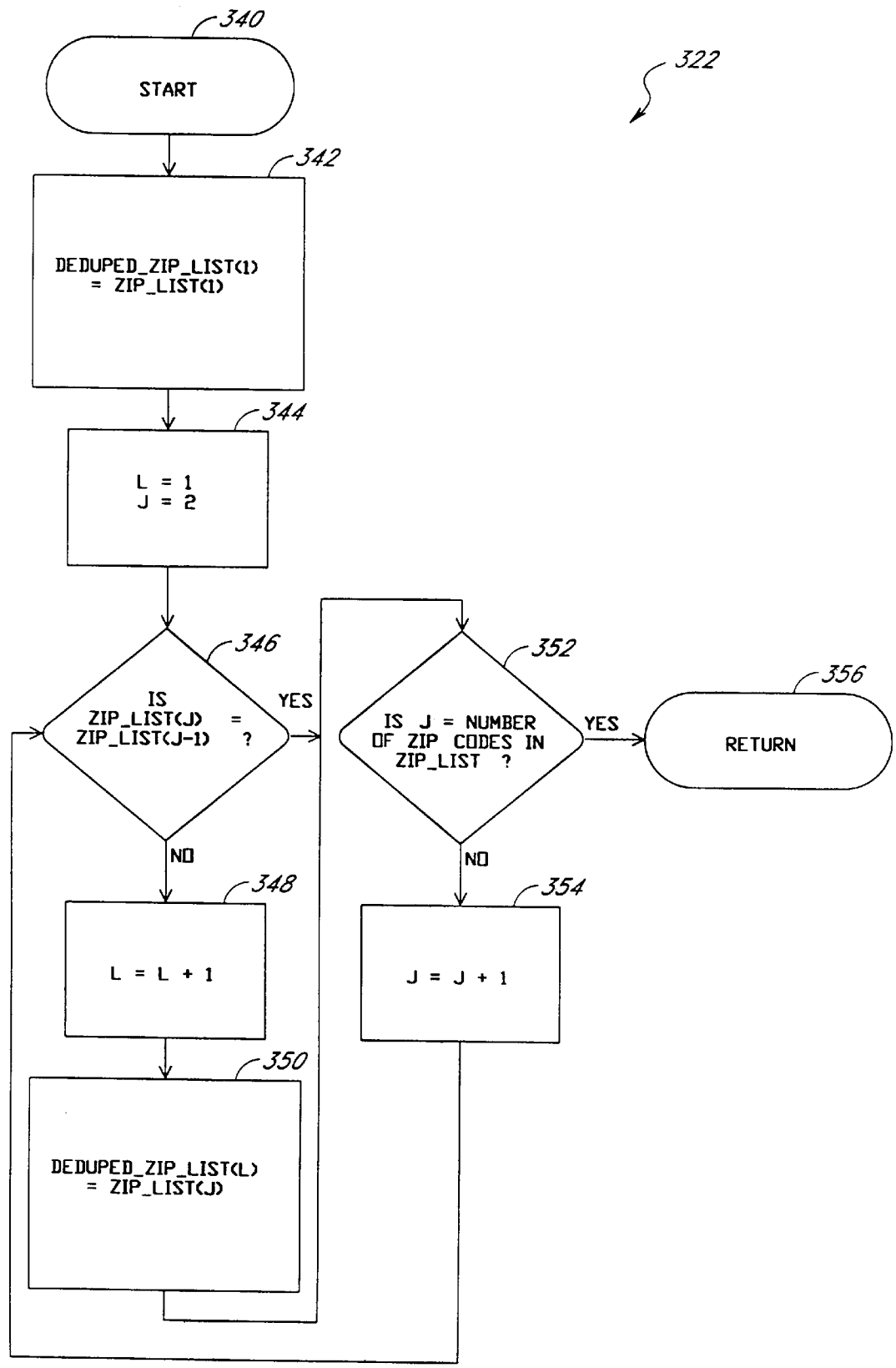
FIG. 8 is a flow diagram of the remove duplicates from zip list function indicated at 322 in FIG. 7.

Referring to FIG. 8, the function 322 defined in FIG. 7 will be described. Function 322 removes duplicate 5-digit zip codes from the zip_list as sorted in state 320 of FIG. 7. Beginning at a start state 340, the process 170 moves to a state 342, and the first entry of zip_list is defined to be the first entry of a deduped_zip_list. Proceeding to state 344, a variable L is assigned the value of one (1) and a variable J is assigned the value of two (2). Then at a decision state 346, the process 170 determines whether the value of zip_list addressed by J is equivalent to the value of zip_list addressed by "J minus one". If not, variable L is incremented by one at state 348, and the next entry in deduped_zip_list as addressed by L is written to be equivalent to the entry in the zip_list as addressed by J.

If the decision state 346 is false or at the completion of state 350, the process 170 moves to a decision state 352 to determine if the value of variable J is equal to the number of zip codes in the zip_list. If not, variable J is incremented by one at state 354, and the process 170 loops back to state 346 to check the next entry in zip_list. However, if all zip codes in zip_list are checked, as determined by state 352, the function 322 returns at state 356 to FIG. 7. For the continuing example, the deduped_zip_list at the completion of function 322 is as follows:

92007

92014

92024

92029

92075

92130

Figure 9:
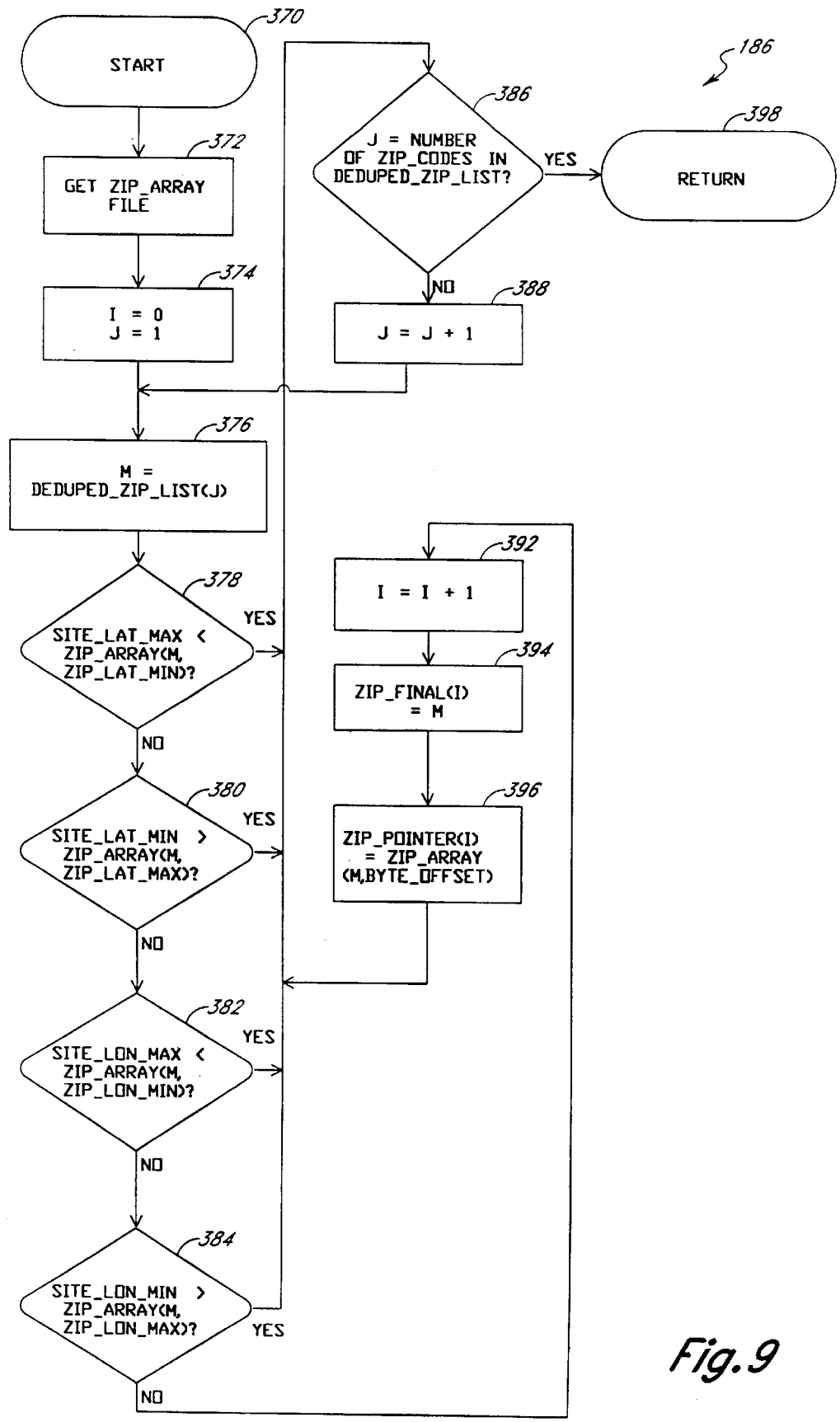
FIG. 9 is a flow diagram of the final zip list function indicated at 186 in FIG. 3.

Referring to FIG. 9, the function 186 defined in FIG. 3 will be described. Function 186 builds a zip_final list and a zip_pointer list by checking zip boundary extremes and getting an offset to the start of the Zip+4_lat_lon Centroid file 100 (FIG. 1a) from the Zip Array file 103. This procedure eliminates zip codes that do not touch the area covered by the radius of the service area. Beginning at a start state 370, the process 170 moves to a state 372 and accesses the Zip Array file 103 (FIG. 1a). Function 186 utilizes all columns, as previously described, of the Zip Array file 103 (FIG. 1a). Moving to state 374, variable I is set to a value of zero, and variable J is set to a value of one. Proceeding to state 376, variable M is set equivalent to the entry in deduped_zip_list, from function 184, addressed by J.

Using the site information calculated in Function 182 and the information from the zip array table, a series of checks are performed by decision states 378 to 384. At decision state 378, the process 170 determines whether the site_lat_max is less than the zip_lat_min for the Zip Array file entry addressed by the variable M. If so, the process 170 moves to a decision state 386. If not, the process continues at decision state 380. At decision state 380, the process 170 determines whether the site_lat_min is greater than the zip_lat_max for the Zip Array file entry addressed by the variable M. If so, the process 170 moves to decision state 386. If not, the process continues at decision state 382.

At decision state 382, the process 170 determines whether the site_lon_max is less than the zip_lon_min for the Zip Array file entry addressed by the variable M. If so, the process 170 moves to decision state 386. If not, the process continues at decision state 384. At decision state 384, the process 170 determines whether the site_lon_min is greater than the zip_lon_max for the Zip Array file entry addressed by the variable M. If so, the process 170 moves to decision state 386. If not, the process continues at state 392. To get to state 392, a determination has been made that the zip code does touch the area covered by the radius of the site. At state 392, variable I is incremented by one, and at state 394, the process 170 writes the value of M to the zip_final list entry addressed by I. Moving to state 396, the process 170 writes the value of byte_offset from the Zip Array file entry addressed by the variable M to the zip_pointer list entry addressed by I, and the process moves to state 386.

If any of the decision states 378 to 384 is true, the current zip code entry from deduped_zip_list is not further used. At decision state 386, a determination is made whether all entries in the deduped_zip_list have been checked. If not, J is incremented by one at state 388, and the process 170 loops back to state 376 to check the next entry. If all entries have been checked as determined by state 386, the function 186 returns at state 398 to FIG. 3. For the continuing example, the zip_final list at the completion of function 186 is as follows:

92007

92014

92075

92130

Figure 10:
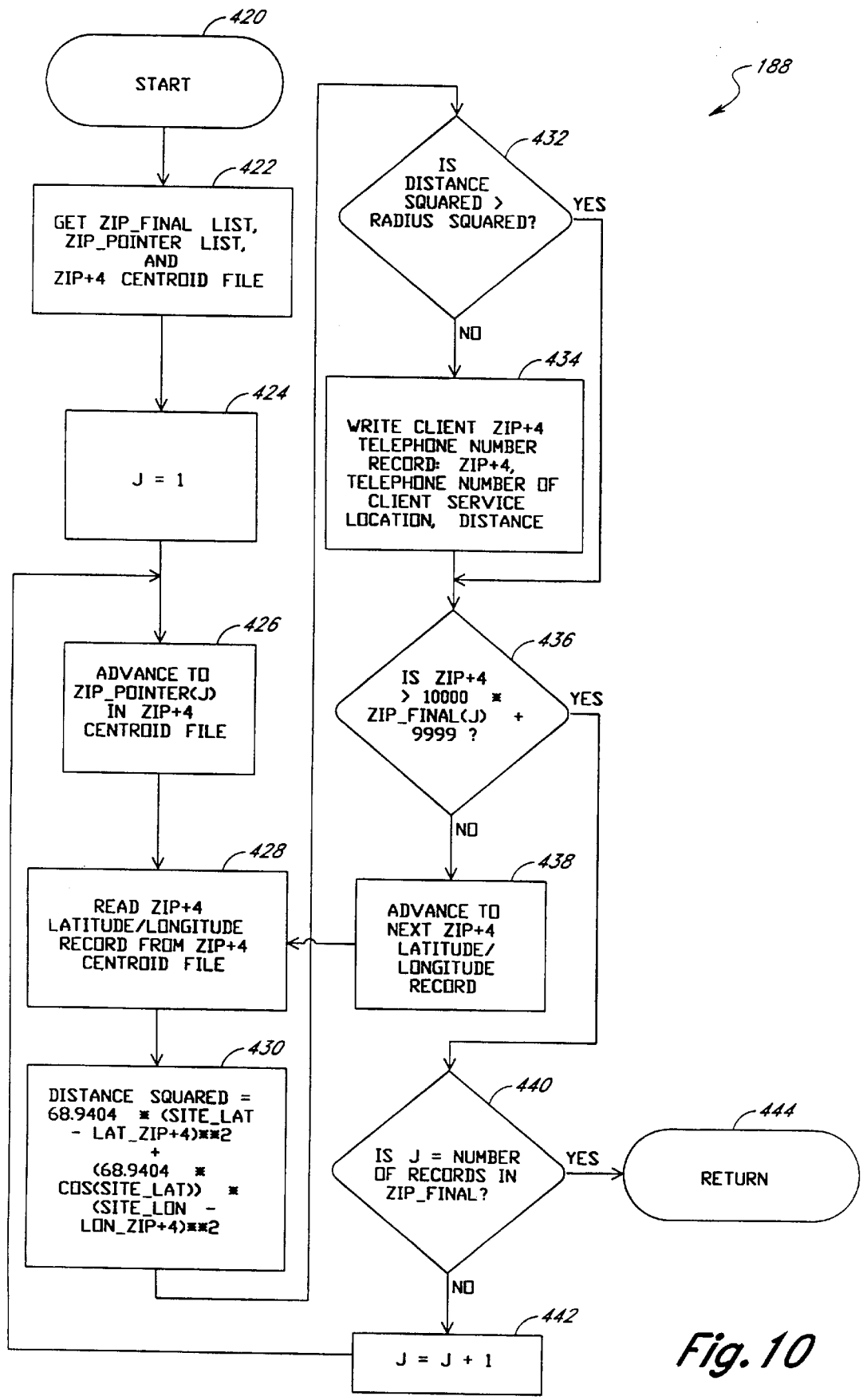
FIG. 10 is a flow diagram of the zip+4 site radius check function indicated at 188 in FIG. 3.

Referring to FIG. 10, the function 188 defined in FIG. 3 will be described. Function 188 reads all zip+4 records as identified by the combination of the zip_final list and zip_pointer list, and determines if the zip+4 centroids are inside the site radius. Beginning at a start state 420, the process 170 moves to a state 422 and gets the zip_final list, the zip_pointer list, and the Zip+4 Centroid file 100. At state 424, variable J is set to a value of one. Moving to state 426, the process 170 advances in the Zip+4 Centroid file to the address contained in the zip_pointer list addressed by the variable J. Then, at state 428, the zip+4 latitude/longitude record is read at the address from state 426. The Zip+4 Centroid file 100 (FIG. 1a) is sorted in ascending zip+4 order, and each record in this file contains three fields: zip+4 code, latitude in degrees, and longitude in degrees. Moving to state 430, the process 170 calculates the distance from the service location to the zip+4 centroid. The site latitude and longitude are available from state 176 while the zip+4 latitude and longitude are available from state 428. Moving to state 432, the process 170 determines if the distance squared from state 430 is greater than the radius squared (which is available from state 174). If not, the zip+4 code is inside the site radius, and the process 170 moves to state 434 to write a raw client table zip+4 telephone number record. This record contains the zip+4 code, the telephone number of the client service location, and the square root of the distance squared.

If the distance squared is greater than the radius squared, the zip+4 code is outside the site radius, and the process moves to a decision state 436. At state 436, the process 170 determines if the current zip+4 code is greater than 10000 times the value of the zip_final list entry addressed by the variable J plus 9999. The current zip+4 is compared to a value for the highest possible numbered zip+4 for the current zip code by appending 9999 to the 5-digit zip code. For example, if the zip code is 92007, the highest possible number for a zip+4 for this zip code is 920079999. While reading the zip+4 records for zip code 92007, if the zip+4 record read is greater than 920079999, then the end of zip+4 records for the 92007 zip code is passed, and the process 170 moves to the next zip code in the zip_final list. If the decision state 436 is false, the process 170 moves to state 438 and advances to the next zip+4 record for the same 5-digit zip code in the Zip+4 Centroid file 100. The next record is read by looping back to state 428.

If decision state 436 is true, the process 170 moves to a decision state 440 to determine if all records in the zip_final list have been read. If not, the variable J is incremented by one at state 442, and the process loops back to state 426 and repeats the procedure for the next 5-digit zip code in the zip_final list. If all 5-digit zip codes have been processed as determined by state 440, the function 188 returns at state 444 to FIG. 3. For the continuing example, a sample record of the raw Client table at the completion of state 434 is as follows:

Sample record: 920752064 6194817777 1.2865.

V. Client Table Build Process for the Service Location Closest to the Caller The "closest" process, function 196 (FIG. 3), is a post-build process for building a Client Table 106 created from radius defined service areas, polygon defined service areas or a mix of both types of service areas. The primary functions of the "closest" process are to reduce disk storage and clean up polygon digitizing errors that create minor overlaps in non-overlapping service areas. States 172 to 194 (FIG. 3) in the radius process or states 602 to 624 (FIG. 12a) in a polygon process must be completed to create an intermediate client table that can be reduced in size and or cleaned up by the post-build process 196.

Figure 11:
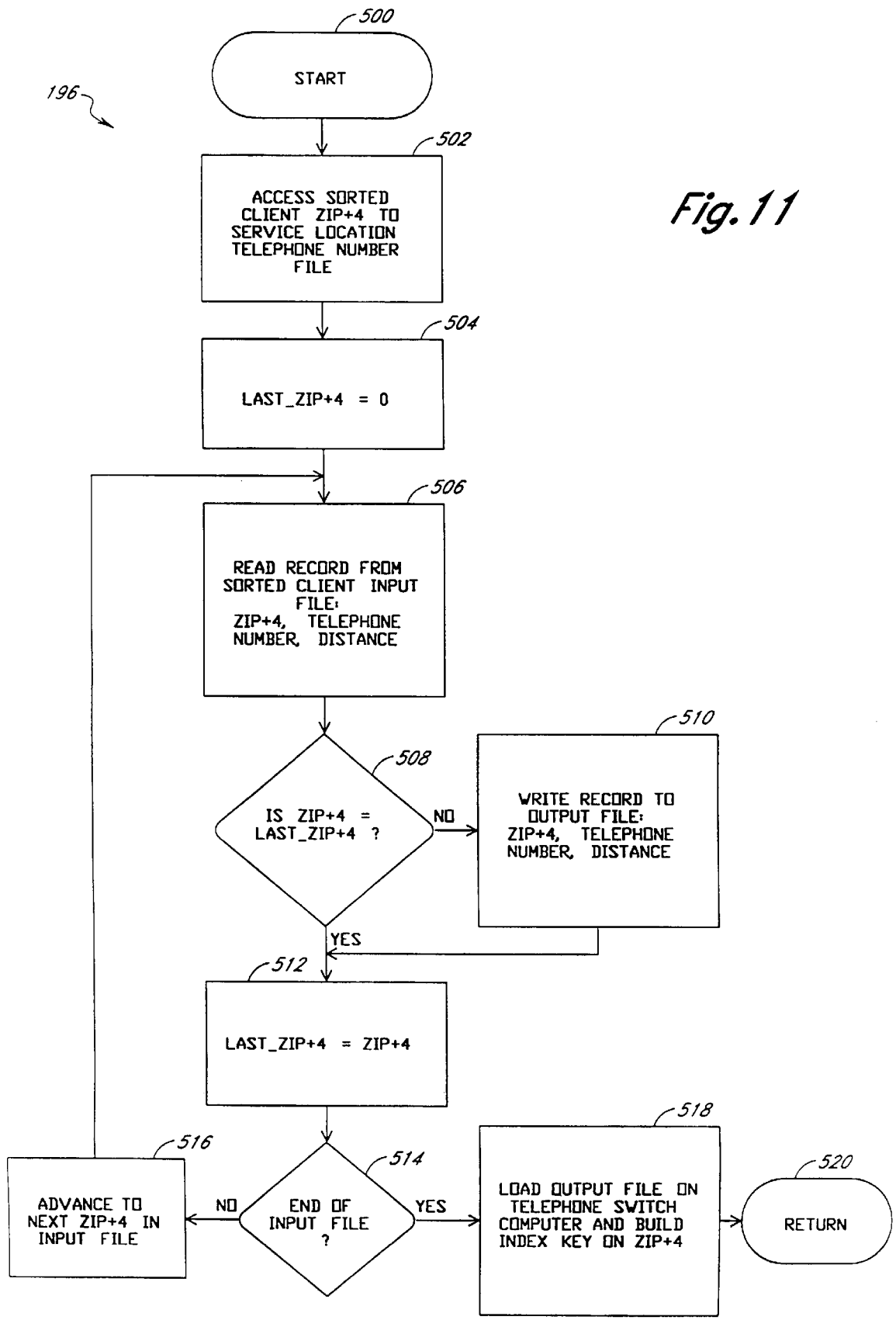
FIG. 11 is a flow diagram of the service location closest to the caller function indicated at 196 in FIG. 3.

Referring to FIG. 11, function 196 as defined in FIG. 3 will be described. Function 196 removes multiple assignments of a zip+4 code and keeps the one with the shortest distance. Beginning at a start state 500, function 196 accesses the sorted intermediate Client Table (not shown) which is available at the completion of state 192. Moving to state 504, a variable "last_zip+4" is set equal to the value of zero. Then, at state 506, beginning with the first record, a record is read from the intermediate Client Table. Moving to a decision state 508, a determination is made whether the zip+4 just read in the record from state 506 is equivalent to the value of last_zip+4. If not, the current record is written to the Client Table 106 at state 510, followed by setting the variable last_zip+4 equivalent to the current zip+4 code at state 512.

At the completion of state 512, a decision state 514 determines if the end of the sorted intermediate Client Table has been reached. If not, the function 196 advances to the next zip+4 code in the intermediate Client Table and loops back to state 506 to process the next record. If the end of the intermediate Client Table has been reached as determined by state 514, the Client Table 106 is loaded in the computer of the telephone switch 111 and an index key on the zip+4 code is built. Function 196 returns at state 520 to state 200 of FIG. 3 to end the "closest" process.

VI. Client Table Build Process for a Polygon Defined Service Area

In general, there are two types of polygon defined service areas. The first type is an exclusive or non-overlapping trade area, and the second type is a non-exclusive or overlapping trade area.

For a non-overlapping polygon defined service area, each franchisee has a defined trade area, such as the area in which they deliver a product. The following situation is given to illustrate this concept. A customer could be located closer to, say, Franchisee B than Franchisee A, but if the customer is in the polygon area for Franchisee A, only the telephone number for Franchisee A will be in the Client Table 106 (FIG. 1a) record corresponding to the location of the customer. However, if the service areas for Franchisee A and Franchisee B are overlapping, the Client Table 106 would have one record with the telephone number and distance for Franchisee A, and another record with the telephone number and distance for Franchisee B. Therefore, the client table build process 105 accommodates both types of polygon defined service areas.

Figure 12A:
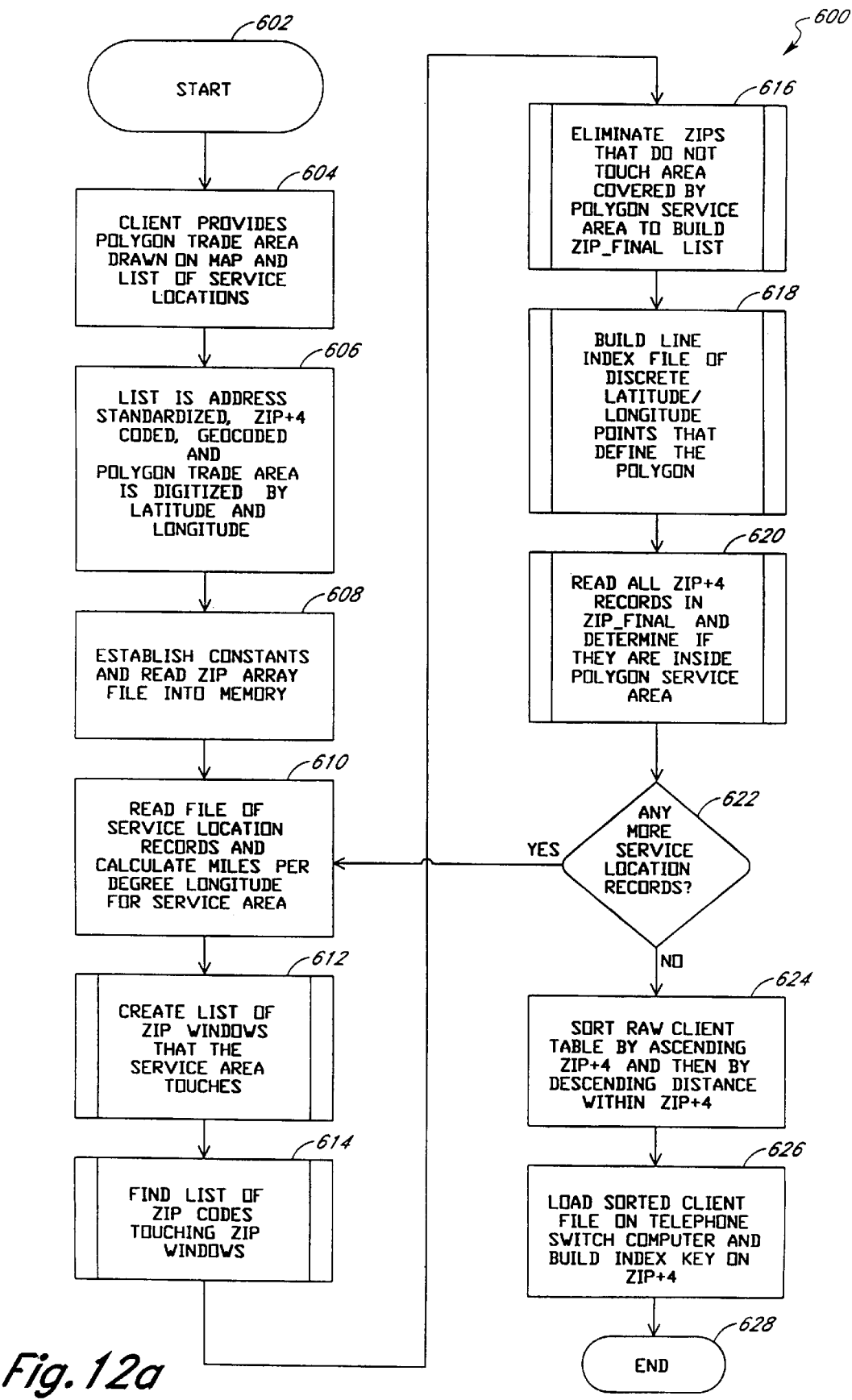
FIG. 12a is a top-level flow diagram of a process to build a Client table using polygon defined service areas for the system of FIG. 1.
Figure 12B:
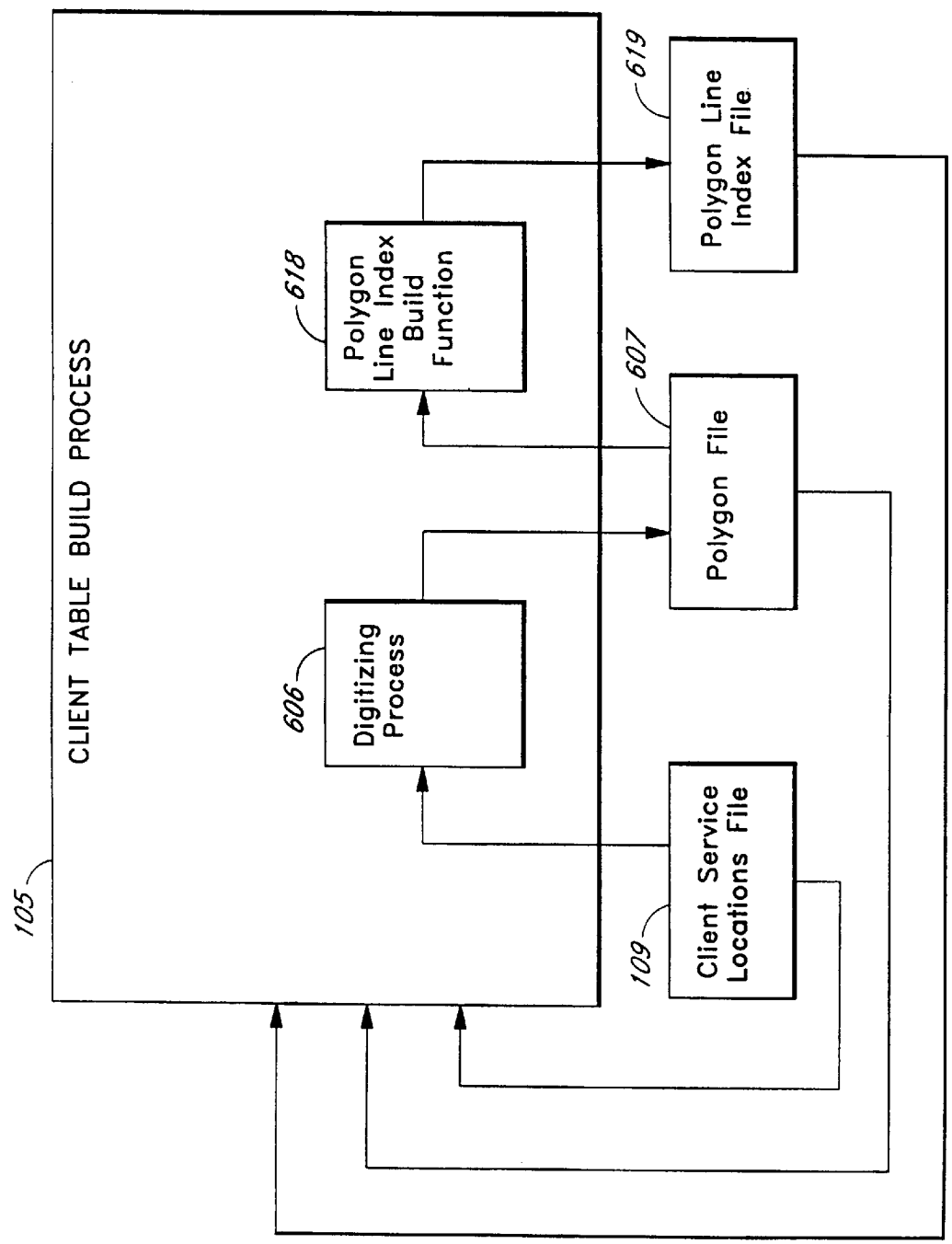
Figure 13:
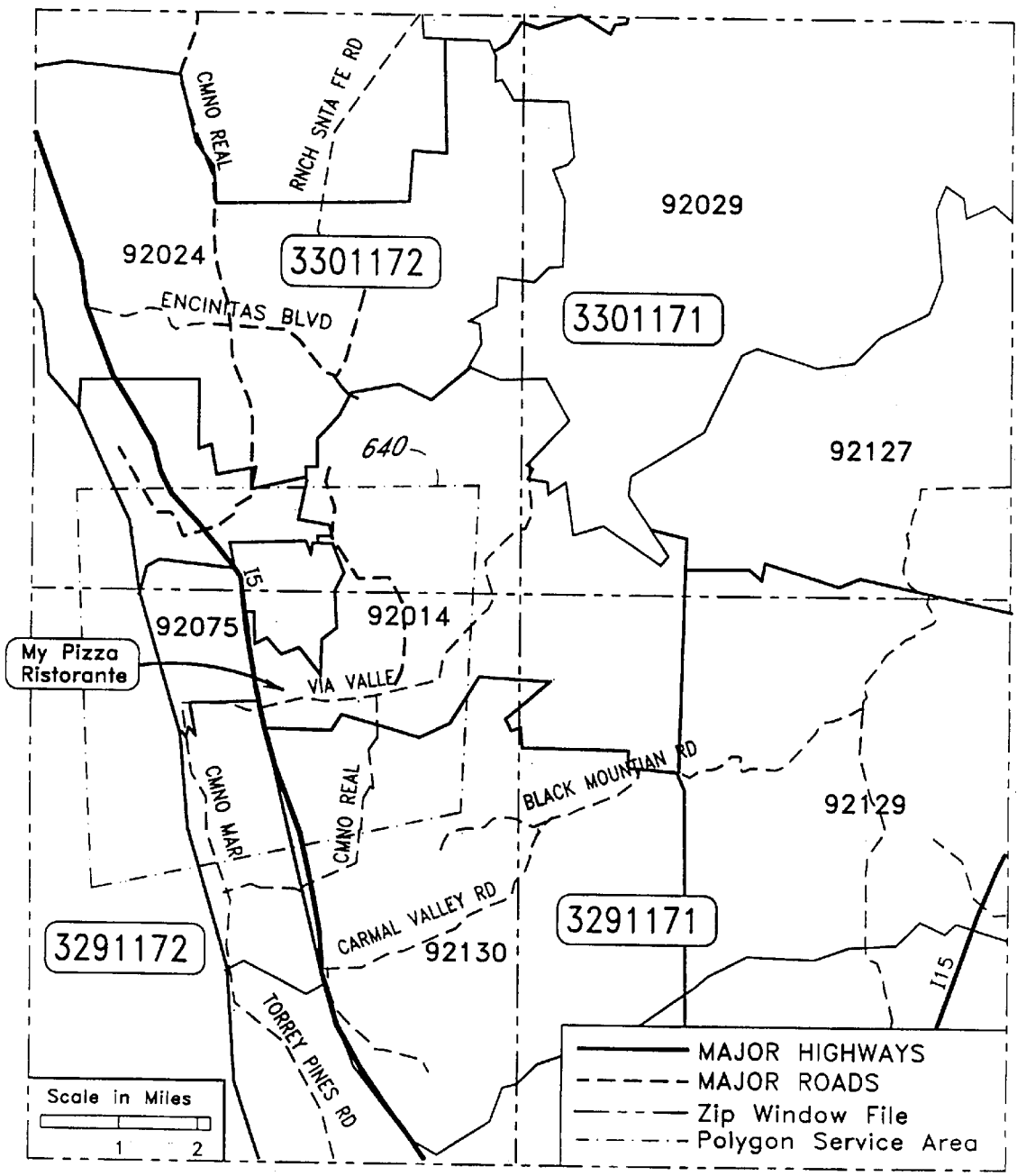

Referring generally to FIGS. 12a, 12b, and 13, a Client Table process 600 for a polygon defined service area will be described. Process 600 is another specific version of the general process 105 shown in FIG. 1a. Many parts of the polygon defined service area process 600 (also referred to as the polygon process) are identical with those of the radius defined service area process 170. Some functions have minor changes. Other functions are totally different. For functions that are almost identical only the differences will be identified and explained to avoid repetition. The new functions will be described in some detail.

The process 600 begins at a start state 602 and moves to state 604 wherein a client provides a Client Service Locations file 109 (FIG. 1a) of service locations in machine readable form with information and format as previously shown in Table 3. The client also provides a detailed street map with the polygon service area of the service location drawn on the street map with the telephone number of the service location written inside the polygon service area. The map of FIG. 13 illustrates an example polygon service area 640.

The process 600 moves to state 606 wherein the list of service locations in file 109 is address standardized, zip+4 coded, and latitude and longitude geocoded using commercially available services through companies such as Group I and Geographic Data Technology. Table 4 is the example of a standardized record with latitude and longitude appended. In addition, the latitude and longitude vertices for the polygon service area drawn on the street map are digitized using a commercially available GIS system such as Infomark for Windows available from Equifax National Decision Systems. The digitizing process of state 606 assigns latitude and longitude coordinates for the vertices of the polygon and creates a Polygon file 607 as shown in FIG. 12b. An example of the Polygon file 607 is shown in Table 6 with the following data items:

TABLE 6

| | |
|---|---|
| Geocode: | 6194817777 |
| Name: | MyPizza Del Mar |
| Number of vertices: | 5 |
| Lat/Lon vertex pairs: | 33.0170-117.2910 |
| | 32.9503-117.2874 |
| | 32.9623-117.2132 |
| | 33.0187-117.2084 |
| | 33.0170-117.2910 |

The last latitude/longitude vertex pair must equal the first pair to close the polygon. This example is for a very simple polygon. Typical franchise polygons are very complex; the polygon may follow non-linear street boundaries and contain hundreds of vertices. The geocode is the telephone number of the service location. The Polygon file data is appended to the end of its corresponding record of the Client Service Locations file 109, creating a variable length record.

Moving to state 608, the process 600 establishes the constant of 68.9404 miles per degree latitude and reads the Zip Array file 103 (FIG. 1*a*) into memory of the computer. At state 610, the process 600 reads a record from the Client Service Location file 109 and calculates the number of miles per degree longitude for the service location. The miles per degree longitude=68.9404 * COSINE(latitude). For the example given in Table 4, at 32.9862 degrees latitude the result is 57.8297 miles per degree longitude.

The process 600 proceeds to a function 612 which generates a list of zip windows that the service location touches. Touching a zip window means that at least part of the service area is in or overlaps the zip window. The zip windows for the example given in Table 4 are illustrated in FIG. 13. The function 612 will be further described in conjunction with FIG. 14 hereinbelow.

Figure 16:
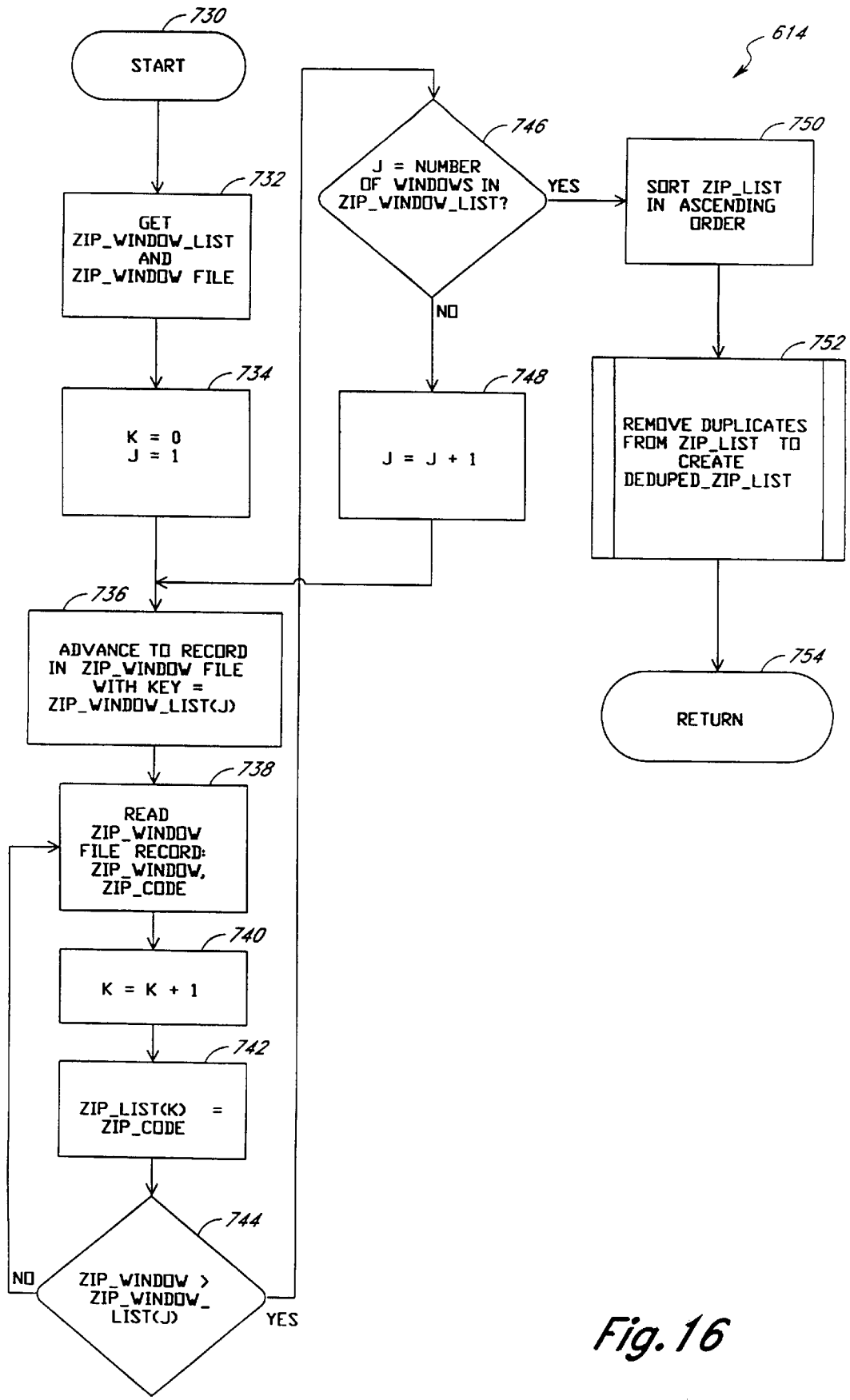

Moving to a function 614, the process 600 generates a list of 5-digit zip codes that touch any of the zip windows identified by function 612. This zip_list is sorted in ascending order and duplicate zip codes are removed in function 614. The function 614 will be further described in conjunction with FIG. 16 hereinbelow.

Figure 18:
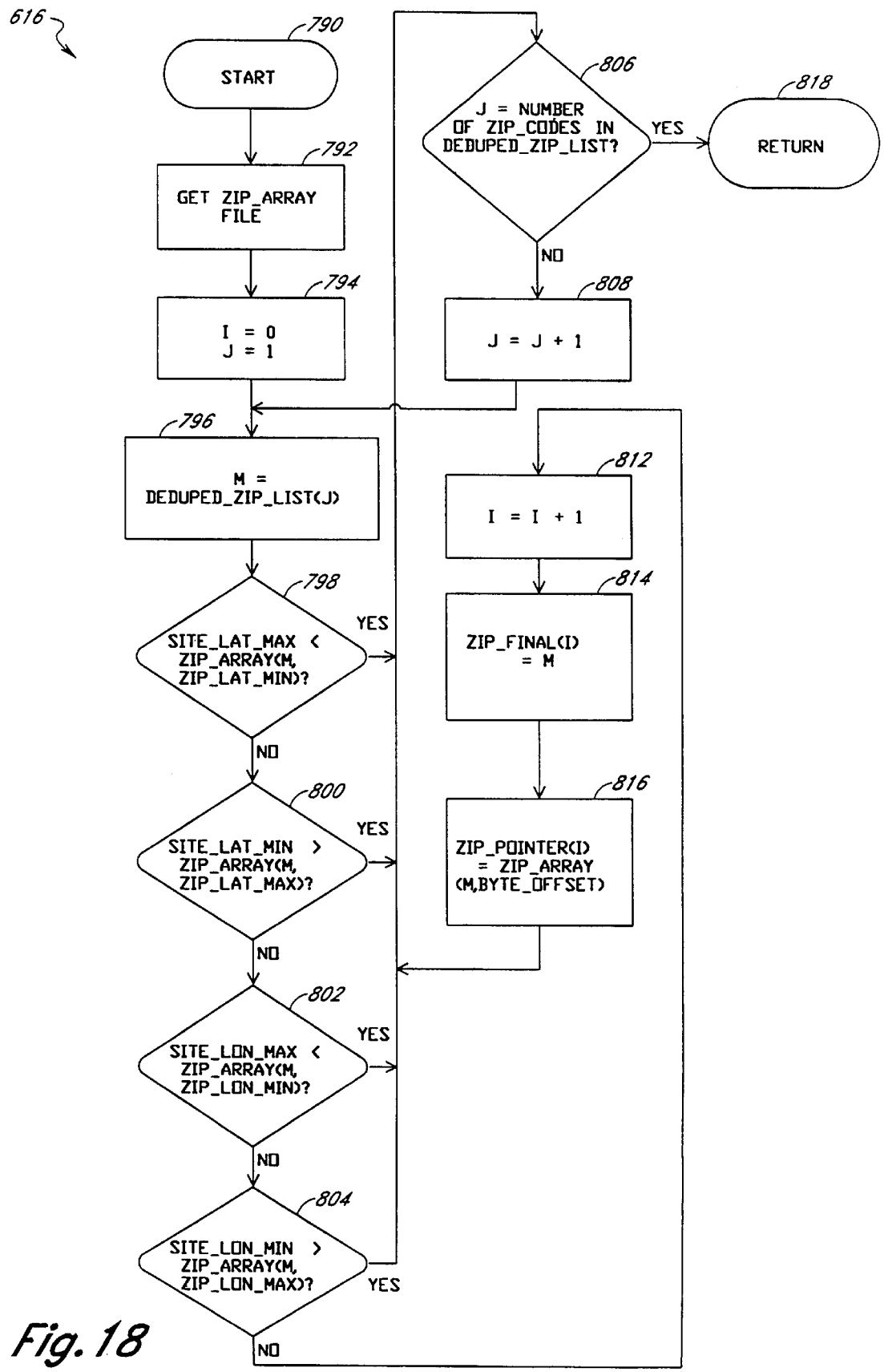

The process 600 proceeds to a function 616 wherein 5-digit zip codes that are not within the polygon service area specified in state 604 are removed from the zip_list generated by function 614, and a zip final list is created. The function 616 will be further described in conjunction with FIG. 18 hereinbelow.

Advancing to function 618, the process 600 builds a Line Index file 619 shown in FIG. 12*b* of discrete latitude and longitude points that define the polygon. Function 618 will be further described in conjunction with FIG. 19*a* and 19*b* hereinbelow.

Continuing to function 620, the process 600 retrieves all the zip+4 records corresponding to the zip codes in the zip final list generated by function 616 and determines if the zip+4 code is at or inside the polygon service area. If so, a record is written in a raw Client Table (not shown) that includes the zip+4 code, the client telephone number for the instant service location, and the distance of the zip+4 centroid to the service location. The function 620 will be further described in conjunction with FIG. 20 hereinbelow.

The process 600 moves to a decision state 622 to determine if additional client service records are to be processed. If so, the loop of states 610 to 620 is repeated for the next service location record. If all service location records have been processed for the instant raw Client Table, the process 600 advances to state 624. At state 624, the process 600 sorts the raw records, written by function 620, by ascending zip+4 code and then by descending distance, if the same zip+4 code is listed more than once. The same zip+4 code could be listed more than once if there are multiple overlapping polygon service locations, each with a different client telephone number.

The process 600 then moves to a state 626 wherein the sorted Client Table from state 624 is loaded onto the computer of the telephone network switch 111, and an index key on the zip+4 codes is built. Upon completion of state 626, the Client Table build process 600 for a polygon defined service area ends at state 628.

Figure 14:
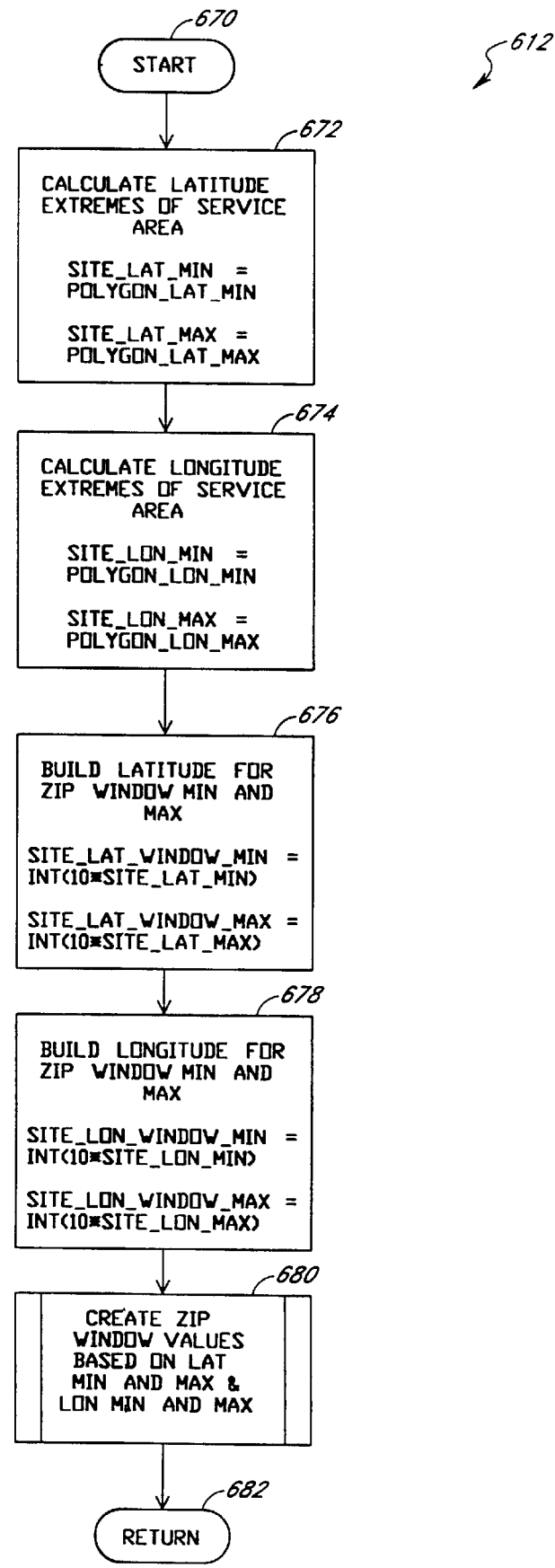

Referring generally to FIG. 14, the function 612 defined in FIG. 12*a* will be described. Function 612 generates a list of zip windows that the site touches by first calculating site latitude and longitude extremes. For this function, the absolute value is used for both the latitude and longitude.

Beginning at a start state 670, the process 600 moves to a state 672 to establish latitude extremes of the service area. The Polygon file 607 is accessed to retrieve the polygon vertices latitude minimum and maximum values.

Site_lat_min=polygon_lat_min;

Site_lat_max=polygon_lat_max.

For the example service location and polygon given in Table 6, the results are as follows:

Site_lat_min=32.9503;

Site_lat_max=33.0187.

The process continues at state 674 wherein longitude extremes of the service area are established. The polygon vertices longitude minimum and maximum values are retrieved from the Polygon file 607.

Site_lon_min=polygon_lon_min;

Site_lon_max=polygon_lon_max.

For the example service location and polygon given in Table 6, the results are as follows:

Site_lon_min=117.2084;

Site_lon_max=117.2910.

Figure 15:
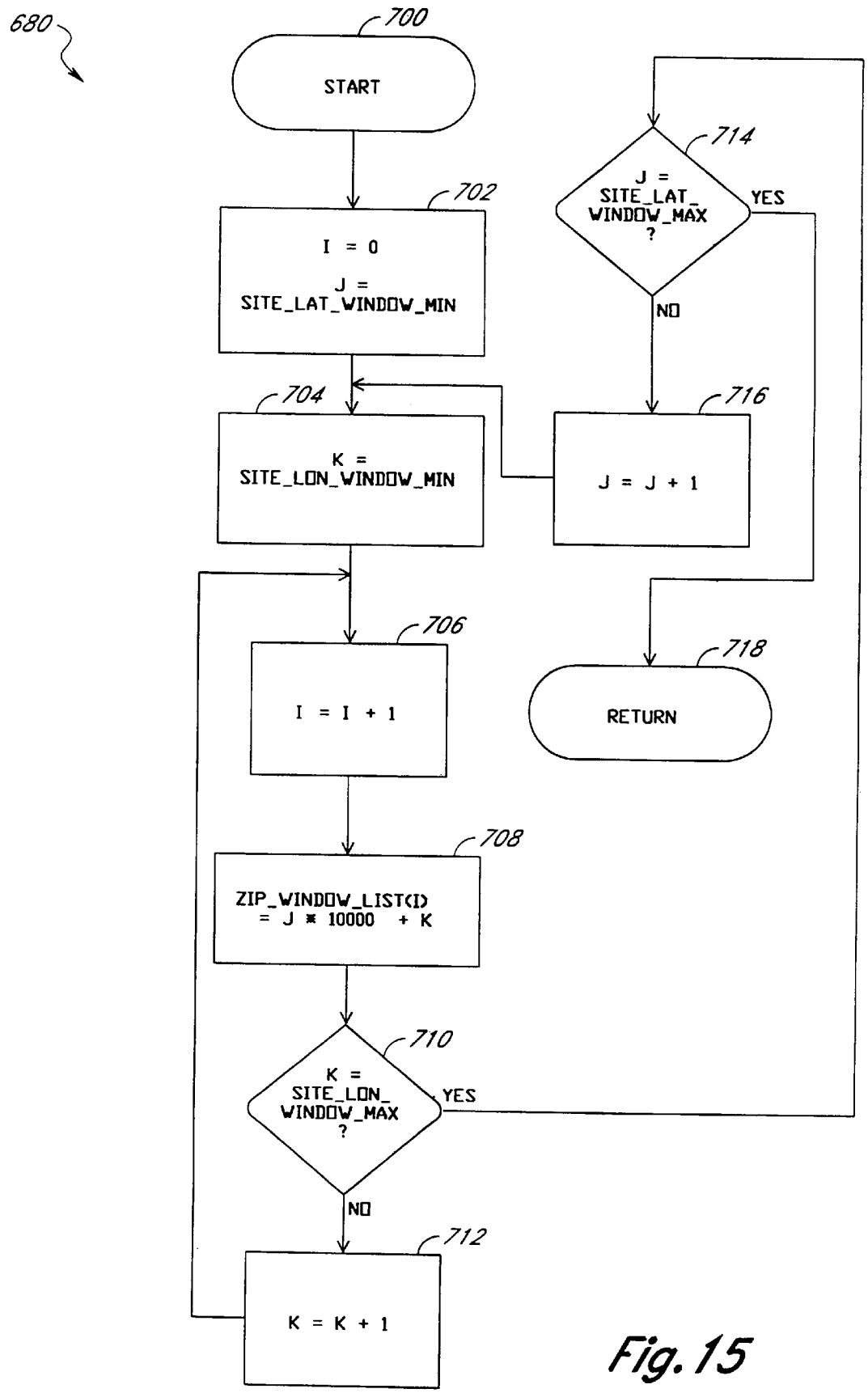
FIG. 15 is a flow diagram of the zip windows function indicated at 680 in FIG. 14.

States 676 and 678 are identical to states 258 and 260 of function 182 (FIG. 5). As defined in FIG. 14, function 680 (FIG. 15) is identical to function 262 (FIG. 6). Function 612 returns at state 682 to FIG. 12*a*.

Figure 17:
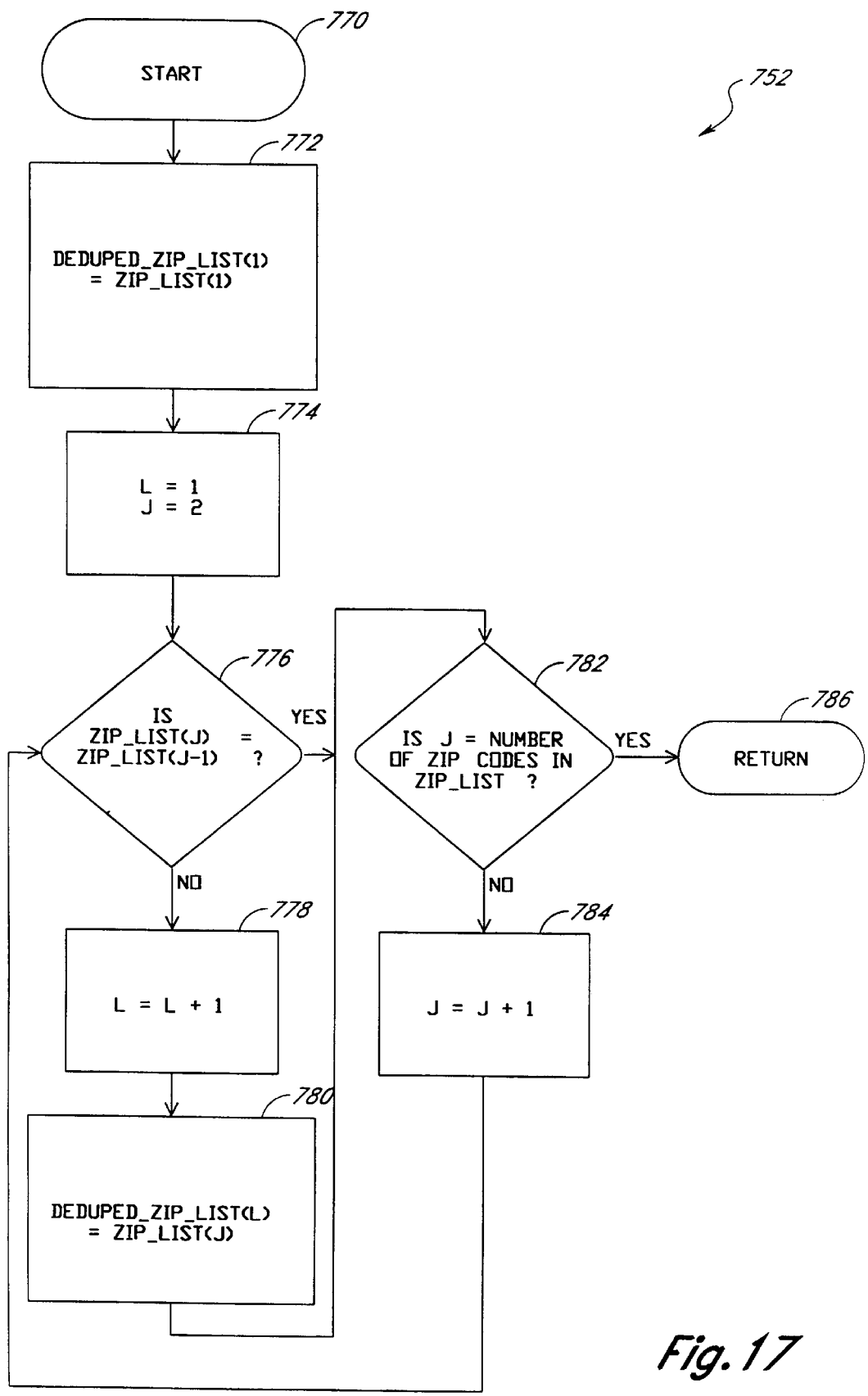
FIG. 17 is a flow diagram of the remove duplicates from zip list function indicated at 752 in FIG. 16.

As defined in FIG. 12*a*, function 614 (FIG. 16) is identical to function 184 (FIG. 7). As defined in FIG. 16, function 752 (FIG. 17) is identical to function 322 (FIG. 8). As defined in FIG. 12*a*, function 616 (FIG. 18) is identical to function 186 (FIG. 9).

Figure 19A:
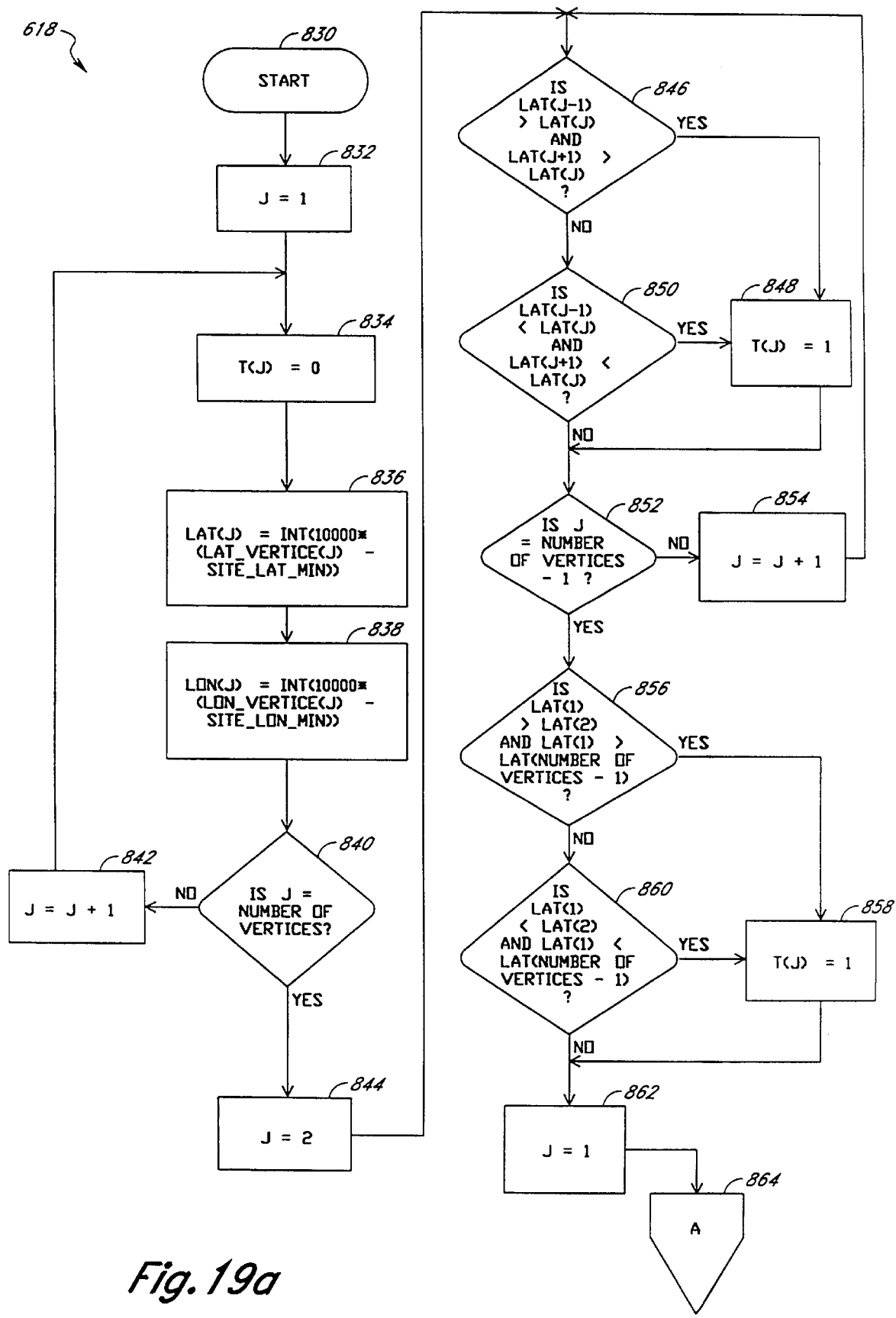
Figure 19B:
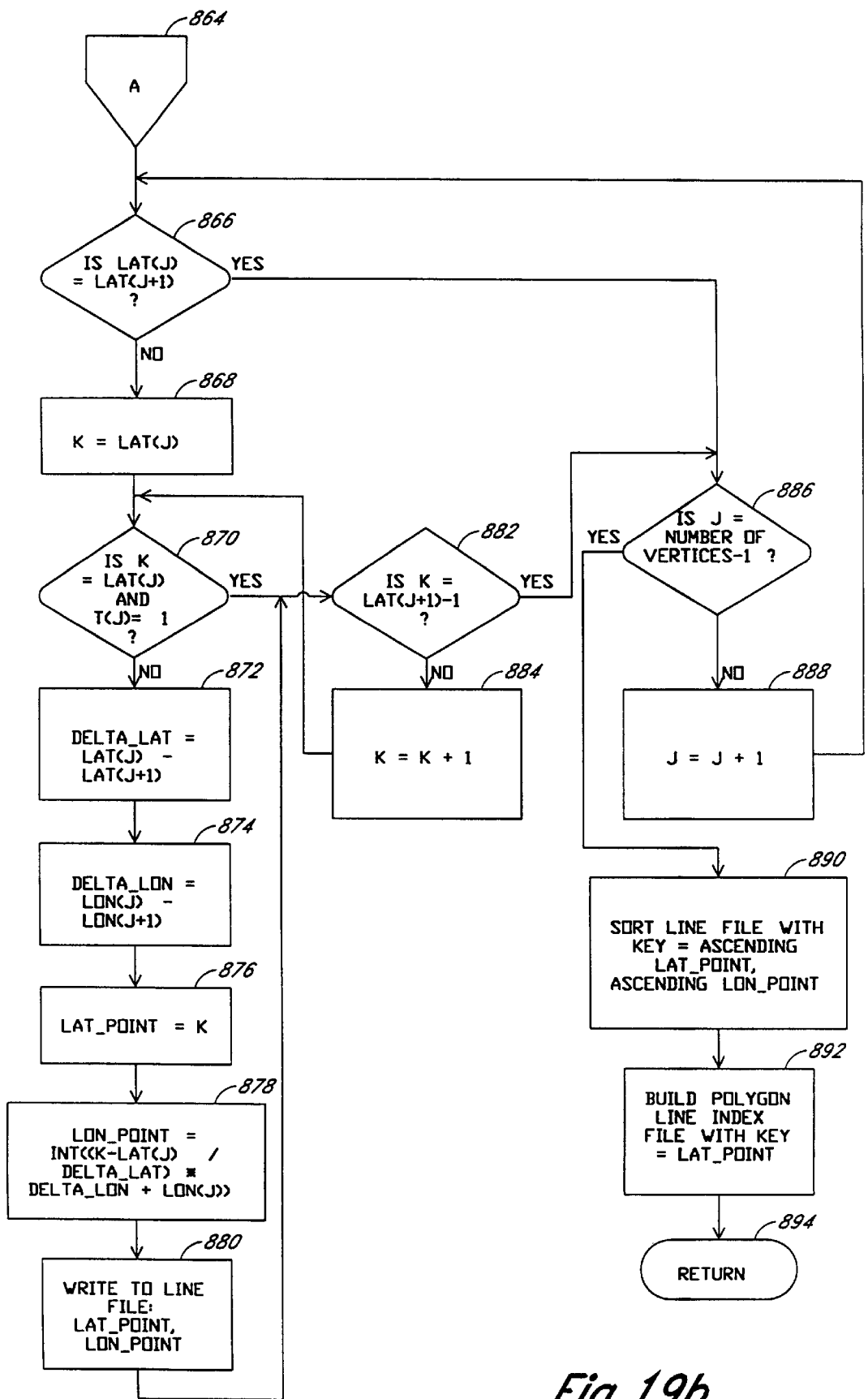

Referring to FIGS. 19*a* and 19*b*, the function 618 defined in FIG. 12*a* will be described. Function 618 builds the Line Index file 619 by rounding all modified polygon vertices latitudes and longitudes to an integer value, thereby creating a record of every discrete point along the line generated by connecting adjacent vertices listed in the Polygon file 607. The modification performed to the polygon vertices is subtracting the site_lat_min or site_lon_min as will be seen below.

Beginning at a start state 830, the process 600 moves to a state 832 and initializes a variable J to equal the value one. Moving to state 834, the process 600 initializes a tangent (denoted by "T" in FIG. 19) array element addressed by the variable J to equal the value zero. At state 836, a latitude array (denoted by "LAT" in FIG. 19) element addressed by J is written to the value calculated by: subtracting site_lat_min (available from function 612, FIG. 14) from the vertices latitude (lat_vertices) addressed by J in the Polygon file 607 (available from state 606), multiplying the result by 10,000, and then taking the integer (INT) portion of the product. Advancing to state 838, a longitude array (denoted by "LON" in FIG. 19) element addressed by J is written to the value calculated by: subtracting site_lon_min (available from function 612, FIG. 14) from the vertices longitude (lon_vertices) addressed by J in the Polygon file 607 (available from state 606), multiplying the result by 10,000, and then taking the integer portion of the product.

At a decision state 840, the process 600 determines if all vertices in the Polygon file 607 have been processed. The number of vertices is available from state 606 as shown in the example in Table 6. If not, variable J is incremented by one at state 842, and the process 600 loops back to state 834 to process the next vertices. If all vertices have been processed, variable J is set equal to the value two at state 844.

States 846 through 860 are used to find vertices that are tangent to a latitude line. States 846 through 854 form a loop to sequence through all elements of the LAT array to determine if either of the conditions of decision states 846 or 850 are met. If so, the element of the tangent array addressed by J is set equal to one. If not, the next element is checked, by incrementing J at state 854 and looping back to state 846, until the end of the LAT array is reached, i.e., all vertices are tested, and decision state 852 is true. Decision state 846 determines whether the values of the elements of array LAT immediately before and immediately after the current element are greater than the value of the current element. In other words, decision state 846 determines whether a latitude line is tangent to vertex(J). Decision state 850 determines whether the values of the elements of array LAT immediately before and immediately after the current element are less than the value of the current element. In other words, decision state 850 determines whether a latitude line is tangent to vertex(J).

When J equals the number of vertices minus one, the process 600 moves to states 856 through 860 to perform the follow tests:

decision state 856: If LAT(1)>LAT(2) AND LAT(1)>LAT (number_vertices-1) then T(J)=1;

decision state 860: If LAT(1)<LAT(2) AND LAT(1)<LAT (number_vertices-1) then T(J)=1.

Number_vertices is used to represent the number of vertices as available from state 606. Decision states 856 through 860 test for a special case of previous states 846 through 854 to determine if vertex(1) is tangent to a latitude line. If so, the element of the tangent array addressed by J is set equal to one.

At state 862, the process 600 sets variable J equal to one. Block 864 is an off page connector from FIG. 19a to FIG. 19b. Continuing on from block 864 on FIG. 19b, the process 600 generates a pseudo-line of discrete latitude points connecting the polygon vertices. Each point that defines the line is described by an X,Y coordinate. Each Y coordinate or latitude point is one ten-thousandth of a degree latitude apart on the Y axis.

Decision state 866 checks for parallel latitude lines, and if true, the process 600 moves to decision state 886 to determine if all vertices have been processed. If not, J is incremented by one at state 888, and the process loops back to decision state 866 to check the next element of array LAT.

If LAT(J) does not equal LAT(J+1) as determined by decision state 866, the process 600 moves to state 868, sets a variable K to equal the value of LAT(J), and moves to state 870.

State 870 is used to leave out latitude tangent vertices points. State 870 determines if K is equivalent to LAT(J) and T(J) equals one. If so, the process 600 moves to decision state 882 to determine if K should be incremented by one at state 884, or if K has reached the value "LAT(J+1)−1" and decision state 886 is to be performed. If K is incremented at state 884, the process 600 loops back to decision state 870.

If decision state 870 is false, the process 600 moves to state 872 to calculate a variable "delta_lat" to be "LAT(J)−LAT(J+1)". At state 874, a variable "delta_lon" is calculated as the difference between the value of the array LON element addressed by J and the value of the array LON element addressed by J plus one. Moving to state 876, a variable "lat_point" is set equivalent to the value of variable K. State 878 is used to calculate a longitude (variable "lon_point") for latitude line point using the following equation:

lon_point=INT((K-LAT(J)/delta_lat)*delta_lon+LON(J)).

Moving to state 880, the process 600 writes the values of lat_point and lon_point to the Line Index file and then loops back to decision state 882 to check on the value of K.

At decision state 886, if J equals the number of vertices minus one, all vertices have been processed, and the process 600 moves to state 890. At state 890, the process 600 sorts the Line Index file by ascending latitude point, and then by ascending longitude point within the latitude point. Moving to state 894, process 600 builds the Polygon Line Index file 619 using the latitude point as the indexing key. Function 618 returns at state 894 to FIG. 12a.

Figure 20:
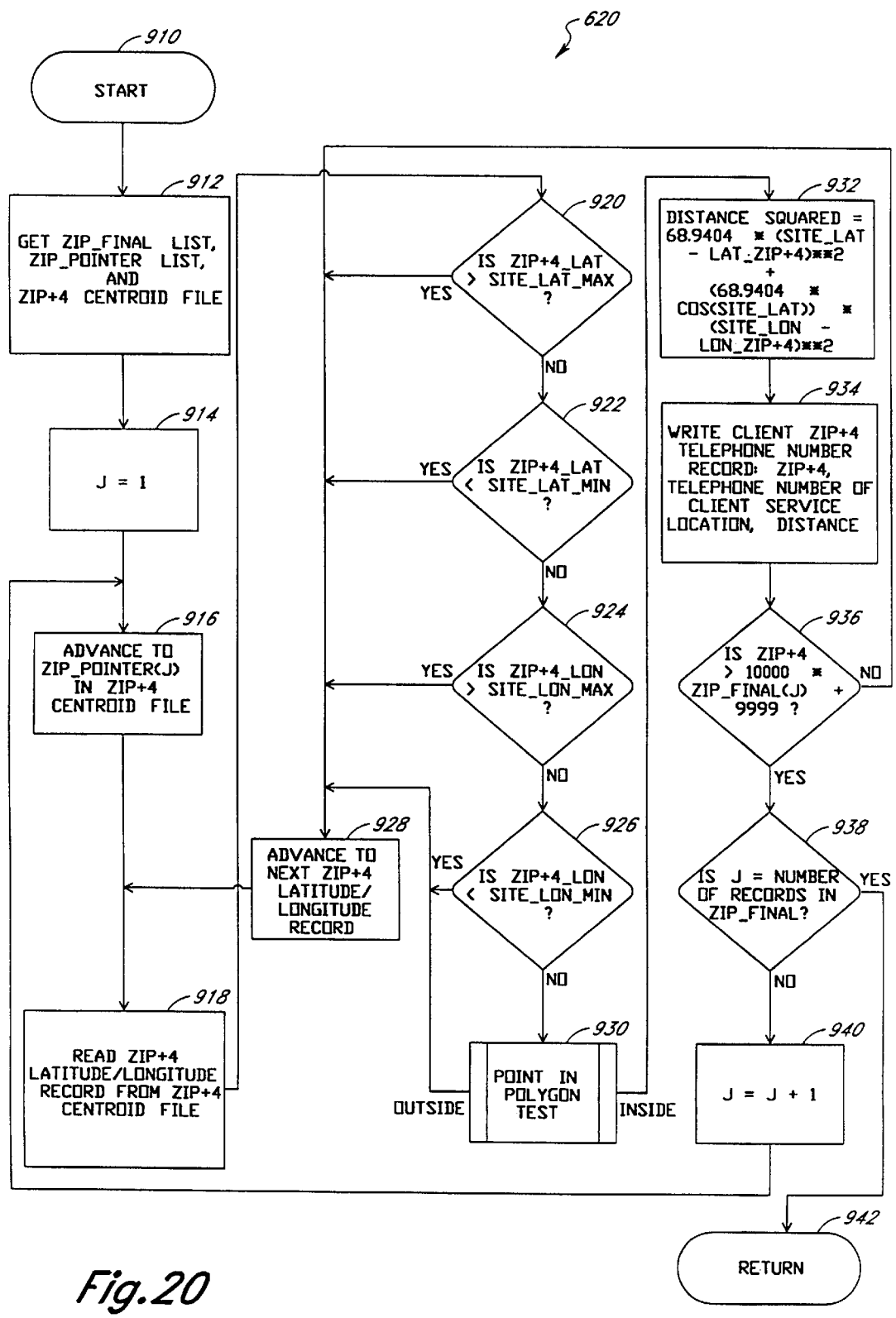

Referring to FIG. 20, the function 620 defined in FIG. 12a will be described. Function 620 reads all zip+4 records as identified by the combination of the zip_final list and zip_pointer list, and determines if the zip+4 centroids are inside the polygon service area.

Beginning at a start state 910, the states 912 through 918 are identical to states 422 through 428 of function 188 (FIG. 10). Then beginning at state 920 through state 926, the process 600 compares the latitude and longitude of the zip+4 centroid to the minimums and maximums of the site latitude and longitude available from function 612 (FIG. 14). In other words, the process 600 determines if the zip+4 centroid is inside the latitude and longitude extremes of the polygon service area. If not, at state 928 the process 600 advances to point to the next zip+4 record and then loops back to state 918 to read the zip+4 record.

However, if the zip+4 centroid is determined to be inside the latitude and longitude extremes of the polygon service area by states 920 through 926, the process 600 moves a function 930. Function 930 is a final test to determine if the zip+4 centroid is indeed inside the polygon. The point-in-polygon test of function 930 returns with either an "inside" flag or "outside" flag. If the zip+4 centroid is not inside the polygon, the "outside" flag is set by function 930, and the process 600 moves to state 928 to advance to the next zip+4 record. However, if the zip+4 centroid is inside the polygon, the "inside" flag is set by function 930, and the process 600 moves to state 932 to perform a distance calculation. State 932 is identical to state 430 of function 188 (FIG. 10). States 934 through 940 and 928 are identical to states 434 through 442 of function 188. Function 620 returns at state 942 to FIG. 12a.

Figure 21:
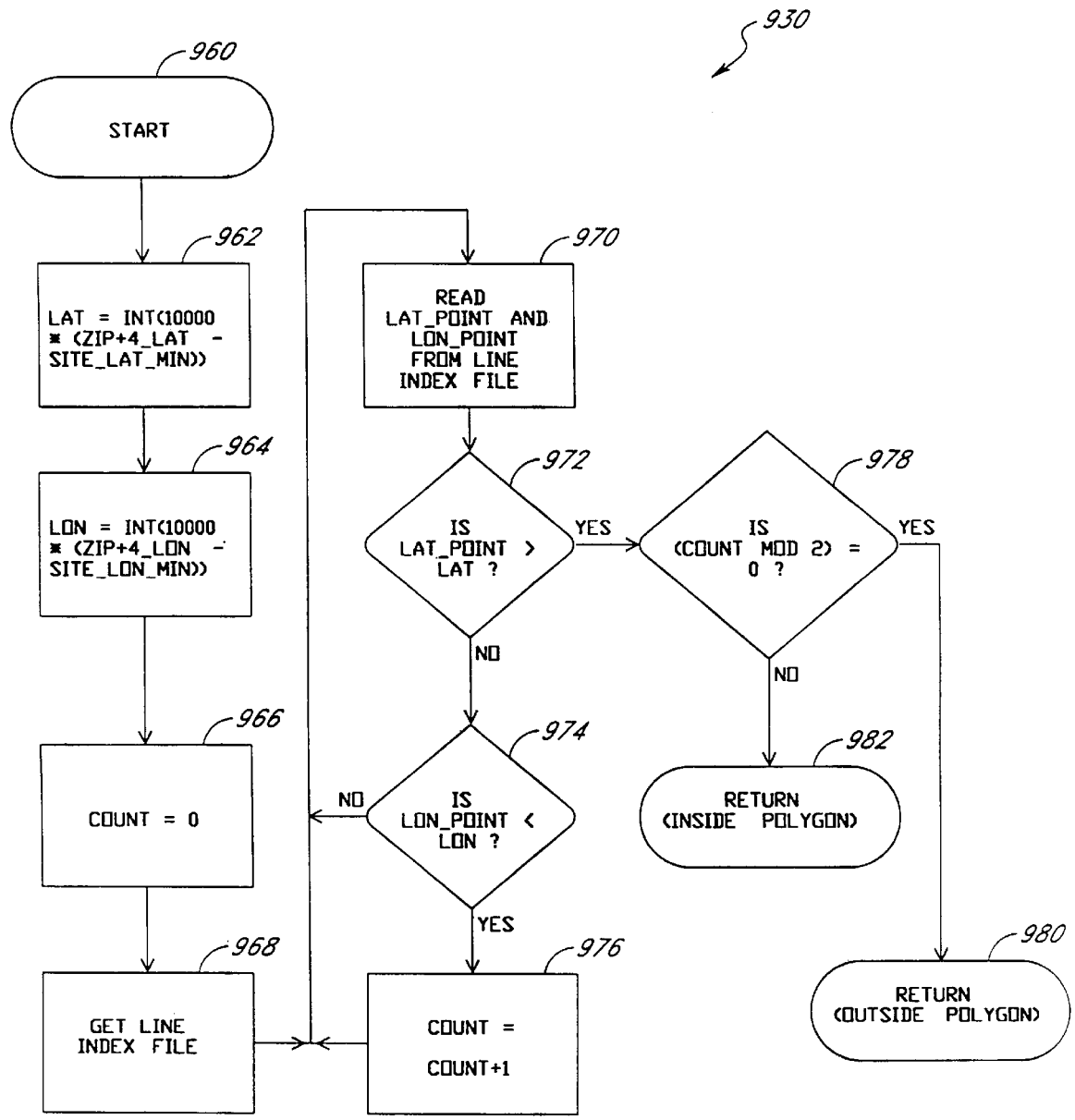
FIG. 21 is a flow diagram of the point in polygon test function indicated at 930 in FIG. 20.

Referring to FIG. 21, the function 930 defined in FIG. 20 will be described. Function 930 tests to determine if the zip+4 centroid is inside the polygon. Function 930 conceptually draws a line from the zip+4 latitude in a negative longitude direction and then counts the number of times the line crosses the polygon boundary. If the line crosses an odd number of times, the zip+4 centroid is inside the polygon, but an even number of line crossings determines that the zip+4 centroid is outside the polygon.

Beginning at a start state 960, the process 600 moves to state 962 to calculate a value for a variable "lat" by: subtracting site_lat_min (available from function 612, FIG. 14) from zip+4_lat (available from the Zip+4 Centroid file 100), multiplying the result by 10,000, and then taking the integer (INT) portion of the product. Moving to state 964, the process 600 calculates a value for a variable "lon" by: subtracting site_lon_min (available from function 612) from zip+4_lon (available from the Zip+4 Centroid file 100), multiplying the result by 10,000, and then taking the integer portion of the product.

Moving to state 966, the process 600 initializes the variable "count" to a value of zero and proceeds to state 968 to access the Line Index file 619. At state 970, the process 600 reads the Polygon Line Index file 619 (available from function 618, FIG. 19) to retrieve the values for the variables "lat_point" and "lon_point". The process 600 advances in the Polygon Line Index file 619 to the first occurrence of "lat" in the file by use of the file ISAM index. Moving to a decision state 972, the process 600 determines if "lat_point" is greater than "lat". If "lat_point" is greater than "lat", then all records in the Polygon Line Index file 619 have been read. If not, a test is performed at a decision state 974 to determine if "lon_point" is less than "lon". If "lon_point" is less than "lon", a line drawn from the zip+4 centroid toward negative infinity is defined to cross a polygon line. At state 976, "count" is incremented by one to indicate the line crossing exists, and the process 600 loops back to state 970. However, if decision state 974 is false, the process 600 loops back to state 970 to perform the next read of the Line Index file 619.

If process 600 determines at decision state 972 that "lat_point" is greater than "lat", process 600 moves to a decision state 978 to check if "count MODULUS 2" is equal to zero. If so, an even number of line crossings exist, the "outside" flag is then set, and the function 930 returns at state 980 to FIG. 20. If decision state 978 is false, i.e., "count MODULUS 2" is not equal to zero, an odd number of line crossings exist which denotes that the zip+4 centroid is inside the polygon. The process 600 sets the "inside" flag, and the function 930 returns at state 982 to FIG. 20.

VII. Overview of One Table System

Figure 27:
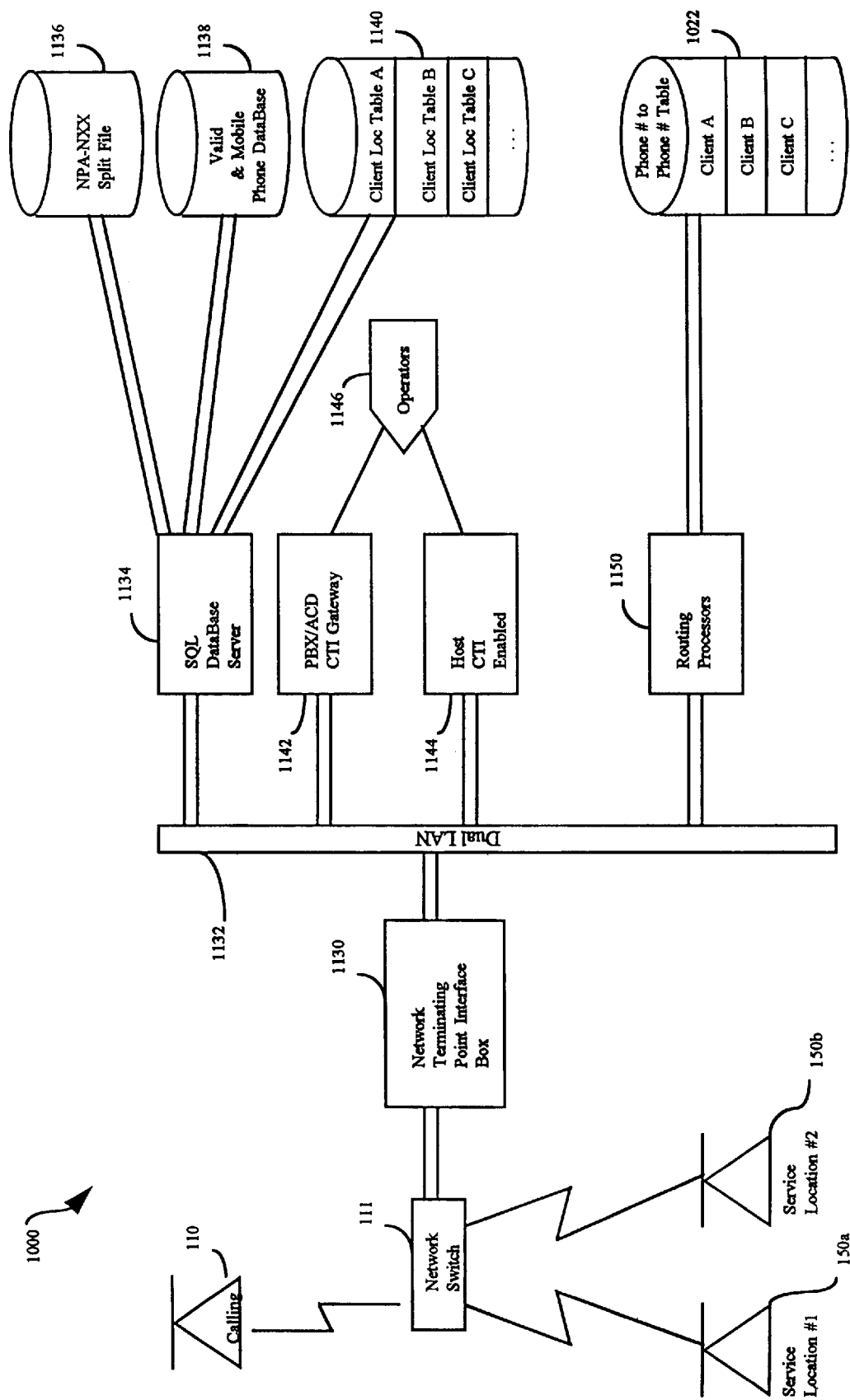
FIG. 27 is a block diagram of the One Table system, including a network configuration utilized at a switch.

A derivative of the Two Table system (Master and Client tables) shown in FIGS. 1b and 1c is a One Table system 1000 (FIG. 27). The One Table system provides the fastest way to route a telephone call. Because it is based on a single table, it is the simplest to implement in a telecommunications network.

Implementation of the One Table system is not trivial because of the magnitude of the offline maintenance required to synchronize telephone number changes, client service location changes and to maintain the spatial relationship between the telephone number and each client's service locations. Since there is one table per client, each telephone number change must be reassociated with each client's servicing locations. There are several million telephone number changes nationwide per month. The resultant number of changes to the tables is the number of telephone number changes times the number of tables. Each table also must be updated for the addition and deletion of service locations, as well as changes in service location service area definitions or telephone numbers and these changes must be reassociated with the list of potential caller telephone numbers. Further, the more clients that are supported by the system, the more tables that are required, which could result in massive storage requirements.

In the One Table system, there are two preferred ways of creating a Telephone Number to Service Location Telephone Number or ID table that is incorporated into the telecommunications network. Once the single table is created, the One Table system only requires a single mass storage, e.g., disk, lookup operation to determine the telephone number of the desired service location, and thus, provides the fastest call routing embodiment.

A first method of building the Caller Telephone Number to Dealer Telephone Number table in the One Table system is an enhancement of the Client Table Build process previously described above. The files and processes utilized to generate the table are further described in conjunction with FIG. 22 hereinbelow.

A second method of building the Caller Telephone Number to Dealer Telephone Number table in the One Table system merges records from the Master Table and Client Table of the Two Table system using an off-line process. This process is described in general in conjunction with FIG. 23 hereinbelow. A Build Master Table List function and a Build Client Table List function are both described by reference to FIG. 24 and generally referenced to at 1050 and 1052, respectively, and are further discussed in conjunction with FIGS. 25 and 26, respectively.

The Caller Telephone Number to Dealer Telephone Number table that results from either of the two methods of table building mentioned above is utilized in a telephone network for the One Table system. The One Table system and its network configuration is described by reference to FIG. 27 and is generally referenced to at 1000. The hardware components, tables and files utilized by the One Table system are described in more detail in conjunction with FIG. 27. The operational flow of the One Table system is described by reference to FIG. 28 and is generally referenced to at 1160.

VIII. One Table System Table Build Processes

The following description explains two automated methods of creating and maintaining a Telephone Number to Service Location Telephone Number or ID table that can be incorporated into a telecommunications network. These methods for building a One Table system use techniques that are similar in some respects to those used in creating the Two Table system.

Special Case of Client Table Build

The first method to be described in building the Caller Telephone Number to Dealer Telephone Number table is a special case of the Client Table Build processes described above in conjunction with the Two Table system. This new process is described by reference to FIG. 22, and is generally referred to at 1002. Process 1002 begins with a ZIP+4 Centroid file, as described above in conjunction with the Two Table system. The ZIP+4 is the preferred Spatial Key in the United States. By substituting a 10-digit telephone number for the ZIP+4 as our Spatial key, a 10-digit Telephone Number Latitude & Longitude Centroid file 1010 is created. Utilizing file 1010 as an input to a Client Table Build process 1020, along with a Phone Array file 1016 and a Phone Windows file 1018, the end result is a Client Table that is a Caller Telephone Number to Service Location Telephone Number table 1022. Client Table Build process 1020 is similar to Client Table Build process 105 (FIG. 1*a*, and further described in conjunction with FIGS. 3 and 12*a*), except for the different file names and field names used as the inputs to the process 1020, as identified herein. File 1010 is also used by two other File Build processes 1012 and 1014, described hereinbelow.

The starting Telephone Number Latitude and Longitude Centroid file 1010 is created from a master list of telephone numbers with addresses, ZIP+4 address standardization and coding software, such as AccuMail® or CODE-1®, available from Group 1 Software, and latitude and longitude coding software, such as MatchMaker/2000®, available from Geographic Data Technology, Inc. (GDT). The preferred process for creating the Telephone Number Latitude and Longitude file is a two step process as described hereinbelow.

Starting with the Telephone Number Address file, step one processes the file with USPS address standardization AccuMail or CODE-1software from Group 1, standardizes the addresses, and assigns a ZIP+4 to each address in the file. The AccuMail software is used if the file creation process is run on a personal computer or other small machine, or alternatively, the CODE-1 software is used if the process is executed on a mainframe or other large machine. In step two, the address standardized and ZIP+4 coded resultant file is processed with GDT's MatchMaker/2000 software. For each record, the software first looks up the address in GDT's Dynamap/2000® street address database. If it finds the current record's address, it assigns a street number latitude and longitude to the record. If it doesn't find the address, it assigns a latitude and longitude from GDT's ZIP+4 Latitude and Longitude Centroid file 100 (FIG. 1*a*) to the record.

Phone Array File Build process 1012 is similar to the Zip Array File Build process 101 (FIG. 1*a*), except that the resultant Phone Array file 1016 has a six digit (NPANXX) telephone number field instead of a 5-digit zip code field as in the Zip Array file 103. Thus, there are 999,999 possible entries in file 1016, but not all are used because not every numeric combination of area codes is currently assigned. Furthermore, the latitude/longitude minimums and maximums are for an area defined by the first six digits of the telephone number in file 1016 rather than for the 5 digit zip code area of file 103.

Phone Windows File Build process 1014 is similar to the Zip Windows File Build process 102 (FIG. 1*a*), except that the resultant Phone Windows file 1018 has a six digit (NPANXX) telephone number field instead of a 5-digit zip code field as in the Zip Windows file 104.

Off-line Merge Process

Figure 23:
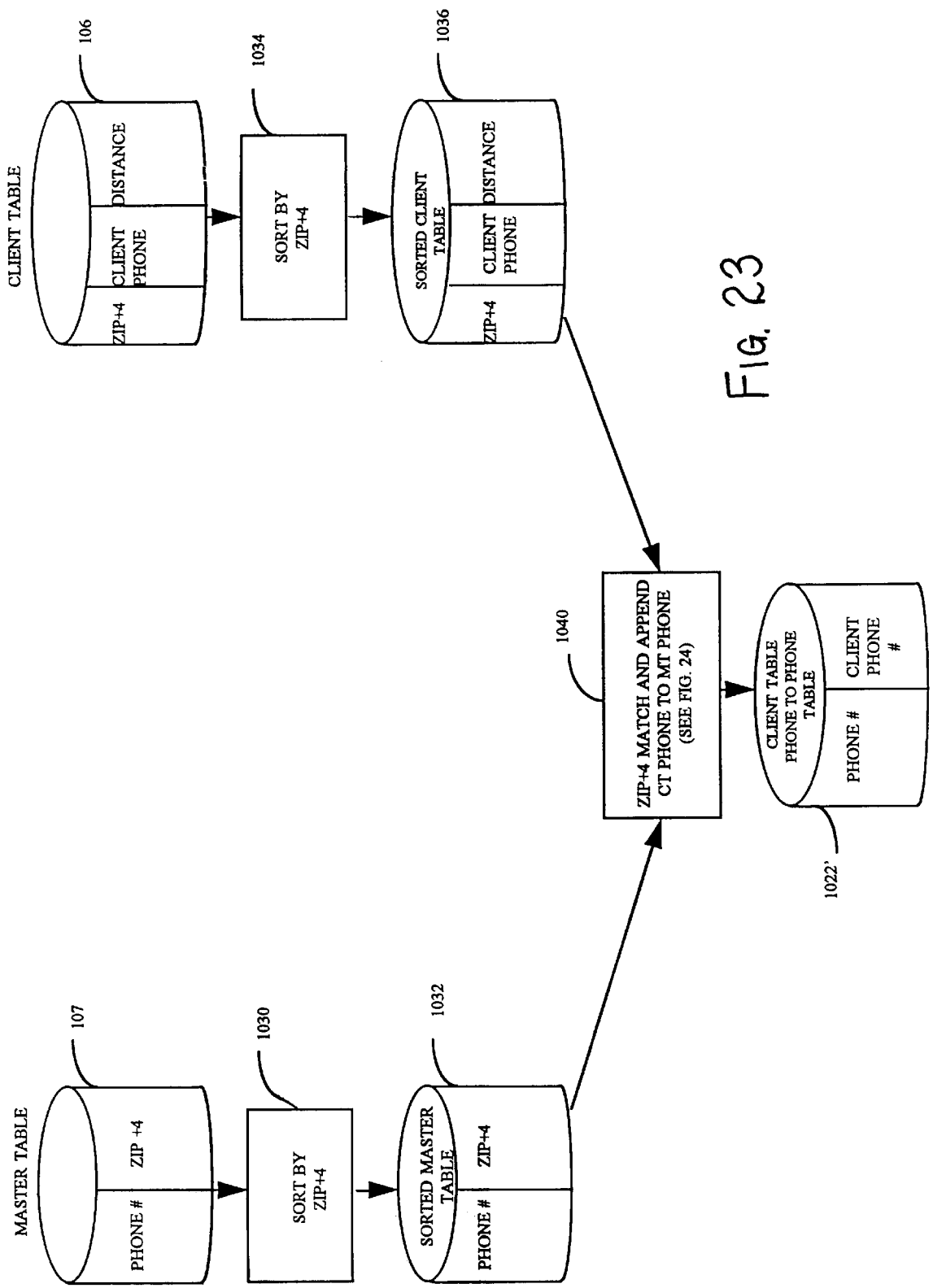
FIG. 23 is a block diagram illustrating files and processes utilized in a merge operation for a second embodiment of the One Table system.

Referring to FIG. 23, a second method used in building the Caller Telephone Number to Dealer Telephone Number table involves the off-line merging of ZIP+4 records from the Master Table 107 and Client Table 106. The Master Table 107 and Client Table 106 are generated as previously described in conjunction with the Two Table system above. As shown in FIG. 23, Master Table 107 and Client Table 106 are independently sorted in ascending ZIP+4 order by states 1030 and 1034 to create a sorted Master Table 1032 and a sorted Client Table 1036, respectively. These two sorted tables 1032 and 1036 are merged by a Match process 1040 to create a Caller Telephone Number to Service Location Telephone Number table 1022'. For each ZIP+4 record in the Master Table, the Match process 1040 preferably looks for matching ZIP+4 records in the Client Table and generates records in the Telephone Number to Telephone Number table 1022', as explained in the detailed description of process 1040 in conjunction with FIG. 24 below. The Telephone Number to Telephone Number table 1022' is again identical to the original Client Table 106 in structure, but with more records and with telephone numbers substituted for ZIP+4s.

Figure 24:
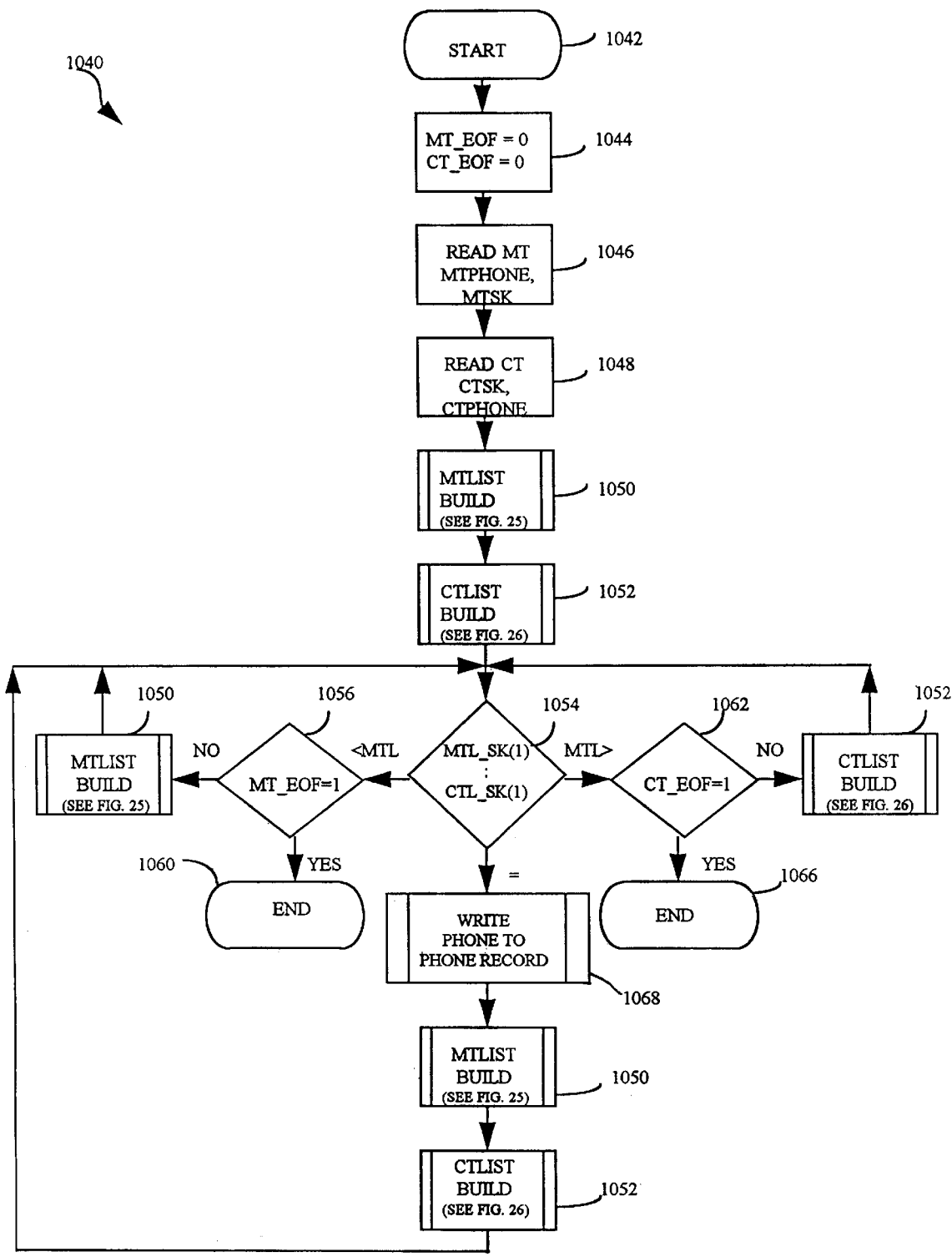
FIG. 24 is a flow diagram of the Match and Append function indicated at 1040 in FIG. 23.

Referring now to FIG. 24, the Match and Append (or Merge) process 1040, identified in FIG. 23, will be described. Process 1040 starts at state 1042 and proceeds to state 1044 that initializes the Master Table and Client Table End of File variables MT_EOF and CT_EOF to zero. Process 1040 then proceeds to state 1046 where it reads the first Master Table record containing a Master Table Telephone Number (MTPHONE) and a Master Table Spatial Key (MTSK). Process 1040 then proceeds to state 1048 where it reads the first Client Table record containing a Client Table Spatial Key (CTSK) and a Client Table Telephone Number (CTPHONE).

Process 1040 then calls function MTLIST_BUILD 1050 where it builds a memory resident list of all Master Table records having the current Spatial Key. Function 1050 is described in more detail in conjunction with FIG. 25 hereinbelow. Upon completion of function 1050, process 1040 calls function CTLIST_BUILD 1052 where it builds a memory resident list of all Client Table records with the current Spatial Key. Function 1052 is described in more detail in conjunction with FIG. 26. At the completion of function 1052, process 1040 proceeds to a decision state 1054 and compares the first Spatial Key (MTL_LIST(1)) in the Master Table list to the first Spatial Key (CTL_LIST(1)) in the Client Table list. There are three possible results of this comparison:

(1) the Client Table Spatial Key is greater than the Master Table Spatial Key;

(2) The Master Table Spatial Key is greater than Client Table Spatial Key; or (3) The Master Table Spatial Key and the Client Table Spatial Key are equal. These three possible results are described as follows:

(1) When the Client Table Spatial Key is greater than the Master Table Spatial Key, as determined at decision state 1054, process 1040 proceeds to a decision state 1056. If the Master Table End of File condition MT_EOF is equal to one, i.e., the merging process has completed, the Merge process 1040 terminates at state 1060. If the Master Table End of File condition MT_EOF is not equal to one, process 1040 calls function MTLIST_BUILD 1050 (described in more detail in conjunction with FIG. 25) which refreshes the Master Table List and then returns back to decision state 1054.

(2) When the Master Table Spatial Key is greater than the Client Table Spatial Key, as determined at decision state 1054, process 1040 proceeds to a decision state 1062. If the Client Table End of File condition CT_EOF is equal to one, i.e., the merging process has completed, the Merge process 1040 terminates at state 1066. If the Client Table End of File condition CT_EOF is not equal to one, process 1040 calls function CTLIST_BUILD 1052 (described in more detail in conjunction with FIG. 26) which refreshes the Client Table list and then returns back to decision state 1054.

(3) When the Master Table Spatial Key and the Client Table Spatial Key are equal, as determined at decision state 1054, process 1040 proceeds to Write Phone Number to Phone Number Record function 1068. Function 1068 writes out J times K records to the Phone to Phone Table 1022', wherein the value of J is obtained from function 1050 (FIG. 25) and the value of K is obtained from function 1052 (FIG. 26). Function 1068 performs this operation by writing out each MTL_PHONE(I) and CTL_PHONE(L) record combination by nesting a L=1 to K loop for the Client Table List within an I=1 to J loop for the Master Table List. At the completion of function 1068, process 1040 proceeds to function 1050 which refreshes the Master Table List and was previously described. Process 1040 then proceeds to function 1052 which refreshes the Client Table list and was also previously described. After refreshing both the Master Table list and the Client Table list, process 1040 returns to decision state 1054 to continue the Merge process.

Figure 25:
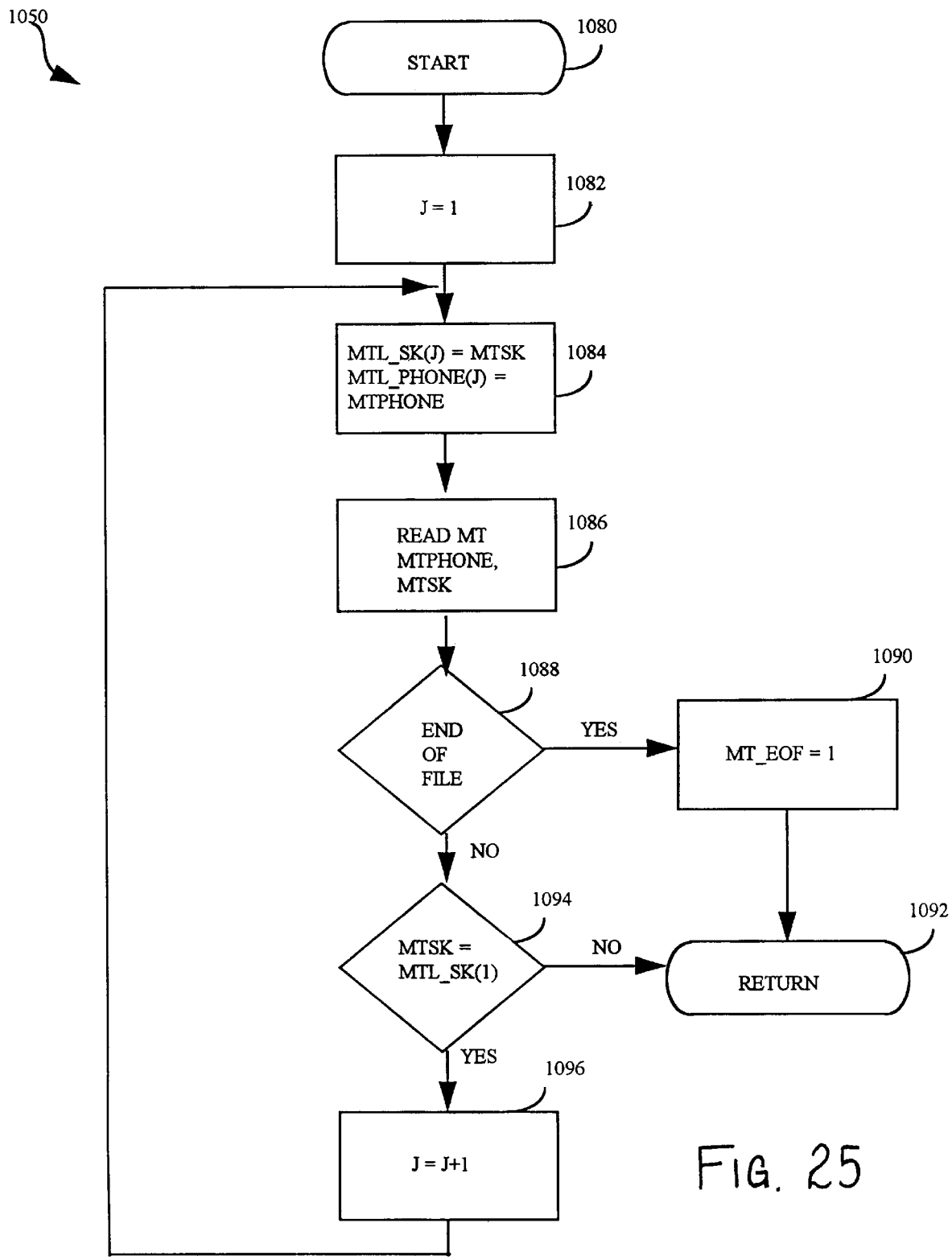
FIG. 25 is a flow diagram of the build Master table list subroutine 1050 shown in FIG. 24.
Figure 26:
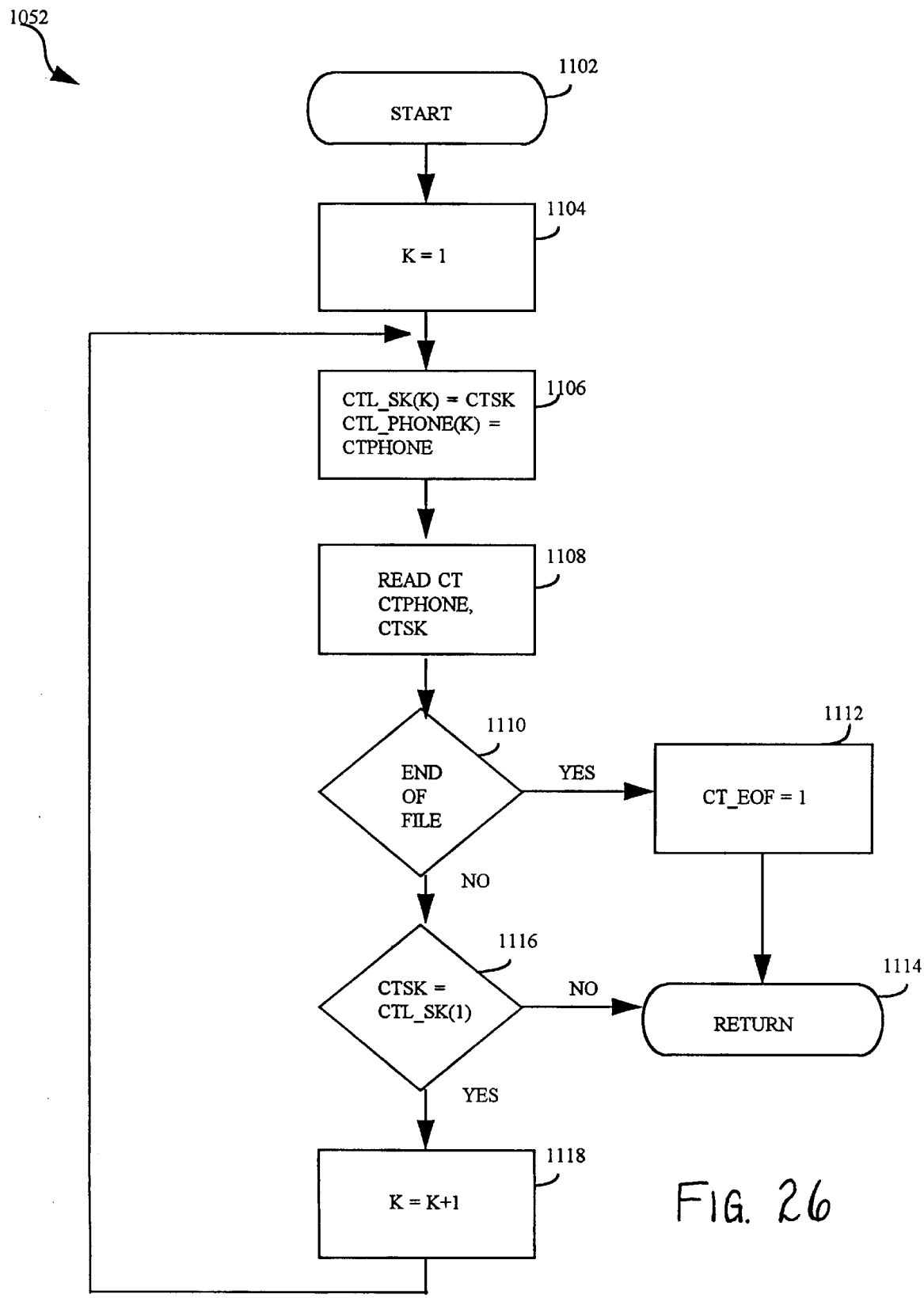
FIG. 26 is a flow diagram of the build Client table list subroutine 1052 shown in FIG. 24.

Referring now to FIG. 25, the Master Table List Build function 1050, identified in FIG. 24, will be described. Function 1050 starts at state 1080 and proceeds to state 1082 where variable J is set to one. Function 1050 then proceeds to state 1084 where it moves the current Master Table record Spatial Key (MTSK) and Master Table Telephone Number (MTPHONE) to their corresponding elements: MTL_SK(J) and MTL_PHONE(J) in the Jth row of the memory resident Master Table list.

Function 1050 then proceeds to state 1086 where it reads the next Master Table record containing the Master Table Telephone Number (MTPHONE) and the Master Table Spatial Key (MTSK). Function 1050 then proceeds to a decision state 1088 where it determines if it has reached a Master Table End of File condition. If the End of File condition has been reached, function 1050 sets the Master Table End of File variable MT_EOF to one at state 1090 and returns control at state 1092 to process 1040 at function 1052 (FIG. 24). If the End of File condition has not been reached, as determined at decision state 1088, function 1050 proceeds to a decision state 1094. At decision state 1094, function 1050 compares the current Master Table Spatial Key value (MTSK) to the first Spatial Key in the Master Table List (MTL_LIST(1)) to determine if the two Spatial Keys are equal. If they are not equal, function 1050 returns control at state 1092 to process 1040 (FIG. 24). If the two Spatial Keys are equal, function 1050 increments the value of J by one at state 1096 and proceeds back to previously described state 1084.

Referring now to FIG. 26, the Client Table List Build function 1052, identified in FIG. 24, will be described. Function CTLIST_BUILD 1052 performs the same process with the Client Table as Function 1050 (FIG. 25) does with the Master Table. Function 1052 starts at state 1102 and proceeds to state 1104 where the variable K is set to one. Function 1052 then proceeds to state 1106 where it moves the current Client Table record's Spatial Key (CTSK) and Client Table Telephone Number (CTPHONE) to their corresponding elements: CTL_SK(K) and CTL_PHONE(K) in the Kth row of the memory resident Client Table list. Function 1052 then proceeds to state 1108 where it reads the next Client Table record containing the Client Table Telephone Number (CTPHONE) and the Client Table Spatial Key (CTSK).

Function 1052 then proceeds to a decision state 1110 where it determines if it has reached a Client Table End of File condition. If the End of File condition has been reached, function 1052 sets the Client Table End of File variable CT_EOF to one at state 1112 and returns control at state 1114 to process 1040 (FIG. 24). If the End of File condition has not been reached, as determined at decision state 1110, function 1052 proceeds to a decision state 1116. At decision state 1116, function 1052 compares the current Client Table Spatial Key value (CTSK) to the first Spatial Key in the Client Table List (CTL_LIST(1)) to determine if the two Spatial Keys are equal. If they are not equal, function 1052 returns control at state 1114 to process 1040 (FIG. 24). If the two Spatial Keys are equal, as determined at decision state 1116, function 1052 increments the value of K by one at state 1118 and proceeds to previously described state 1106.

IX. Computer-Telephone Integration (CTI) Network Configuration for One Table System Referring to FIG. 27, a preferred CTI network configuration for the One Table system 1000 will be described. The network configuration utilizes the tables described in conjunction with FIGS. 22 or 23. A telephone call, placed from a calling telephone 110, is first processed by a switch (not shown) at a Local Exchange Carrier (LEC), such as Pacific Bell or Southwest Bell, near the caller. The switch at the LEC assigns an Automatic Number Identification (ANI) that is independent of the type of telephone used. Caller ID technology provides an alternate way of getting the caller's number, but the technology is presently state regulated as to availability, and the technology can be blocked under certain circumstances. According to AT&T, over 98% of all switches currently assign and pass a 10-digit ANI. The call, the ANI and Dialed Number Identification Service (DNIS) numbers are then passed through a national long-distance network carrier, such as AT&T, MCI, or Sprint, to a long distance network (LDN) terminating switch 111. The LDN terminating switch 111 can be connected to another switch (not shown) at the LEC servicing the terminating location or it can be a switch, such as an AT&T MEGACOM 800 switch or an AT&T MULTIQuest 900 switch connected directly to a call processing center interface point 1130. The preferred implementation in this Computer Telephone Integration network is a direct connect to the AT&T long distance network using the AT&T MEGACOM 800 service which employs an AT&T 4 ESS digital switch 111.

The terminating switch 111 passes the call, the ANI and the DNIS to the interface box 1130 between the network and the call center. The interface box 1130 is preferably a VRU or interactive voice response unit (IVRU), such as an AT&T Conversant System, and is the hub in providing CTI. An alternative embodiment utilizes an interface box 1130 without voice/speech features. The interface box 1130 has the ability to control call processing by accepting the voice signal, the ANI, and the DNIS from the telephone network switch 111, speaking recorded voice messages to the caller, accepting caller DTMF keypad input, translating caller voice input and commands, e.g., "1", "2", "3", "A", "B", "C", "Yes" and "No", to computer data codes, translating computer text into synthesized speech and speaking the synthesized speech to the caller. The interface box 1130 also communicates with other telephone and computer network systems via communications protocols, such as ISDN and TCP/IP, over a Local Area Network (LAN) 1132 to obtain additional information required for processing the call. The interface box 1130 optionally connects the caller to a servicing location telephone, e.g., at a service location 150a, or transfers the caller to the servicing location using an advanced network feature, such as AT&T's Transfer Connect. The LAN 1132 is dual wired for redundancy.

The interface box 1130 first communicates with a Structured Query Language (SQL) database server 1134 to update, validate and determine the type of the caller-provided telephone number. The type of telephone number refers to whether it is a U.S. POTS telephone number or not, e.g., a non-POTS number may correspond to a pager, a cellular telephone or a personal communications service (PCS) telephone, and a non-U.S. number may be a Canadian telephone number. The caller-provided telephone number is either the result of a normal caller-initiated call (ANI or caller ID), or the result of state 118 (FIG. 28) where the caller provides an alternate telephone number. The preferred SQL Server software provider is Oracle Corporation. The preferred server is an AT&T 3600 UNIX box. Other servers or database software types may be used in other embodiments.

The database server 1134 has two databases that provide the information to update, validate and classify the telephone number. The first is a Bellcore NPANXX Split file 1136. The "NPANXX" represents the first six digits of the ten digit telephone number, corresponding to an area code and a telephone exchange. This file 1136 provides a list of NPANXXs that are in the process of being split into new area codes and exchanges. If the caller provided NPANXX is in this list and the current date falls within a date range related to the split retrieved from the file, the caller-provided telephone number is updated according to the data in the Split file 1136. Next, the caller's NPANXX is compared against Bellcore's V&H Coordinate file 1138 which lists all valid NPANXXs and the types of services supported by the NPANXX. Both the NPANXX Split file 1136 and the V&H Coordinate file 1138 are extracts from Bellcore's Local Exchange Routing Guide (LERG). The LERG is the master database used by all common carriers for routing call in the North American Dialing Plan telecommunications network. If the caller provided NPANXX is listed in the V&H file 1138 as a U.S. Plain Old Telephone Service (POTS) number, the caller's time zone and daylight savings time indicator are returned. If on the other hand, the caller's NPANXX is invalid, the interface box 1130 requests the caller to provide another telephone number. If the NPANXX is valid, but a non-U.S. number, or a special purpose telephone number, such as "NPA_555", a prerecorded message related to the caller's telephone number type will be played for the caller, and the caller will be asked to enter another telephone number or the caller will be connected to an exceptions call handling operator 1146.

If the caller's NPANXX is determined to be a valid U.S. POTS number, the interface box 1130 sends an inter-process communication request containing the caller-provided telephone number and DNIS to a routing processor 1150. The routing processor 1150 is a UNIX-based computer, such as an AT&T 3600, that has access to the Telephone Number to Telephone Number Table 1022 corresponding to the DNIS. The routing processor 1150 processes the request by retrieving the caller provided telephone number dependent data from the Client Telephone Number to Telephone Number Table and returns a status code, and if successful, a list of service location telephone numbers or IDs. If the return status code is an unsuccessful type, the interface box 1130 either plays a prerecorded message for the caller or connects the caller to the exceptions call operator 1146.

Figure 22:
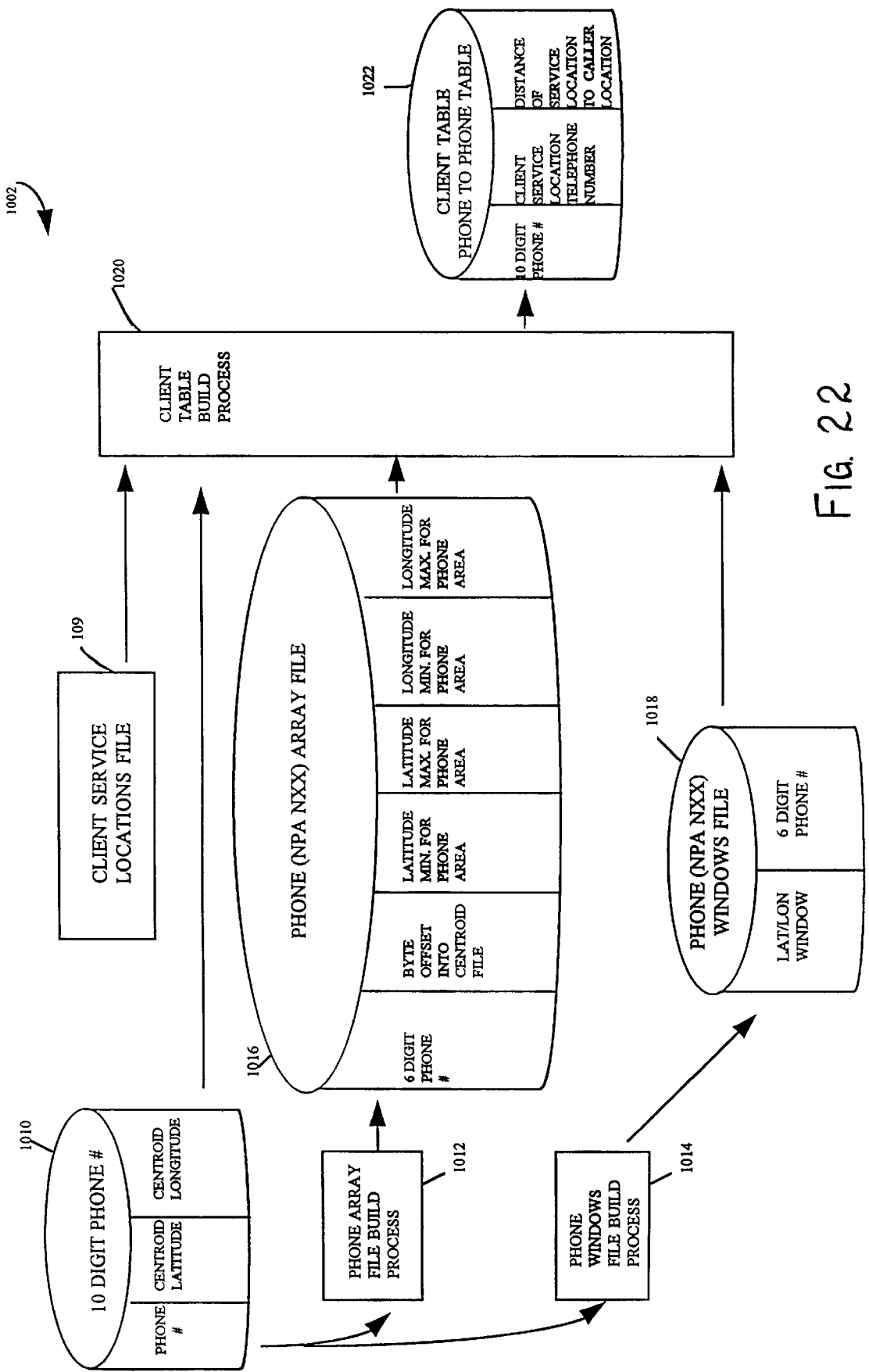
FIG. 22 is a block diagram illustrating files and processes utilized in the Client Table Build process where the Client table is a Telephone Number to Telephone Number table for a first embodiment of a One Table system.

If the routing processor request is returned as successful, the interface box 1130 then makes inquiries to the database server 1134 for the Client Service Locations table 1140 associated with the caller's DNIS and retrieves records associated with the service location IDs returned by the routing processor 1150. Table 1140 is an indexed and on-line version of Client Service Locations table 109 (FIG. 22). These retrieved records contain information such as the service location telephone number, days and hours of operation, name, address and micro-area directions, time zone, daylight savings indicator and so forth. Next, the interface box 1130 determines which servicing locations are open to handle the caller's request. Depending upon the client application, the interface box 1130 provides the caller, via recorded voice or synthesized text to speech, service location information and/or connects the caller directly with the closest or selected currently open servicing location.

If the call requires operator exception handling, the interface box 1130 connects the caller to the operator 1146, using a video display, through a CTI public branch exchange (PBX)/automatic call distributor (ACD) 1142 and host system 1144. The PBX/ACD 1142, such as a System 75 available from AT&T, provides the caller's voice to the operator 1146. The host system is preferably a 3090 mainframe computer, available from IBM. The host system 1144 provides database data from the server 1134 on the operator's video display. The host system 1144 is supported by AT&T American Transtech in Jacksonville, Fla. The operator 1146 handles the request and passes the information required to connect the caller to a servicing dealer or terminates the call with a pre-recorded message back at the interface box 1130.

There are two choices in connecting the caller to the servicing dealer. The interface box 1130 can generate a second call from the interface box 1130 to the servicing location, e.g., location 150*a*, and connect the caller to the servicing location through the interface box 1130. Alternatively, the interface box 1130 can use an advanced network feature "Transfer Connect" marketed by AT&T to transfer the call directly to the servicing dealer. The latter is the preferred implementation because it reduces telecommunications cost and interface box port capacity requirements.

The Servicing location answers the call using a conventional telephone 150*a* or other telephone call receiving mechanisms. The servicing location can then handle the caller's request.

X. One Table System Example

Figure 28:
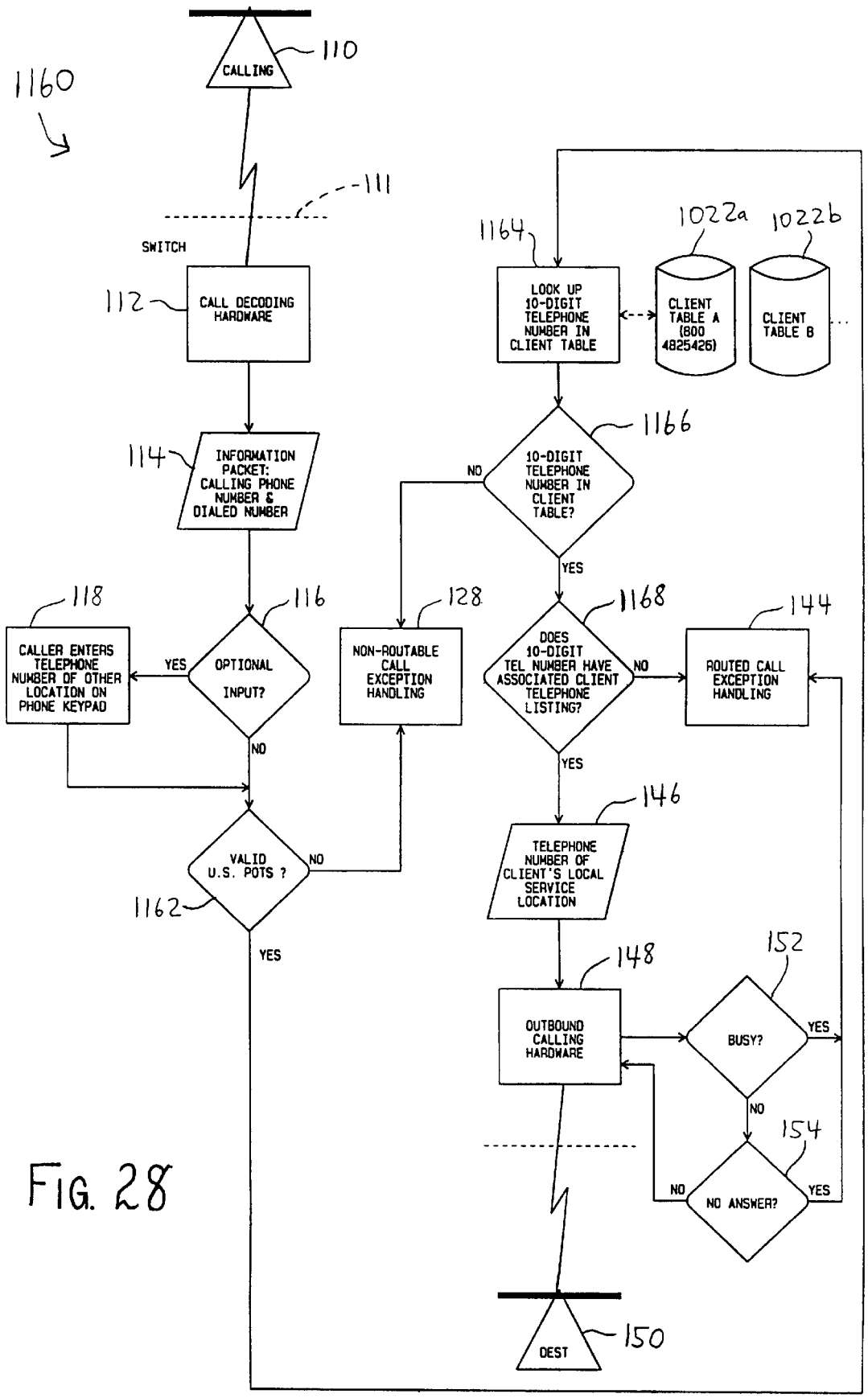
FIG. 28 is a flow diagram of an embodiment of the call processing linking process for interconnecting a caller at a calling telephone and a destination telephone using the tables of FIG. 22 or FIG. 23 and the network configuration of FIG. 27.

Referring to FIG. 28 (in combination with FIG. 27), the Call Processing process 1160 will be described. The One Table system 1000 executes the flow process shown by the flow diagram of Call Processing process 1160. The process is used to route a caller's telephone call to a client's destination service location by use of a single routing table. The process 1160 utilizes the network configuration for the One Table system 1000 described in conjunction with FIG. 27.

Process 1160 starts with the caller dialing, for example, an "800" type telephone number using, for example, a conventional telephone 110. The call is preferably routed by the national telecommunications network to a network interface box 1130 (FIG. 27) at the call processing center where it is answered. A call decoding module or component 112 of the network interface box 1130 decodes a network information packet 114, which contains the telephone number of the caller, provided by ANI, and the dialed number, i.e., the DNIS number.

Process 1160 then proceeds to a decision state 116 and determines if the call application requires optional input. If not, process 1160 proceeds to a decision state 1162. However, if the call application does require optional input, as determined at decision state 116, process 1160 moves to state 118, wherein the caller provides a telephone number of another person or business which is usually associated with a location different than the location associated with the ANI. The new telephone number can be entered by the caller using a DTMF keypad, e.g., on a touch tone telephone, by a computer or other device that can produce touch tone sounds, or by speaking the information to the interface box 1130 (FIG. 27). State 118 also checks the caller provided telephone number against the Bellcore NPANXX Split file 1136 (FIG. 27) and the Valid Telephone Number file 1138 (FIG. 27) and prompts the caller for another telephone number if the caller provided number is invalid.

Once the input telephone number is determined to be valid, or if the number is still invalid after the caller has made a client-specified number of attempts at providing a valid number, process 1160 proceeds to decision state 1162. At decision state 1162, process 1160 determines if the caller's telephone number or caller provided telephone number is a valid U.S. POTS number. If not, the process 1160 moves to state 128 for non-routable call exception handling, as previously described at state 128 in conjunction with FIG. 1*c*. If the caller provided telephone number is a valid U.S. POTS number, as determined at decision state 1162, process 1160 moves to state 1164 wherein the caller provided number is used as an index for the Telephone Number to Telephone Number Table 1022 associated with the caller's DNIS.

Moving to a decision state 1166, process 1160 determines if the caller's telephone number was found. If it was not found, process 1160 proceeds to state 128 for non-routable call exception handling, as described above. If the caller-provided telephone number is found, the corresponding telephone number's record(s) is retrieved and process 1160 proceeds to a decision state 1168 to determine if the retrieved record(s) contains a servicing location telephone number. If no servicing location telephone number is present, process 1160 proceeds to routed call exception handling state 144, as previously described at state 144 in conjunction with FIG. 1*c*.

If a servicing location telephone number is present, as determined at decision state 1168, process 1160 extracts the telephone number of the client's local service location at state 146 and moves to state 148 where it dials the retrieved service location's telephone number. The outbound calling module or hardware utilized at state 148 is part of the network terminating point interface box 1130 (FIG. 27). If the dialed number is busy, as determined in decision state 152, or there is no answer, as determined in decision state 154, then the call is routed to routed exception call handling 144, as described above. If the call does not encounter a busy signal and there is an answer, the caller is connected to the servicing location 150 and the servicing location handles the caller's request.

XI. Overview of Real-Time Process System

In applications, where high call volumes and transaction processing speed are not an issue, where there is no requirement to link to other Spatial Key coded databases, and/or where disk storage is a limited resource, a client may elect to perform the calculations required to associate precise locations corresponding to a caller-provided telephone number to servicing locations of any defined size or shape during call processing. The general components and techniques required to perform real-time caller-provided telephone number to servicing location association have been previously described above in conjunction with the Two Table system. Modifying these techniques in a real-time processing configuration provides further improvements in efficiency for the real-time association process. The following description explains the real-time process which requires a Master 10-digit Telephone Number to Latitude and Longitude Centroid file 1010 (FIG. 29) and a Client Service Location file 109. Client servicing location service areas, part of each record of file 109, are described as a precise latitude and longitude service location address with a radii-defined service area or as a service area polygon defined by a set of latitude and longitude vertices.

In the Two Table system Client Table Build processes for radii and polygon Client Tables, the system reads a list of service areas one by one, determines which ZIP+4s are within each service area, calculates the distance from each ZIP+4 to the service location, writes a record for each contained ZIP+4 to a file, and sorts and indexes the file by ZIP+4 and further, by ascending distance.

Figure 29:
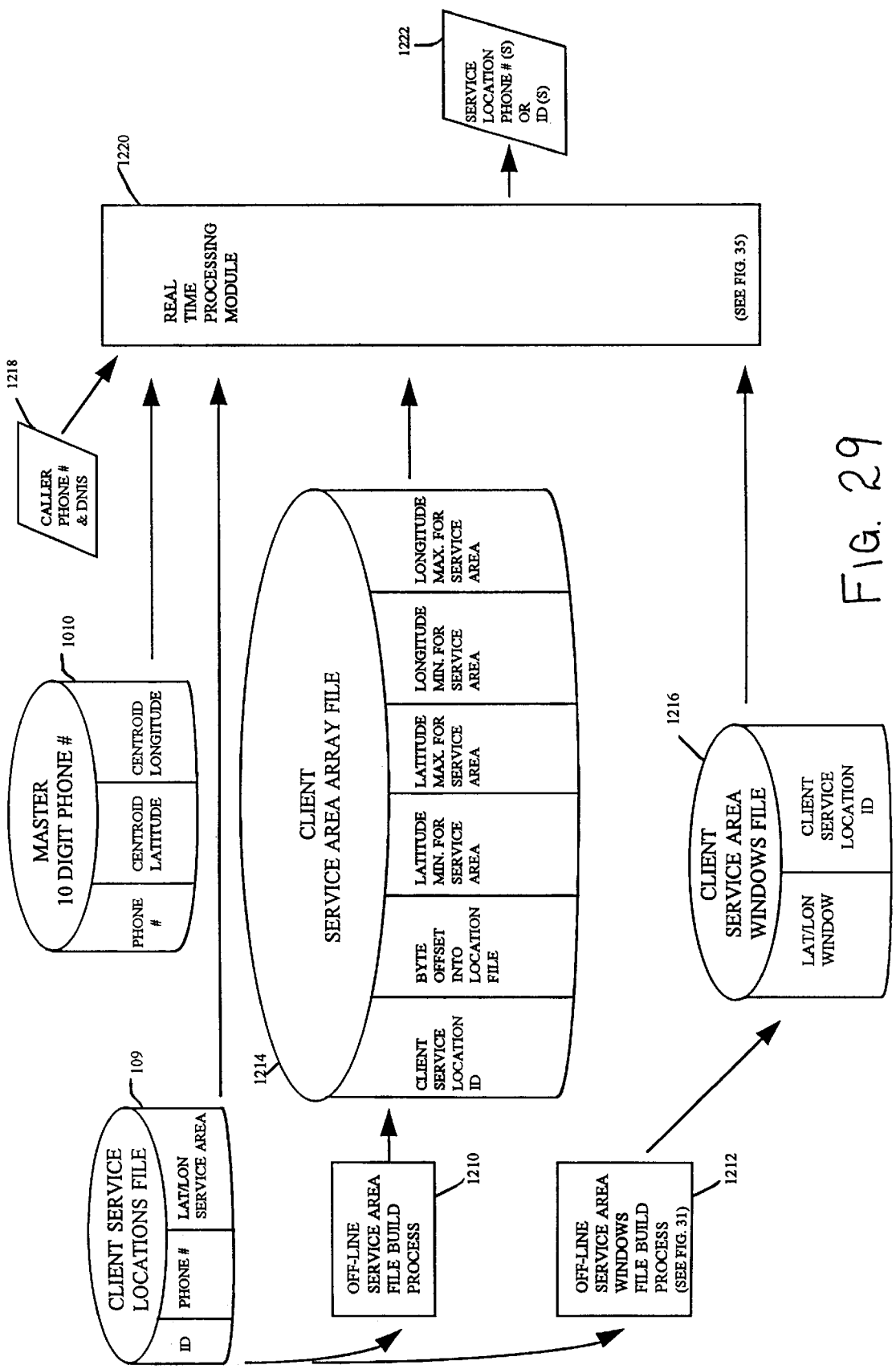
FIG. 29 is a block diagram of the files and processes utilized in a Real-Time Process embodiment of the system.

Referring to FIG. 29, the files and processes required in the Real-Time Process system 1200 (FIG. 30) will be described. A Real-Time Processing module 1220 executes on one of a set of routing processors 1150 (FIG. 30) of system 1200 (FIG. 30) to route a telephone call in real-time. In addition to the Master 10-digit Telephone Number to Latitude and Longitude Centroid file 1010 and the Client Service Location file 109, Real-Time Processing module 1220 utilizes a Client Service Area Array file 1214, a Client Service Area Windows file 1216 and a caller or caller provided telephone number with a DNIS 1218. The output of module 1220 is a sorted list 1222 of service location telephone numbers or IDs. The module 1220 will be described in more detail in conjunction with FIG. 35.

The Master 10-digit Telephone Number to Latitude and Longitude Centroid file 1010 and the Client Service Location file 109 were previously described in conjunction with the One Table system above. The Client Service Area Array file 1214 and the Client Service Area Windows file 1216 are built using the latitude/longitude extremes of both the radii and polygon services areas in the Client Service Locations file 109 as explained below.

Specifically, the Client Service Area Windows file 1216 is generated by an off-line Service Area Windows File Build process 1212, which utilizes the Client Service Locations file 109. Process 1212 will be described in more detail in conjunction with FIG. 31 hereinbelow.

The Client Service Area Array file 1214 is generated by an off-line Service Area File Build process 1210, which utilizes the Client Service Locations file 109. The Service Area File Build process 1210 is similar to the Zip Array File Build process 101 (FIG. 1*a*) and the Phone Array File Build process 1012 (FIG. 22), except that the resultant Client Service Area Array file 1214 has a client service location ID field instead of a 5-digit zip code field as in the Zip Array file 103 or the six digit (NPANXX) telephone number field for the Phone Array file 1016. The byte offset field of file 1214 contains an offset into an indexed version (table 1140, FIG. 30) of Client Service Locations file 109 rather than an offset into the Centroid file 100 (FIG. 1*a*) or Centroid file 1010 (FIG. 22). Furthermore, the latitude/longitude minimums and maximums are for a client service area rather than for the 5 digit zip code area of file 103 or the area defined by the first six digits of the telephone number of file 1016. The Client Service Area Array file 1214 is used to eliminate service locations whose latitude and longitude service area extremes do not encompass the latitude and longitude of the location corresponding to the caller provided telephone number. Since file 1214 only contains a byte offset index and latitude and longitude extremes, which are also created by process 1212 described hereinbelow, process 1210 is not described in further detail.

In real-time processing, the system executes the Real-Time "during call process" module 1220 of building a list of service locations with telephone numbers whose service areas encompass the location of a caller provided telephone number. This Real-Time process 1220 is further described by reference to FIG. 35 below. The Real-Time process 1220 determines the latitude/longitude of the location corresponding to the caller provided telephone number by retrieving the caller provided telephone number's record from the Master Telephone Number to Latitude and Longitude Table 1010. Based on this latitude and longitude and the DNIS dependent Client Service Area Windows file 1216, the Real-Time process 1220 spatially determines a list of client locations that potentially service the caller's location. This list determination step is described by reference to FIG. 35 and generally referenced to at 1344 and 1346, and is discussed in more detail in conjunction with FIG. 36 hereinbelow.

The Real-Time process 1220 then performs a detailed spatial test on each potential location in the list to determine if the caller's latitude/longitude is inside the service location's service area. If it is inside, the system calculates the distance from the caller to the service location and adds it to the list of servicing locations. The detailed spatial test and distance steps are described by reference to FIG. 35 and generally referenced to at 1348, and are further discussed in conjunction with FIGS. 37 and 38 hereinbelow. After all potential locations have been processed, the servicing list is sorted in ascending order based on distance and passed back to the call processing application job stream to be used in routing the telephone call.

Like for the Two Table system, real-time processing supports both polygon and radius service areas as was described in the Two Table system Client Table Build processes. For real-time processing, the Radii and Polygon "inside service area" processes are part of the same call processing kernel system but each requires its own low level function (in FIG. 38) to determine if the caller's location is inside or outside a service location's radii or polygon defined service area.

Among the several embodiments, the Real-Time Process system is the simplest to update and requires the least storage. The spatial relationship of the caller-provided telephone number to a client's servicing locations is determined at the time of the call. The Master Table of telephone numbers with latitudes and longitudes and each client's Service Location files can be maintained independently and can reside on different machines.

Figure 30:
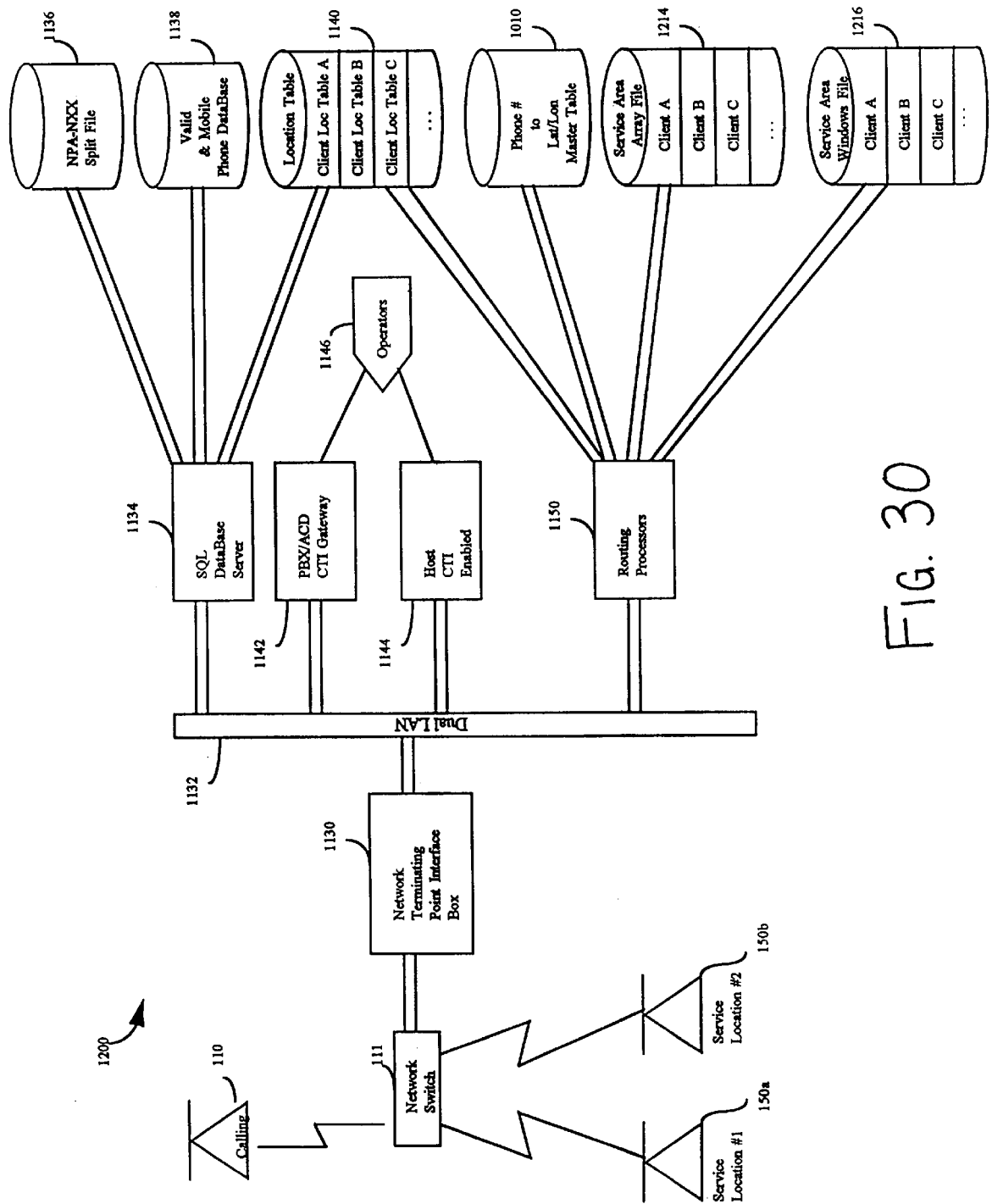
FIG. 30 is a block diagram of the Real-Time Process system, including a network configuration utilized at a call processing center.

XII. Computer-Telephone Integration Network Configuration for Real-Time Process System Referring to FIG. 30, the real-time determination system network configuration will be described. This network configuration and call processing logic are identical to that shown in FIG. 27 for the One Table system, with the exception of the processing logic and databases accessed by the routing processor 1150. To avoid redundancy, only these differences will be discussed. In FIG. 30, as in FIG. 27, the routing processor 1150 accepts a caller provided telephone number and DNIS as input from the interface box 1130 and returns a processing status code and, if successful, a list of servicing locations associated with the DNIS whose service areas encompass the location of the caller provided telephone number.

In performing this function, routing processor 1150 (FIG. 30) first looks up the caller provided telephone number in the Master Telephone Number to Latitude and Longitude Table 1010. If the telephone number is not found, the status code is set to a value corresponding to "unsuccessful, telephone number not in Master table" and this information is returned to the interface box 1130. On the other hand, if the telephone number is found, the latitude and longitude are retrieved from table 1010.

Next, processor 1150 converts the retrieved latitude and longitude into a lat/lon (latitude and longitude) window by the following equation: Lat/Lon Window=(integer of (caller location latitude multiplied by ten)) multiplied by 10,000 plus (integer of (caller location longitude multiplied by ten)). The processor 1150 then looks up the lat/lon window in the Service Area Windows file 1216 associated with the caller's DNIS. If the lat/lon window is not found, the status code is set to the value corresponding to "unsuccessful, no lat/lon window found" and this information is returned to the interface box 1130. If the lat/lon window is found, a list of potential servicing location IDs or telephone numbers is returned.

For each service location ID or telephone number in the potential list, processor 1150 looks up the ID in the Service Area Array file 1214 associated with the caller's DNIS and retrieves the latitude and longitude extremes for the service area and the byte offset which indicates the start of the service location record in the Service Locations table 109. Next, processor 1150 determines if the latitude and longitude of the location corresponding to the caller provided telephone number lies inside latitude and longitude extremes of the current service area being tested. If not, processor 1150 proceeds to the next location in the potential list. Otherwise, the caller provided telephone number's latitude and longitude lies inside the currently tested service area's extremes, and processor 1150 retrieves the detailed service area definition from the Client Service Locations Table 1140 associated with the caller's DNIS. Table 1140 is an indexed and on-line version of Client Service Locations Table 109. Based on the type of service area associated with the retrieved detailed record, i.e., radius or polygon, processor 1150 performs the appropriate low level function call to determine if the location of the caller provided telephone number is located within the service area currently being evaluated. If not, processor 1150 proceeds to the next location in the potential list. If the location is inside, processor 1150 calculates the distance from the caller location to the service location, adds the record to an "inside service area" list and proceeds to the next record on the potential list.

After processing all records in the potential list, processor 1150 determines if the "inside service area" list is null, i.e., contains no records. If the list is null, the status code value is set to correspond to the message, "unsuccessful, no records in inside service area list" and this information is returned to interface box 1130. If the "inside service area" list contains records, the list is sorted by ascending distance, the status flag value is set to correspond to "successful" and this information is returned to interface box 1130 where it is handled in exactly the same manner as was described for the One Table system in FIG. 27.

XIII. Real-Time Process: Off-line Client Service Area Windows File Build Process FIGS. 31–34 describe process 1212 that builds the Client Service Area Windows file 1216. This file contains an indexed latitude and longitude window list that includes a record for each latitude and longitude window and service location combination wherein the location's service area potentially overlaps the latitude and longitude window. File 1216 is used to quickly determine a potential list of servicing locations that overlap the location of the caller provided telephone number by looking up records with a latitude and longitude window equal to that of the caller provided telephone number. The Client Service Area Array file 1214 is used to eliminate service locations whose latitude and longitude service area extremes do not encompass the latitude and longitude of the location corresponding to the caller provided telephone number.

Figure 31:
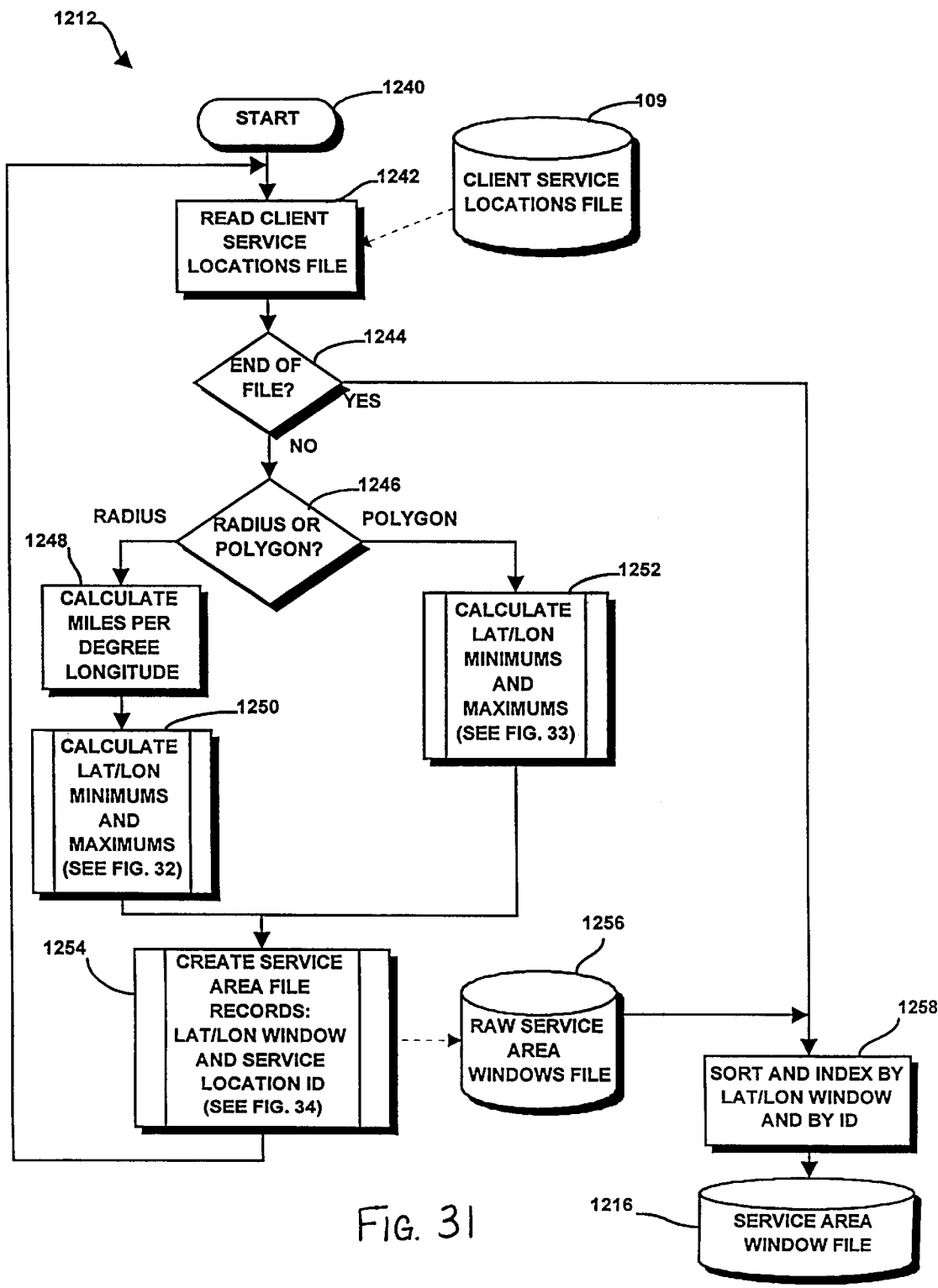
FIG. 31 is a flow diagram of the Service Area Windows File Build process indicated at 1212 in FIG. 29.

FIG. 31 shows an overview of the Client Service Area Windows File Build process 1212. Process 1212 begins at a start state 1240 and proceeds to state 1242 where it reads a record from the Client Service Locations file 109. Moving to a decision state 1244, process 1212 checks for an End of File condition. If the End of File condition is "yes", i.e., all records in file 109 have been read, process 1212 proceeds to state 1258 to finish the process. If the End of File condition is "no", i.e., all records in file 109 have not been read and processed, process 1212 performs a test at decision state 1246 to determine if the record just read from file 109 has a radius or polygon defined service area. File 109 has a field that denotes the type of service area.

If decision state 1246 determines that the service area type is radius, process 1212 proceeds to state 1248 where it calculates the number of miles per degree longitude at the latitude of the current service location. There are 68.9404 miles per degree latitude. The number of miles per degree longitude is a function of the latitude and is determined by the following function: Miles per degree longitude=68.9404 * COSINE(Latitude). After performing this calculation, process 1212 calls a function 1250 to determine the latitude and longitude minimums and maximums for the radius type service area. Function 1250 is described in more detail in conjunction with FIG. 32.

If decision state 1246 determines the service area type is polygonal, process 1212 proceeds to call a function 1252. Function 1252 determines the latitude and longitude minimums and maximums for the polygonal type service area. Function 1252 is described in more detail in conjunction with FIG. 33.

At the completion of function 1250 for a radius service area or function 1252 for a polygonal service area, process 1212 continues to a Write Service Area Window Record function 1254. The Write Service Area Window Record function 1254 creates a record in a Raw Service Windows file 1256. Function 1254 will be described in more detail in conjunction with FIG. 34. At the completion of function 1254, process 1212 loops back to state 1242 to read the next record in the Client Service Locations file 109.

Returning to decision state 1244, after reaching the End of File condition, process 1212 proceeds to state 1258. At state 1258, the Raw Service Windows file 1256 is sorted and indexed in ascending order by lat/lon (latitude/longitude) window and location ID within lat/lon window. The sorted and indexed results are written to the Client Service Area Windows file 1216 and the process 1212 completes.

Figure 32:
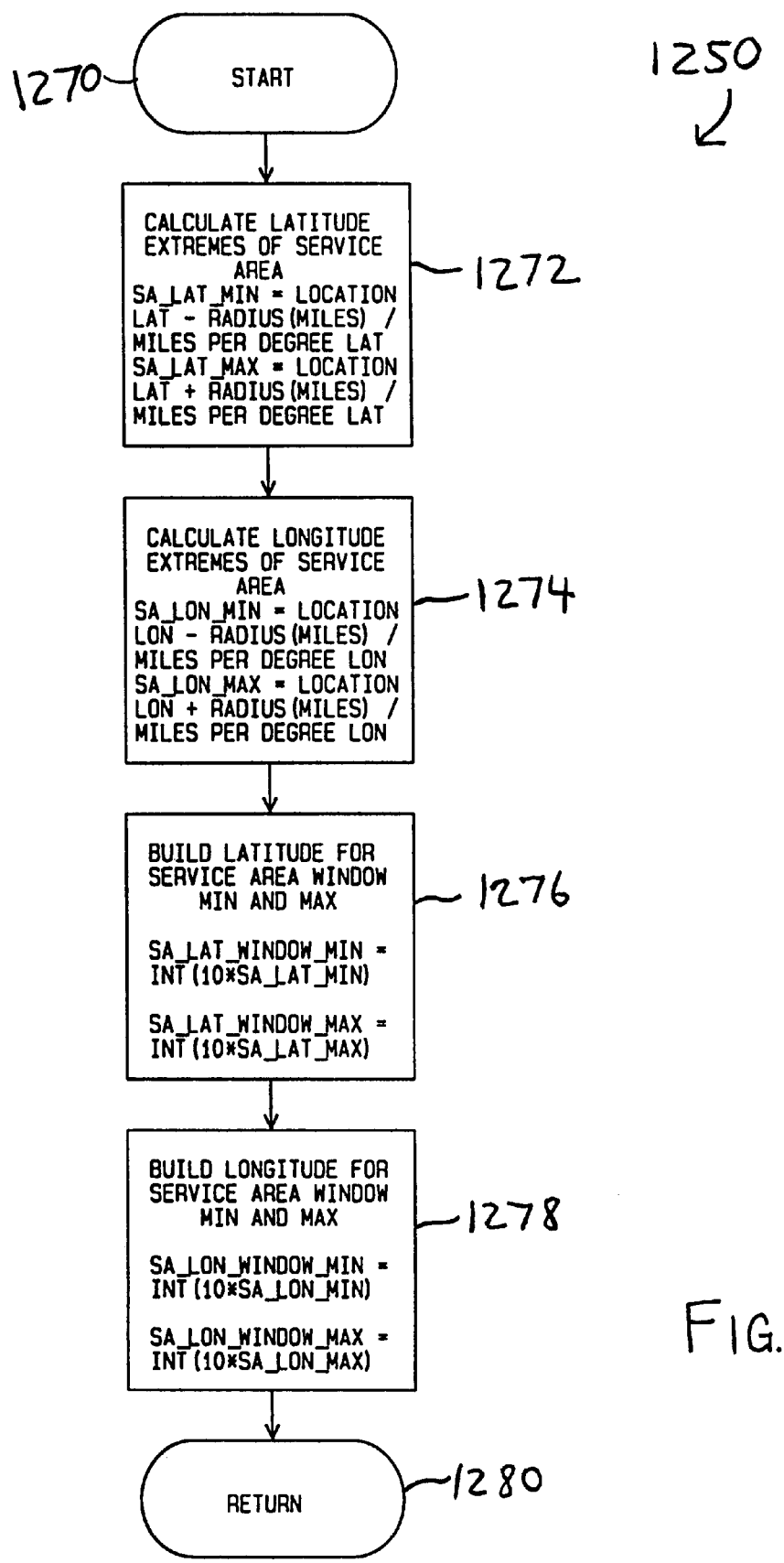
FIG. 32 is a flow diagram of the Radius Latitude/Longitude function indicated at 1250 in FIG. 31.

Referring now to FIG. 32, the Calculate Latitude and Longitude Minimums and Maximums function 1250 for a radius type service area will be described. Function 1250 begins at a start state 1270 and proceeds to state 1272 where it calculates the latitude minimum and maximum of the service area for the current location. The current service area's minimum latitude is equal to the current location's latitude minus the service area radius in miles divided by miles per degree latitude. The current service area's maximum latitude is equal to the current location's latitude plus the service area radius in miles divided by miles per degree latitude. Function 1250 proceeds to state 1274 where it calculates the longitude minimum and maximum of the service area for the current location. The current service area's minimum longitude is equal to the current location's longitude minus the service area radius in miles divided by miles per degree longitude. The service area's maximum longitude is equal to the current location's longitude plus the service area radius in miles divided by miles per degree longitude.

Next, function 1250 moves to state 1276 where it builds the minimum and maximum latitude components of the lat/lon windows association with the service location and its service area. The minimum latitude window component is equal to the integer of ten times the service area latitude minimum, where the latitude is expressed in degrees and decimal parts of degrees. The maximum latitude window component is equal to the integer of ten times the service area latitude maximum, where the latitude is expressed in degrees and decimal parts of degrees. Function 1250 continues to state 1278 where it builds the minimum and maximum longitude component of the lat/lon windows associated with the current service location and its service area. The procedure for building the window longitude extremes is exactly the same as the procedure for building the latitude extremes, except that the latitude values are replaced with longitude values. At the completion of state 1278, function 1250 proceeds to return state 1280 and returns to process 1212 at function 1254 (FIG. 31).

Figure 33:
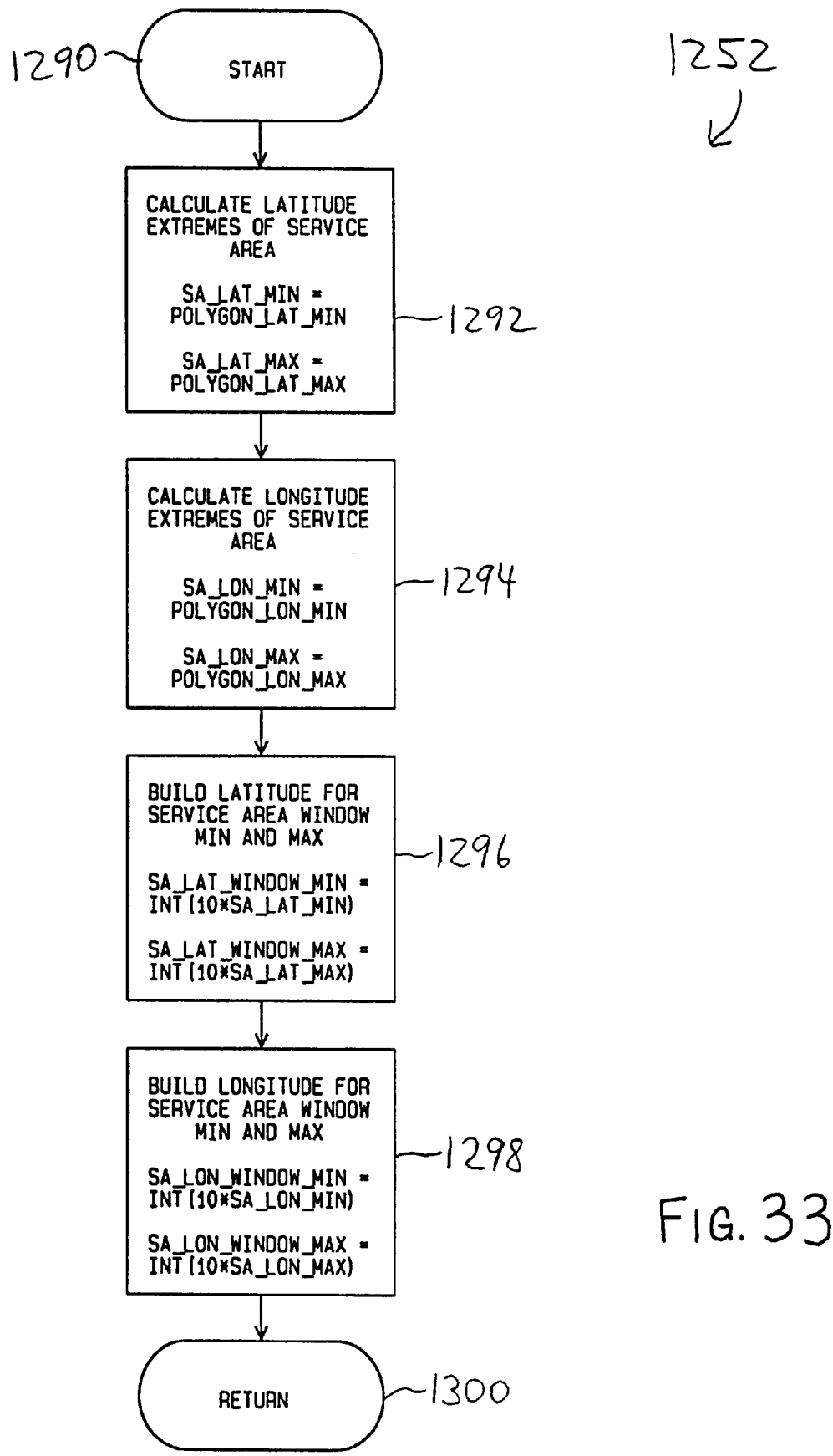
FIG. 33 is a flow diagram of the Polygon Latitude/Longitude function indicated at 1252 in FIG. 31.

Referring now to FIG. 33, the Calculate Latitude and Longitude Minimums and Maximums function 1252 for a polygonal service area will be described. Function 1252 begins at a start state 1290 and proceeds to state 1292 to determines the latitude minimum and maximum of the service area for the current location. The current service area's minimum and maximum latitude is equal to the service area's minimum and maximum latitude for the current location as read from a polygon header for the polygonal service area from the Service Locations file 109 (FIGS. 29, 31). Advancing to state 1294, function 1252 determines the longitude minimum and maximum of the service area for the current location. Again this information is obtained from the polygon header portion of the file 109.

Next, function 1252 proceeds to state 1296 to build the minimum and maximum latitude components of the lat/lon windows association with the service location and its service area. The minimum latitude window component is equal to the integer of ten times the service area latitude minimum, where the latitude is expressed in degrees and decimal parts of degrees. The maximum latitude window component is equal to the integer of ten times the service area latitude maximum, where the latitude is expressed in degrees and decimal parts of degrees. Advancing to state 1298, function 1252 builds the minimum and maximum longitude components of the lat/lon windows associated with the current service location and its service area. The procedure for building the window longitude extremes is exactly the same as the procedure for building the latitude extremes, except that the latitude values are replaced with longitude values. At the completion of state 1298, function 1252 proceeds to return state 1300 and returns to process 1212 at function 1254 (FIG. 31).

Figure 34:
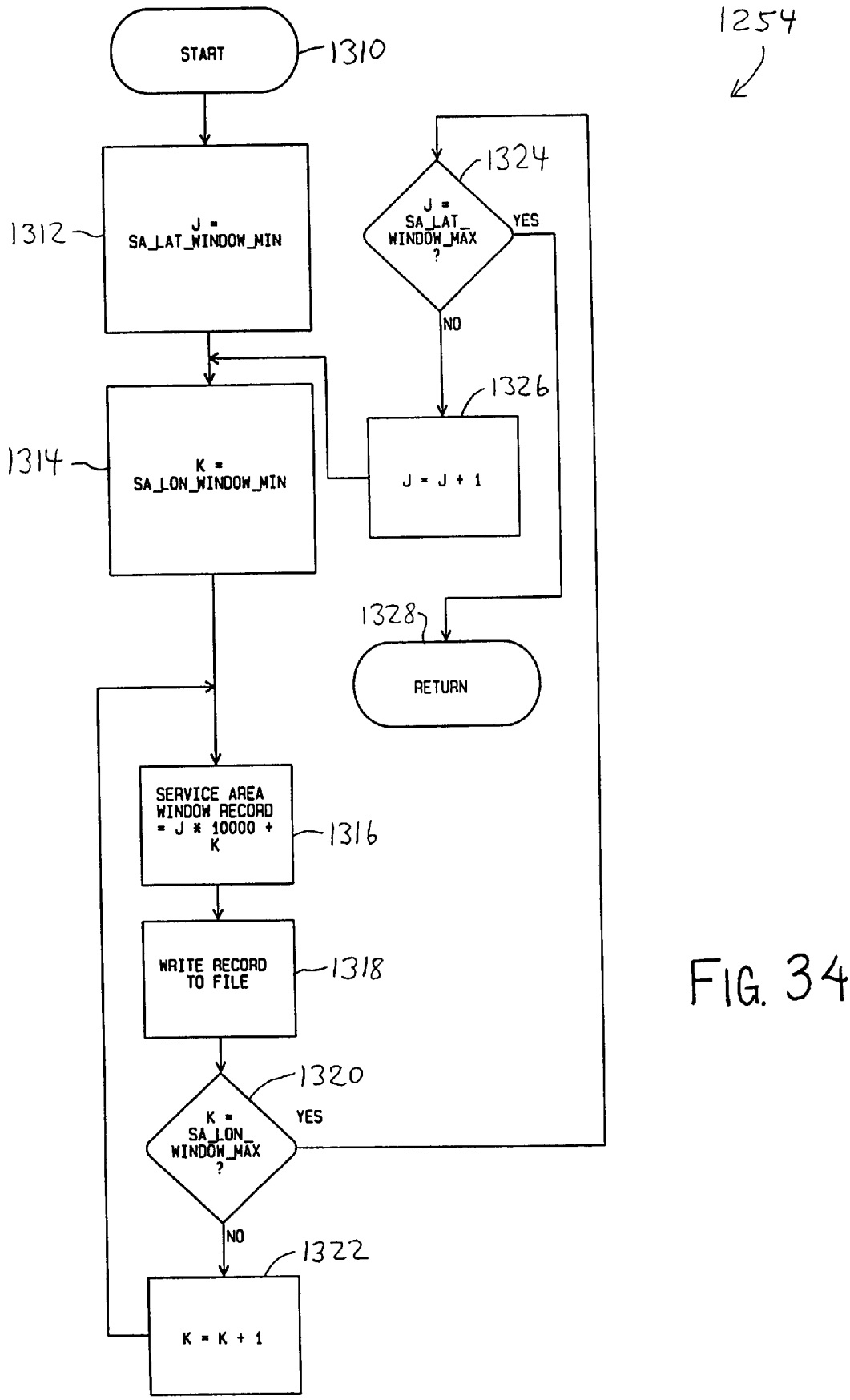
FIG. 34 is a flow diagram of the Write Service Area Window Record function indicated at 1254 in FIG. 31.

Referring now to FIG. 34, the Create Service Area File Records function 1254 will be described. Function 1254 uses the values determined in function 1250 (for a radius service area) or function 1252 (for a polygonal service area) to create a set of service area window records and write them to the Raw Service Area Windows file 1256 (FIG. 31). The function 1254 utilizes an inner loop that traverses from a service area's minimum longitude window value to the maximum longitude window value nested within an outer loop that traverses from a service area's minimum latitude window value to the maximum latitude window value.

Function 1254 begins at a start state 1310 and proceeds to state 1312 wherein a variable J is set equal to the current service area's minimum latitude window value. Function 1254 proceeds to state 1314 wherein a variable K is set equal to the current service area's minimum longitude window value. Moving to state 1316, function 1254 creates a window record by multiplying the value of J by 10,000 and then adding the value of K. Next, function 1254 proceeds to state 1318 and writes out the window record to the Raw Service Area Windows file 1256 (FIG. 31).

Function 1254 then proceeds to a decision state 1320 and tests to determine if the value of K is equal to the maximum longitude window component value of the service area for the current location. If they are not equal, function 1254 increments the value of K by one at state 1322 and moves back to state 1316 to generate another record. If the values are equal, as determined at decision state 1320, function 1254 continues at a decision state 1324. At decision state 1324, function 1254 compares the value of J to the maximum latitude window component value of the service area for the current location. If the values are not equal, the value of J is incremented by one at state 1326 and function 1254 moves back to state 1314 to start a new outer loop latitude value. If the values are equal, as determined at decision state 1324, function 1254 proceeds to return state 1328 and returns to process 1212 at state 1242 (FIG. 31).

Figure 35:
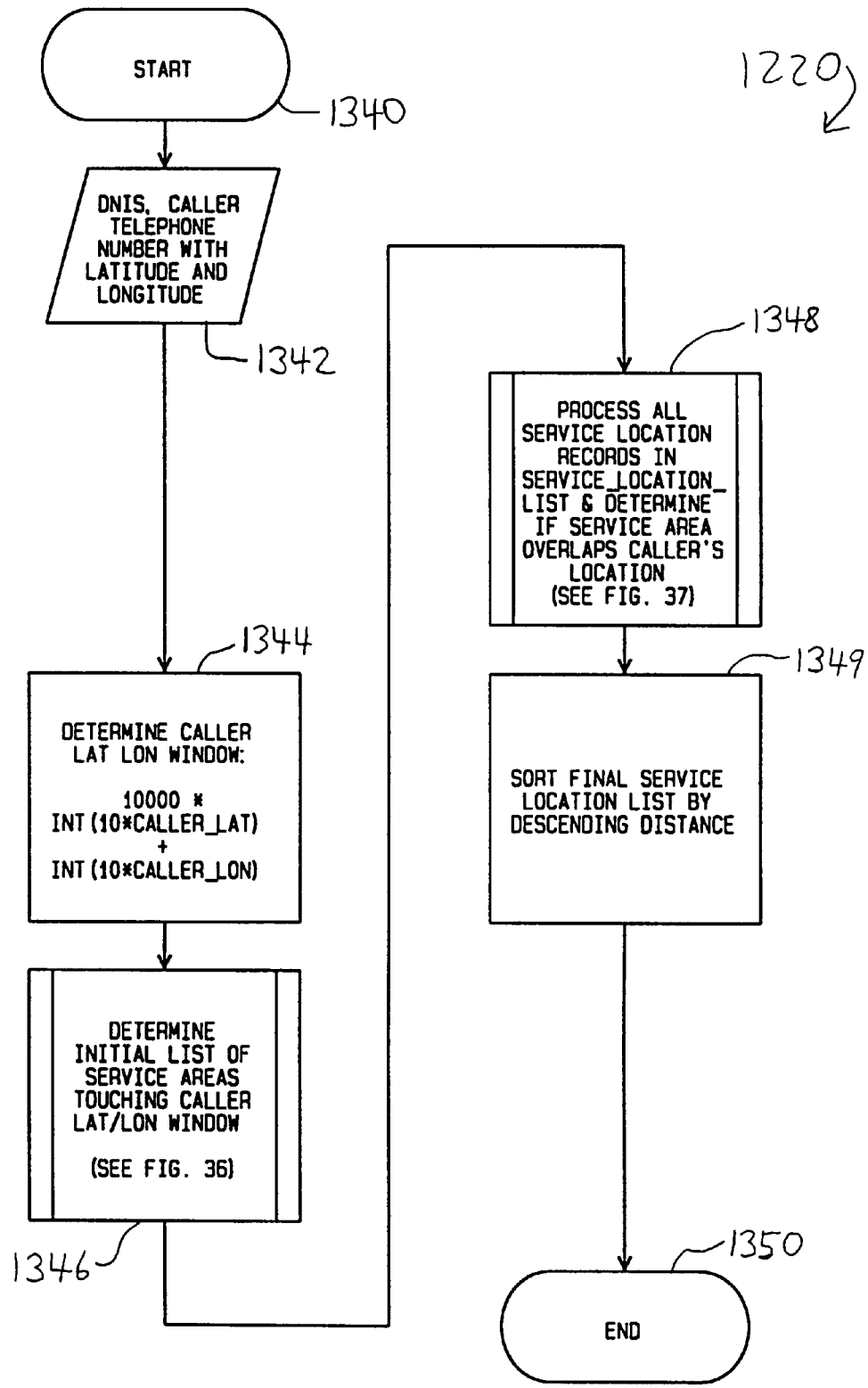
FIG. 35 is a top-level flow diagram of the Real-Time process indicated at 1220 in FIG. 29 to build a list of service locations whose service areas contain the caller location.

XIV. Real-Time Process: "During Call Process" to Build List of Servicing Locations whose Service Areas Encompass the Location of Caller Provided Telephone Number FIGS. 35–38 describe the "during call process" 1220 of building a list of service locations whose service areas encompass the location of a caller provided telephone number. System 1200 (FIG. 30) executes the flow process illustrated by the flow diagram of process 1220. FIG. 35 provides an overview of the process 1220 previously introduced in FIG. 29.

Referring now to FIG. 35, process 1220 begins at a start state 1340 and proceeds to state 1342 where it has memory access to the caller provided telephone number, the DNIS and the latitude and longitude of the location of the caller provided telephone number. The latitude and longitude are obtained by looking up the caller provided telephone number in the Master Telephone Number to Latitude and Longitude table 1010 (FIG. 29). Moving to state 1344, process 1220 utilizes the latitude and longitude from state 1342 and determines the lat/lon (latitude and longitude) window containing the location of the caller provided telephone number. The window is determined by using the formula Lat/Lon Window=10,000 times the integer of the caller latitude multiplied by 10 plus the integer of the caller longitude multiplied by 10. For example, at 40 degrees latitude, the lat/lon window is represented by an X, Y rectangle with dimensions of approximately 5.3 miles by 6.9 miles. Next, process 1220 calls function 1346 to build an initial list of Potential service locations whose service areas potentially overlap the lat/lon window of the caller provided telephone number. Function 1346 is described in more detail in conjunction with FIG. 36 hereinbelow.

After completing function 1346, process 1220 continues at a function 1348 to process all service location records in the potential service location list and determine if the service area overlaps the location of the caller provided telephone number. Function 1348 is described in more detail in conjunction with FIG. 37 below. Upon completion of function 1348, process 1220 continues at state 1349 wherein it sorts the final list of servicing locations by descending distance, if the value of K is two or greater. The value of K is determined in function 1348 (FIG. 37) and represents the final number of service locations in the final list whose service areas encompass the location of the caller provided telephone number. If the value of K is zero, process 1220 generates a flag indicating that there are no locations whose service areas encompass the location of the caller provided telephone number. Of course, if the value of K is one, no sorting is necessary. Finally, the list building process 1220 ends at state 1350.

Figure 36:
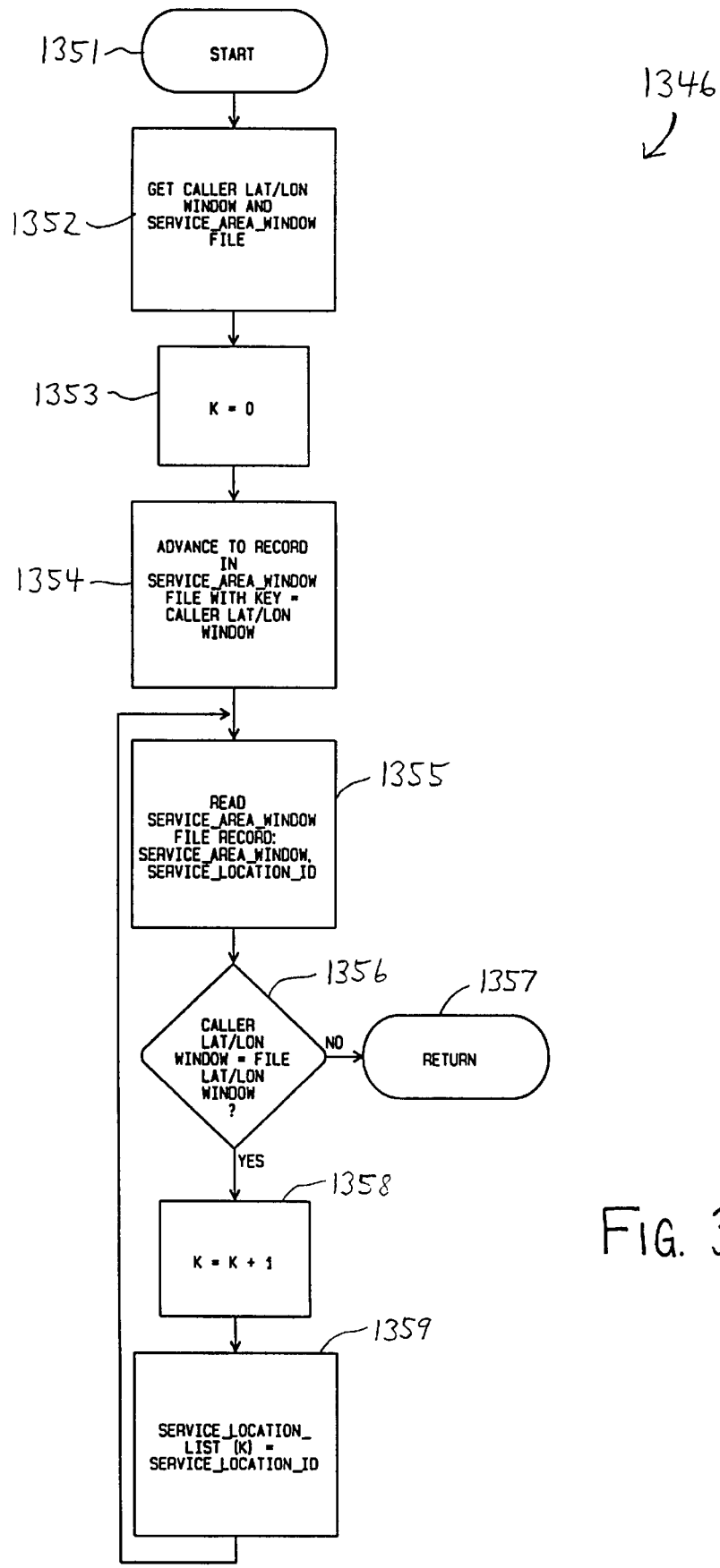
FIG. 36 is a flow diagram of the Initial Service Area List function indicated at 1346 in FIG. 35.

Referring now to FIG. 36, the Initial Service Area List function 1346 will be described. Function 1346 begins at a start state 1351 and proceeds to state 1352 where it opens the Client Service Area (lat/lon) Windows file 1216 related to the caller's DNIS and has in memory the lat/lon window of the caller provided telephone number (from state 1344, FIG. 35). Function 1346 then proceeds to state 1353 where it sets the value of K equal to zero. Moving to state 1354, function 1346 advances to the start of the first record in the open Client Service Area Windows file 1216 with a lat/lon window value equal to the lat/lon window value of the caller provided telephone number.

Continuing at state 1355, function 1346 reads a lat/lon window record from the Client Service Area (lat/lon) Windows file 1216. Moving to a decision state 1356, function 1346 determines if the record that was read at state 1355 has a lat/lon window value equal to the caller provided telephone number lat/lon window value. If the two values are equal, function 1346 proceeds to state 1358 where it increments the value of K by one. Function 1346 then proceeds to state 1359 where it moves the service location ID of the current record read from the Client Service Area (lat/lon) Window file 1216 into the Kth element in a "Potential service location list". Function 1346 then proceeds back to state 1355 to continue reading records from the Client Service Area Windows file 1216. Returning to decision state 1356, if the latitude and longitude windows values from the Client Service Area Windows record and the caller provided telephone number are not equal, function 1346 returns to process 1220 (FIG. 35) at state 1357.

Figure 37:
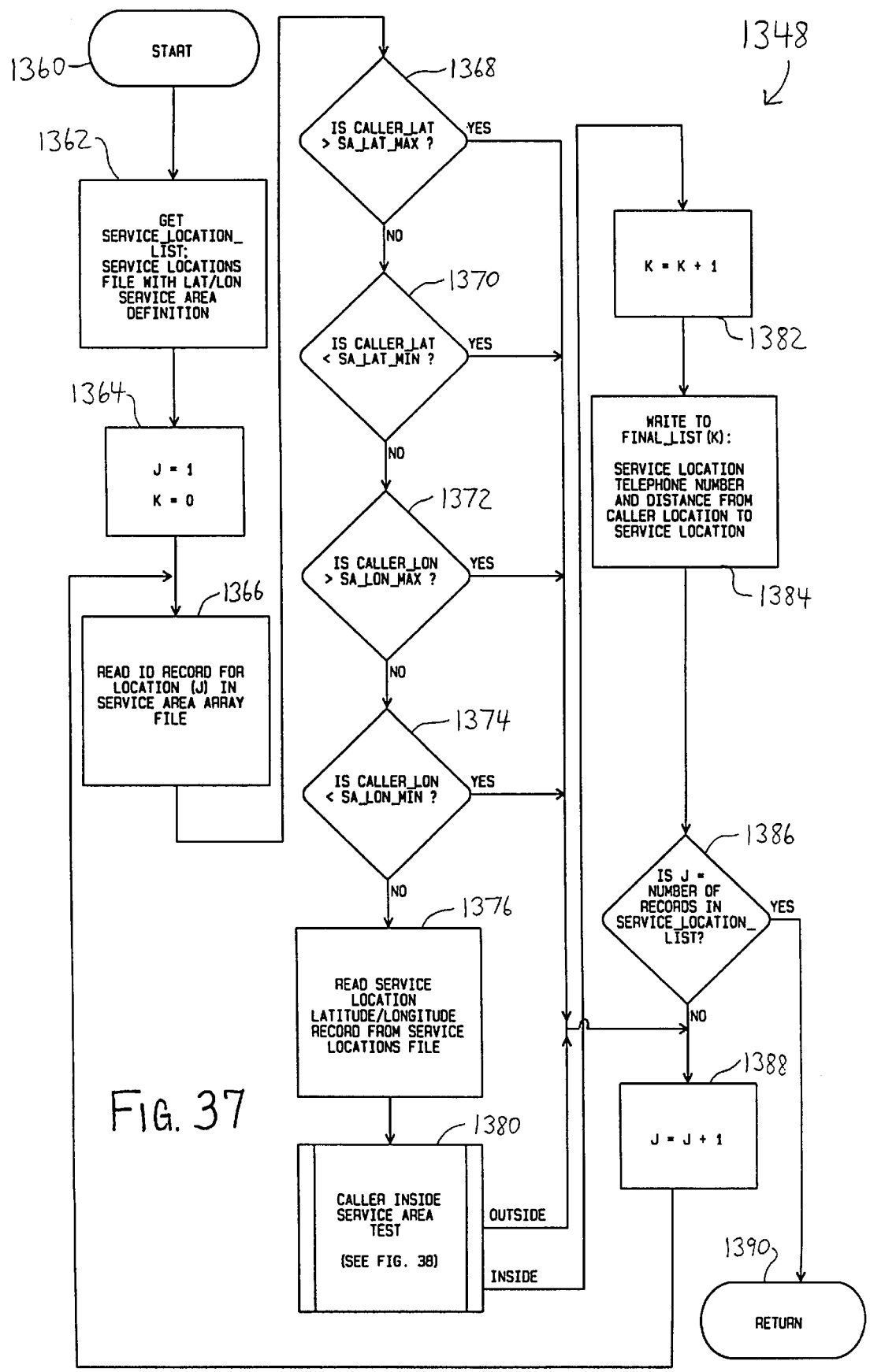
FIG. 37 is a flow diagram of the Caller Location Inside Service Area Extremes function indicated at 1348 in FIG. 35.

Referring now to FIG. 37, the Caller Location Inside Service Area Extremes function 1348 will be described. Function 1348 begins at a start state 1360 and proceeds to state 1362 where it opens the Client Service Area Array file 1214 and the Client Service Locations file 109 associated with the caller DNIS. The Client Service Array file 1214 can be considered a specialized index into the Client Locations file 109. The Potential service locations list created by function 1346 is available in memory for function 1348 at state 1362.

Function 1348 then advances to state 1364 where it sets the value of variable J equal to one and the value of K equal to zero. Moving to state 1366, function 1348 reads the record from the Service Area Array file 1214 indexed by the ID value in location(J) of the Potential service location list.

Function 1348 gets the byte offset into the Client Service Locations file 109 and the latitude and longitude extremes of the service location from the Service Area Array file 1214. Function 1348 proceeds to a decision state 1368 and then to decision states 1370, 1372 and 1374 to determine if the caller provided telephone number latitude or longitude is less than the service area minimum latitude or longitude for the service location or greater than the service area maximum latitude or longitude for the service location. If the result of any of these tests in states 1368, 1370, 1372 or 1374 is "yes", the caller location is "outside" the current service location's service area and function 1348 proceeds to state 1388. At state 1388, function 1348 increments the value of J by one and then proceeds back to state 1366 to advance to the next service location.

If on the other hand, the results of all tests in decisions states 1368, 1370, 1372 and 1374 are "no", then function 1348 proceeds to state 1376 where it advances to the byte offset in the Service Locations file 109 and reads the service location record containing the detailed definition of the service location's service area. The byte offset used to locate the proper record in the Service Locations file 109 was obtained from reading the Service Area Array file 1214 at state 1366.

At the completion of state 1376, function 1348 calls function 1380 to perform a "caller inside service area test". Function 1380 is described in more detail in conjunction with FIG. 38 hereinbelow. Upon completion of function 1380, a return flag indicating either "inside" or "outside" is set. If the return flag value is outside, function 1348 proceeds to state 1388 wherein the value of J is incremented by one, as previously described. If the return flag value is inside, function 1348 proceeds to state 1382 wherein the value of K is incremented by one. Proceeding to state 1384, function 1348 moves the current service location ID or telephone number (obtained from the Service Locations file 109) and the calculated distance into the Kth position of the final list of servicing locations. Proceeding to a decision state 1386, function 1348 tests to determine if all locations in the Potential list have been evaluated. If not, function 1348 proceeds to state 1388, increments the value of J by one and then proceeds to state 1366. If all locations in the Potential list have been evaluated, as determined at decision state 1386, function 1348 has built a final list of all servicing locations whose service area encompass the location of the caller provided telephone number. Function 1348 then proceeds to return state 1390 from where it returns to state 1349 in process 1220 (FIG. 35).

Figure 38:
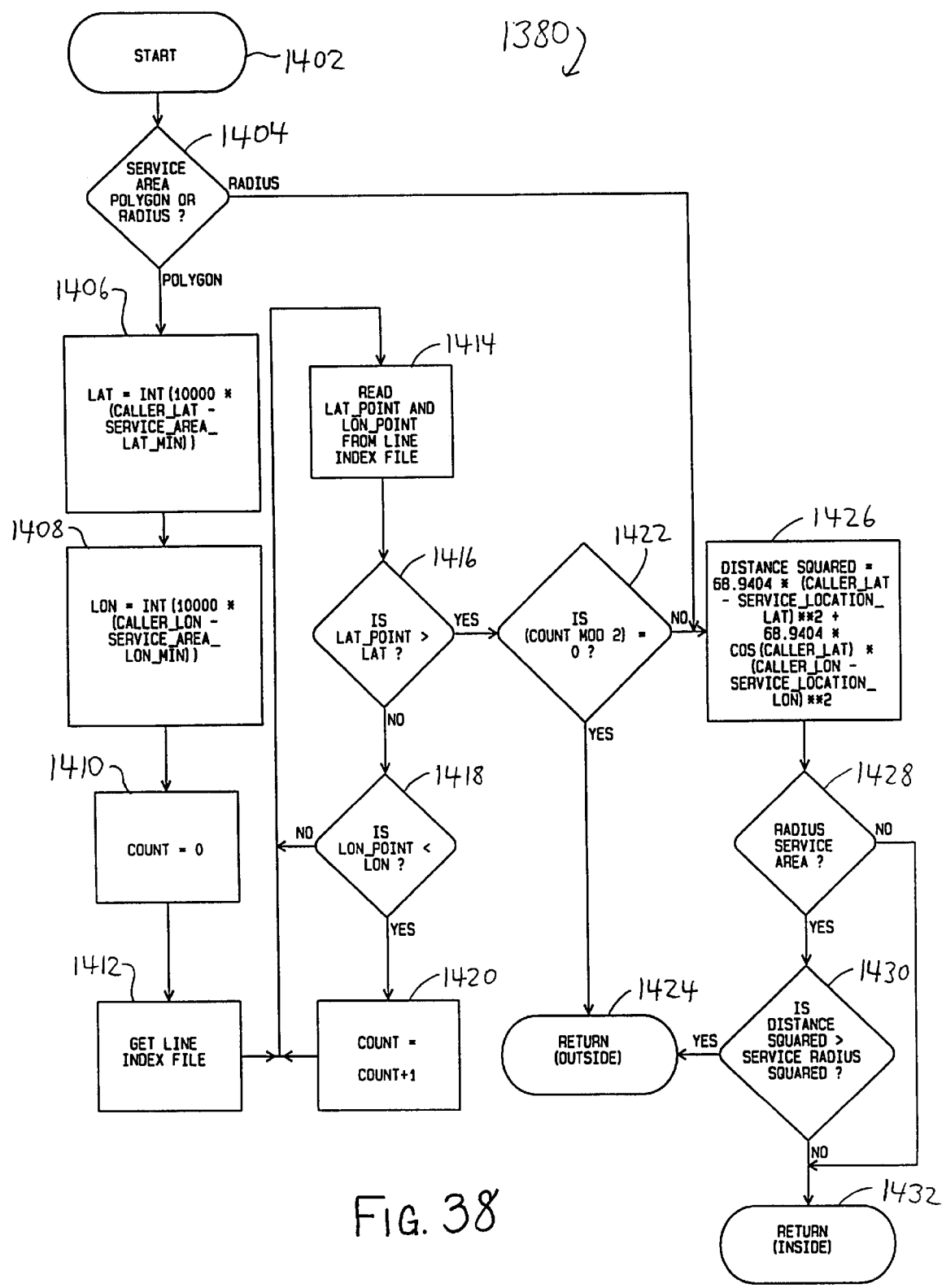
FIG. 38 is a flow diagram of the Caller Inside Service Area Test function indicated at 1380 in FIG. 37.

Referring now to FIG. 38, the Caller Inside Service Area Test function 1380 will be described. Function 1380 begins at a start state 1402 and proceeds to a decision state 1404 where it determines if the current service location has a radius or polygon defined service area. This information was previously retrieved from the Client Service Locations file 109.

If it is determined, at decision state 1404, that the service area is defined by a radius, function 1380 proceeds to state 1426 where it calculates the square of the distance from the caller provided telephone number location to the service location. The distance squared is used instead of the distance because of machine time required to take the square root of a number.

Next, the radius branch (as determined at state 1404) of function 1380 proceeds to a decision state 1428 to determine if the current service area is radius defined. Since this is true for the radius branch, function 1380 proceeds to a decision state 1430 and compares the distance squared calculated at state 1426 to the service area radius squared for the service location. The service location's radius is obtained from the Service Location file 109. If the distance squared is greater than the radius squared, as determined at decision state 1430, function 1380 sets the return flag value to "outside" at return state 1424, and returns to function 1348 (FIG. 37). However, if the distance squared is not greater than the radius squared, as determined at decision state 1430, function 1380 sets the return flag value to "inside" at return state 1432 and returns to function 1348 (FIG. 37).

Returning to decision state 1404 of FIG. 38, if the service area is determined to be defined by a polygon, function 1380 proceeds to state 1406. The polygon branch portion of function 1380 is essentially the same process as function 930 (FIG. 21) for the polygon portion of the Client Table Build process for the Two Table system. At state 1406, function 1380 calculates an integer relative value latitude for the location of the caller provided telephone number. The caller provided telephone number's latitude is translated into this form so it can be compared to the transformed service area latitudes in a Line Index file, which is described hereinbelow. Next, function 1380 proceeds to state 1408 where it performs the same transformation on the longitude for the location of the caller provided telephone number as it did with latitude in state 1406. After performing the longitude translation in state 1408, function 1380 proceeds to state 1410 where it sets the value of a variable "count" equal to zero.

Proceeding to state 1412, function 1380 gets the Line Index file. The Line Index file is built by function 618 used in the Polygon Service Area Build process in the Two Table system. Function 618 is shown in detail in FIGS. 19a and 19b. After creating the Line Index file at state 1412 above, or reading a pre-built version of the Line Index file stored in an enhanced version of the Client Locations file 109, such as Client Location file 1140 (shown in FIG. 29), function 1380 moves to state 1414 and reads the first record from the Line Index file.

Proceeding to a decision state 1416, function 1380 tests if the transformed latitude point read from the Line Index file is greater than the transformed latitude point for the location of the caller provided telephone number (from state 1406). If the result from decision state 1416 is "no", function 1380 proceeds to a decision state 1418 and tests to determine if the transformed longitude point read from the Line Index file is less than the transformed longitude point for the location of the caller provided telephone number (from state 1408). If the result from decision state 1418 is "no", function 1380 moves back to state 1414 to read the next record from the Line Index file. If the result from decision state 1418 is "yes", function 1380 proceeds to state 1420 and increments the value of variable "count" by one and then moves back to state 1414.

On the other hand, if the result of decision state 1416 is "yes", function 1380 proceeds to a decision state 1422 and tests if the value of the variable "count" tabulated in state 1420 is even or odd. If the result is "even", function 1380 sets the return flag value to "outside" at return state 1424 and returns to state 1388 of function 1348 (FIG. 37). If the result of decision state 1422 in FIG. 38 is "odd" (the caller provided telephone number's location is inside the current service area), function 1380 proceeds to state 1426 and calculates the square of the distance between the location of the caller provided telephone number and the current service location. Next, the polygon branch of function 1380 proceeds through decision state 1428 and follows the "no"

branch to return state 1432. At state 1432, function 1380 sets the return flag value to "inside" and returns to state 1382 of function 1348 (FIG. 37).

XV. Real-Time Process System Example

Figure 39:
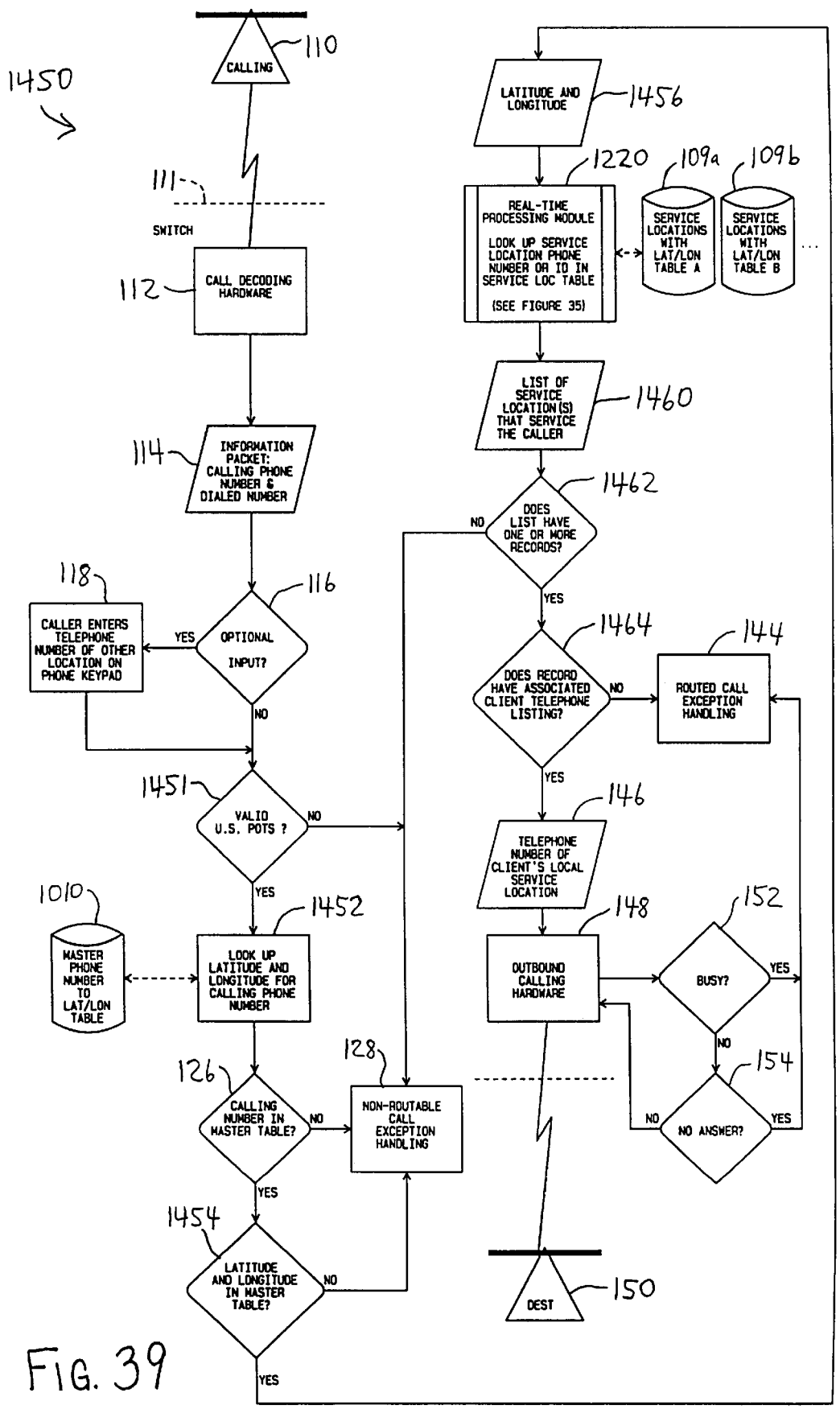
FIG. 39 is a flow diagram of an embodiment of the call processing linking process for interconnecting a caller at a calling telephone and a destination telephone using the tables of FIG. 29 and the network configuration of FIG. 30.

Referring to FIG. 39 (in combination with FIG. 30), a system level Real-Time Call Processing process 1450 will be described. The Real-Time Process system 1200 executes the flow process shown by the flow diagram of the Real-Time Call Processing process 1450. The process is used to route a caller's telephone call to a client's destination service location by use of a real-time determination. Process 1450 utilizes the network configuration for the Real-Time Process system 1200 described in conjunction with FIG. 30.

In FIG. 39, the beginning states (110 to 118, 1451) of Real-Time process 1450 are identical to the initial states (110 to 118, 1162) in the One Table system process 1160 (FIG. 28). In addition, the final states (1464 to 150) in the Real-Time Determination process 1450 are identical to the ending states (1168 to 150) of the One Table system process 1160. Since these identical states have already been described in the One Table system example, only states 1452 to 1462 will be described below.

At state 1452 in FIG. 39, process 1450 looks up the latitude and longitude for the location of the caller provided telephone number in the Master Telephone Number to Latitude and Longitude Table 1010. Moving to decision state 126, process 1450 determines if the lookup of the caller provided telephone number in the Master Table 1010 was successful. If not, process 1450 proceeds to state 128 for non-routable call exception handling, as described above at state 128 in conjunction with FIG. 1c. If the caller provided number is in the Master Table 1010, as determined at decision state 126, process 1450 proceeds to a decision state 1454 and determines if a latitude and longitude were retrieved at state 1452. If no latitude and longitude were retrieved, process 1450 proceeds to state 128 for non-routable call exception handling, as previously described. If a latitude and longitude were retrieved at state 1452, process 1450 makes them available to process module 1220 in information packet 1456.

Process 1220 is conceptually described in conjunction with FIG. 29 and is described in detail in conjunction with FIGS. 35 to 38. In summary, process 1220 translates the retrieved latitude and longitude (from state 1452) associated with the location of the caller provided telephone number into a lat/lon Window Key. It then uses this key to retrieve a list of potential service location telephone numbers or IDs from a DNIS dependent Client Service Area Windows file 1216 (FIGS. 29 and 30, but not shown in FIG. 39). Process 1220 uses these retrieved service location IDs to retrieve a byte offset and service area latitude and longitude minimums and maximums from a DNIS dependent Client Service Area Array file 1214 (FIGS. 29 and 30, but not shown in FIG. 39). For each potential service location where the caller provided telephone number's latitude and longitude are within the boundaries defined by a service location's minimum and maximum latitude and longitude rectangular boundary, process 1220 uses the byte offset to retrieve a detailed definition of the service area for the service location from the DNIS dependent Service Locations file 109. Process 1220 then performs a precise "within service area" test and builds a final list (shown at state 1460) of service location IDs or telephone numbers sorted by distance (from the location of the caller provided telephone number to the service location). The final list is also shown as list 1222 of FIG. 29.

Proceeding to state 1462, process 1450 determines if the list from state 1460 contains any records. If the list is null, i.e., contains no records, then process 1450 proceeds to state 128 for non-routable call exception handling, or else, if the list contains one or more records, process 1450 then proceeds to state 1464. Since states 1464 to 150 in FIG. 39 are identical to states 1168 to 150 in FIG. 28 which have already been described for process 1160, the description of the remaining states at the end of process 1450 is not repeated.

XVI. Summary

The present invention utilizes telephone numbers as an index to a table containing partitions of a country into small geographic areas or points, such as postal service zip+4 codes, latitudes and longitudes, and so forth. These partitions are further utilized to access one of a plurality of service locations that may be anywhere within the country.

The automated telephone routing system of the present invention provides the ability to reduce costs by routing a very high percentage of calls made to a single national telephone number without any human intervention and the marketing advantage for a client of a single, easy to remember, toll free or nominal fee national telephone number. The system also provides geographically precise results due to the use of all ten digits of the calling and called telephone numbers which correspond with the zip+4 codes or latitudes and longitudes for the locations of these numbers. The automated routing system provides the ability for a business to choose among different types of service location service area definitions. Preferably, a client may define each location's service area as an area with a radius of any size or a polygon of any size and shape. A client can intermix radius and polygon definitions as well as have overlapping or non-overlapping service areas.

Flexibility is provided in defining how a particular client location is selected to terminate a call. A client is able to specify that a caller within a preselected radius of any distance (to a tenth of a mile) about a particular location is to be connected; or that the closest servicing client location to the caller is to be connected; or that a caller within a preselected polygon about a particular client location is to be connected, wherein the polygon edges can be any length. The polygon area can represent either an exclusive territory, or can overlap with other polygons or radii of other client locations if the territory is non-exclusive. Additionally, each client location can have a different area type, with different radii or dimensions, if required. Added flexibility is provided in the non-exclusive polygon type or radius type areas, wherein a random or weighted selection from multiple locations within the area is possible.

The present invention provides a method of routing calls originating from all published and unpublished telephone numbers, including unlisted numbers, secondary unpublished business lines, and public pay phones. The present invention also provides a method for legally conforming to contracted franchise territory definitions executed between franchisers and franchisees by routing customer's calls precisely to the correct specific franchisee area. Additionally, the present invention provides a method for precisely routing telephone calls based on any geographic definition including postal geography, census geography, telecommunications geography, special grid coordinate geography, and all custom geography.

The present invention provides a method for automatically routing and processing customer calls that do not meet the pre-set client protocols. This "exceptions handling"

process routes the call to a "live" operator who executes preset exceptions handling protocols. The present invention also provides for a method of integrating unrelated geographic information systems and database technology, telecommunications systems and database technology, postal systems and database technology, and computer technology into a common applications driven architecture. Additionally, the present invention provides methods for automatically and independently updating both the Client and Master Tables, and instantly and dynamically linking these two tables during call processing. Furthermore, the present invention provides a method for automating the processing of information that is input by a customer using a customer interface that automatically routes telephone calls to customer requested destinations.

The Two Table system provides a single updatable Master Table (telephone number to Spatial Key) to support multiple clients, where each Client Table is updated independently from other Client Tables and from the Master Table. This design maximizes transaction processing capacity in terms of calls per second that can be connected to a servicing location when the Client Table contains the service location telephone number as the service location ID.

The Two Table system is one embodiment of the routing kernel that, based on a dialed number, efficiently determines which geographically defined client service areas of substantially any size or shape encompass the location of the caller or caller-provided telephone number and determines the distance and direction from the caller's location to each of the servicing locations.

Another embodiment of the routing kernel, the One Table system, provides many of the same benefits as the Two Table system plus it routes a call faster. Since it only requires a single disk lookup to determine the telephone number of the servicing location, the One Table system is the fastest during the call routing process. From a network perspective, because of its simplicity of a being only a single table, it is the simplest to implement in a telecommunications network.

Yet another embodiment of the routing kernel, the Real-Time Processing system, is the simplest embodiment to update and requires the least amount of storage. The spatial relationship of the caller or caller-provided telephone number to a client's servicing locations is determined at the time of the call. The Master Table of telephone numbers with latitudes and longitudes, and each client's Service Location files can be maintained independently and can reside on different machines.

As an enhancement to the One Table system, the Two Table system and the Real-Time Processing system, an indexed Client Service Location table can be added to provide access to more information about the servicing location. It is relatively straightforward to implement for the Real-Time system because the Client Service Location table is already utilized during call processing and can be readily further used to provide the additional information to the user. For the One Table system and the Two Table system, essentially the same Client Table Building processes as originally used for both the One Table system and the Two Table system are utilized to incorporate the indexed Client Service Location table, except that the ID of the client location is substituted for the telephone number of the client location.

While the above detailed description has shown, described, and pointed out the fundamental novel features of the invention as applied to various embodiments, it will be understood that various omissions and substitutions and changes in the form and details of the system illustrated may be made by those skilled in the art, without departing from the spirit of the invention.

What is claimed is:

1. An automatic method for selecting service locations during a telephone call, the method for use within a computer telephone integration (CTI) network having a master list of caller telephone numbers that is indexed by telephone number, each telephone number having a coordinate corresponding to a location of a telephone associated with the telephone number, and a client dependent location list that is indexed by a spatial index of service locations associated with corresponding service areas of substantially any selected shape and size, each service location having a coordinate associated with a service location address, the method comprising:

receiving a caller's telephone number and a dialed telephone number;

using the received caller's telephone number to access the master list of caller telephone numbers and retrieve a corresponding caller coordinate from the master list indicating a location of a caller;

determining an index key using the retrieved caller coordinate;

determining one or more service locations having coordinates spatially proximal to the retrieved caller coordinate using the index key;

retrieving the service location coordinates and service area definitions for said one or more service locations; and determining the distance from the caller coordinate to the coordinates of said one or more service locations and selecting service locations having a service area that contains the caller coordinate.

2. The method of claim 1, further comprising ordering, in distance order, the selected service locations with the distance to the caller location to create an ordered list.

3. The method of claim 2, wherein the service areas are polygonal.

4. The method of claim 3, wherein the client dependent location list further includes business information and the ordered list is reduced according to the business information associated with the ordered service locations.

5. The method of claim 4, wherein the business information comprises hours of operation of the service locations.

6. The method of claim 4, further comprising communicating the business information associated with one or more of the ordered service locations to the caller.

7. The method of claim 1, wherein the index key comprises a window key for a spatial key window.

8. The method of claim 1, wherein determining said one or more service locations utilizes a window file derived from the client dependent location list.

9. The method of claim 1 wherein the client dependent location list further includes telephone numbers associated with the service locations and the method further comprises connecting the caller to the telephone number of a selected service location.

10. For use within a computer telephone integration (CTI) network, a system for automatically selecting one or more service locations during a telephone call, the system comprising:

a master list of caller telephone numbers that is indexed by telephone number, each telephone number having a spatial key corresponding to a location of a telephone associated with the telephone number;

a spatial key to geographic coordinate translation table including a list of spatial keys and their corresponding geographic coordinates;

a client service location table including geographic coordinates for client service locations; and a processing system configured for using a caller's full telephone number to access the master list of caller telephone numbers and retrieve a corresponding spatial key from the master list, using the retrieved spatial key to access the spatial key to geographic coordinate translation table and retrieve a corresponding geographic coordinate from the translation table, and using the retrieved geographic coordinate to determine which client service location is spatially proximate to the location of the telephone associated with the caller's full telephone number.

11. The system of claim 10, further comprising software operating within said processing system capable of using the retrieved corresponding geographic coordinate to spatially index into the client service location table to retrieve geographic coordinates and service area definitions of spatially proximal client service locations.

12. The system of claim 11, further comprising software operating within said processing system capable of using the geographic coordinate, service location coordinates and service area definitions to build a list, in distance order, of service locations whose service areas encompass the caller location and providing the ordered list to the CTI network.

13. The system of claim 12, wherein the length of the ordered list is reduced to a predetermined number of closest service locations.

14. The system of claim 10, wherein the processing system includes software capable of determining, during the telephone call, the distance between a caller location and spatially proximal servicing dealer locations.

15. A method of automatically building, during a telephone call, a results list in distance order of servicing locations to be used within a computer telephone integration (CTI) network, the method comprising:

providing a master list of potential caller telephone numbers, each telephone number having a coordinate associated with a location corresponding to the telephone number;

providing a client dependent service location list, each service location having a coordinate associated with a service location address and having corresponding service location information;

receiving a caller's full telephone number;

accessing the master list of potential caller telephone numbers using the received caller's full telephone number to obtain a caller coordinate corresponding to the received caller's full telephone number;

accessing the client dependent service location list using the caller coordinate to retrieve spatially proximal service location address coordinates and service location information; and building a results list, in distance order, of service locations using the caller coordinate, service location coordinates and service location information.

16. The method of claim 15, wherein the service location information includes service area definitions.

17. The method of claim 15, wherein the service location information includes hours of operation.

18. The method of claim 15, wherein the service location information includes a service location identification (ID).

19. The method of claim 18, wherein the service location ID comprises a service location telephone number.

20. The method of claim 15, further comprising selecting a service location from the results list that meets a distance criteria.

21. The method of claim 15, further comprising selecting a service location from the results list that satisfies a service location information criteria.

22. The method of claim 15, further comprising selecting a service location from the results list that meets a distance criteria and satisfies a service location information criteria.

23. The method of claim 15, further comprising providing the results list to the CTI network.

24. The method of claim 15, further comprising selecting a single service location from the results list and providing the corresponding service location information to the CTI network to be provided to the caller.

25. An automatic telephone call processing system, comprising:

a predefined master list of telephone numbers with spatial coordinates indexed by telephone number, wherein the spatial coordinates correspond to locations of telephones associated with said telephone numbers;

a file of client service locations, wherein each service location is geographically defined by spatial coordinates and indexed by spatial coordinate windows; and a processor system configured to index a caller telephone number in the master list of telephone numbers to obtain a selected spatial coordinate corresponding to a location of a telephone associated with the caller telephone number, indexing the selected spatial coordinate in a spatial coordinate window index of the client service locations file to determine which service locations are spatially proximate to the location of the telephone associated with the caller telephone number, and selecting a service location from the determined spatially proximate service locations according to at least one predetermined criteria.

26. The system of claim 25, wherein the predetermined criteria is distance.

27. The system of claim 25, wherein the file of client service locations further includes business information for the service locations.

28. An automatic call processing system, comprising:

a routing processor linked to a telephone network;

a predefined master table of telephone numbers having spatial keys indexed by full telephone number wherein the master table is accessible by the routing processor, and wherein the spatial keys correspond to locations of telephones associated with telephone numbers;

one or more client location tables accessible by the routing processor, wherein each client location table includes spatial keys corresponding to client service locations and business information; and a real-time processing module executed by the routing processor, the real time processing module configured to index a caller's full telephone number in the master table of telephone numbers to obtain a selected spatial key corresponding to the location of the telephone associated with the caller's full telephone number and determining which client service location is the closest to the location of the telephone associated with the caller's full telephone number utilizing said one or more client location tables.

29. The system of claim 28, wherein the spatial keys are geographic coordinates.

30. In a call processing system, a real-time method of call processing for use in a telephone network, the method comprising:

receiving a caller's full telephone number;

using the received caller's full telephone number to index a predefined master list of telephone numbers with spatial keys to obtain a selected spatial key associated with the caller's full telephone number, wherein the master list is indexed by telephone number and the spatial keys correspond to locations of telephones associated with the telephone numbers; and automatically selecting a client service location from one or more client tables utilizing the selected spatial key, wherein each client table includes spatial keys corresponding to the locations of client service locations and business information.

31. A method, for use with a computer telephone integration (CTI) network, of generating a database of potential caller telephone numbers linked to client service location identifications for one or more client service locations associated with each caller telephone number, the method comprising:

providing a master list of caller telephone numbers, each telephone number having a spatial coordinate corresponding to a location of a telephone associated with the telephone number;

providing a list of client service locations with client location identifications and client location spatial coordinates; and automatically linking telephone numbers from the master list to client location identifications from the list of client service locations based on the spatial coordinate corresponding to the location of the telephone associated with the telephone number being within a client defined distance of the spatial coordinate of the client service location.

32. The method of claim 31, wherein the location identifications are telephone numbers.

33. The method of claim 31, wherein the client defined distance is within a global maximum service radius for all client service locations.

34. The method of claim 33, wherein the distance from a potential caller location to the closest service location is less than the client defined distance.

35. The method of claim 31, wherein the client defined distance is within a maximum distance around a client service location, where the maximum distance is defined by a location service radius.

36. The method of claim 35, wherein the distance from a potential caller location to the closest service location is less than the client defined distance.

37. The method of claim 31, wherein the client defined distance is the shortest distance from a caller location to a service location and the caller location is not outside a polygon defined service boundary for the service location.

38. A method, for use with a computer telephone integration (CTI) network, of generating a database of potential caller telephone numbers linked to client service locations, the method comprising:

a) providing a master list of caller telephone numbers, each caller telephone number having a spatial coordinate corresponding to a location of a telephone associated with the caller telephone number;

b) providing a list of client service locations with location spatial coordinates and defined service areas; and c) automatically linking caller telephone numbers from the master list to client service locations from the list of client service locations based on the spatial coordinate corresponding to the location of the telephone associated with the caller telephone number being a shortest distance to the spatial coordinate of a client service location and the spatial coordinate corresponding to the location of the telephone associated with the caller telephone number being inside a service location's defined service area.

39. The method of claim 38, wherein the client service location has associated client service location information.

40. The method of claim 38, wherein the list of client service locations of b) further includes an associated telephone number for each client service location, and wherein c) includes linking each caller telephone number to a telephone number of a client service location.

41. The inethod of claim 40, wherein the linked caller telephone number and the client service location telephone number are stored in a record of the generated database.

42. The method of claim 38, wherein the linking includes storing the distance between the spatial coordinate associated with the caller telephone number and the spatial coordinate of the client service location.

43. The method of claim 42, wherein the distance comprises a vector, the vector including a compass direction between the spatial coordinate associated with the caller telephone number and the spatial coordinate of the client service location.

44. An automatic call processing system, comprising:

a routing processor linked to a telephone network;

a predefined master table of telephone numbers having spatial keys indexed by telephone number wherein the master table is accessible by the routing processor, and wherein the spatial keys correspond to locations of telephones associated with caller telephone numbers;

one or more client location tables accessible by the routing processor, wherein said one or more client location tables include spatial keys corresponding to service areas of client service locations, wherein the service areas are of substantially any selected shape and size; and a processing module executed by the routing processor, the processing module configured to index a caller telephone number in the master table of telephone numbers to obtain a selected spatial key corresponding to a location of a telephone associated with the caller telephone number and selecting one or more client service locations utilizing said one or more client location tables, wherein a client service location is selected if the location of the telephone associated with the caller telephone number spatially lies within the service area of the client service location.

45. The system of claim 44, wherein the spatial keys are geographic coordinates.

46. The system of claim 44, wherein the spatial keys are postal codes.

* * * * *

UNITED STATES PATENT AND TRADEMARK OFFICE
CERTIFICATE OF CORRECTION

PATENT NO. : 6,091,810
DATED : July 18, 2000
INVENTOR(S) : James D. Shaffer and George G. Moore It is certified that error appears in the above-identified patent and that said Letters Patent is hereby corrected as shown below:

<u>Column 60,</u>
Line 21, replace "The inethod" with -- The Method --.

Signed and Sealed this

Twenty-first Day of May, 2002

Attest:

JAMES E. ROGAN
Director of the United States Patent and Trademark Office

Attesting Officer